(12) United States Patent
Yokoi et al.

(10) Patent No.: US 10,679,017 B2
(45) Date of Patent: Jun. 9, 2020

(54) SEMICONDUCTOR DEVICE AND SYSTEM THEREOF

(71) Applicant: SEMICONDUCTOR ENERGY LABORATORY CO., LTD., Atsugi-shi, Kanagawa-ken (JP)

(72) Inventors: Tomokazu Yokoi, Kanagawa (JP); Masayuki Sakakura, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 15/567,091

(22) PCT Filed: Apr. 11, 2016

(86) PCT No.: PCT/IB2016/052034
§ 371 (c)(1),
(2) Date: Oct. 17, 2017

(87) PCT Pub. No.: WO2016/170444
PCT Pub. Date: Oct. 27, 2016

(65) Prior Publication Data
US 2018/0129831 A1 May 10, 2018

(30) Foreign Application Priority Data

Apr. 21, 2015 (JP) ................. 2015-086872

(51) Int. Cl.
*G06K 19/07* (2006.01)
*G06K 7/01* (2006.01)
(Continued)

(52) U.S. Cl.
CPC ............ *G06K 7/01* (2013.01); *B42D 25/29* (2014.10); *B42D 25/305* (2014.10);
(Continued)

(58) Field of Classification Search
CPC ........... G06Q 20/40145; G06Q 20/341; G06Q 20/20; G06Q 20/40; G06Q 20/4014;
(Continued)

(56) References Cited

U.S. PATENT DOCUMENTS 5,465,303 A 11/1995 Levison et al.
5,623,552 A * 4/1997 Lane .................... G06K 13/073
235/492
(Continued)

FOREIGN PATENT DOCUMENTS

CN 101159012 A 4/2008
EP 1901194 A 3/2008
(Continued)

OTHER PUBLICATIONS

Tamura.H et al., "Embedded SRAM and Cortex-M0 Core with Backup Circuits Using a 60-nm Crystalline Oxide Semiconductor for Power Gating", IEEE Cool Chips XVII, Apr. 14, 2014, p. 3pages.

(Continued)

*Primary Examiner* — Christopher Stanford
(74) *Attorney, Agent, or Firm* — Fish & Richardson P.C.

(57) ABSTRACT

To provide an authentication system and a semiconductor device utilizing the system.
The semiconductor device includes a transmission/reception circuit, a control circuit, an analog-to-digital converter circuit, a memory device, and a fingerprint sensor. At least one of the control circuit, the analog-to-digital converter circuit, and the memory device includes a transistor including an oxide semiconductor in a channel formation region. The control circuit has a function of receiving an instruction signal from the outside of the semiconductor device through the transmission/reception circuit. The memory device has fingerprint data for comparison and confidential informa-
(Continued)

tion. The control circuit has a function of comparing fingerprint data to be compared which is obtained by the fingerprint sensor and the fingerprint data for comparison. The control circuit has a function of transmitting the confidential information to the outside of the semiconductor device through the transmission/reception circuit when the fingerprint data to be compared and the fingerprint data for comparison match each other.

23 Claims, 49 Drawing Sheets

(51) Int. Cl.
| | |
|---|---|
| B42D 25/313 | (2014.01) |
| H01L 21/822 | (2006.01) |
| G06K 19/073 | (2006.01) |
| H01L 21/8234 | (2006.01) |
| B42D 25/305 | (2014.01) |
| G06F 21/32 | (2013.01) |
| G06F 21/72 | (2013.01) |
| G06K 19/077 | (2006.01) |
| B42D 25/29 | (2014.01) |
| G06K 9/00 | (2006.01) |
| H01L 29/786 | (2006.01) |
| H01L 27/12 | (2006.01) |
| H01L 27/088 | (2006.01) |
| H01L 27/06 | (2006.01) |
| H01L 21/8258 | (2006.01) |

(52) U.S. Cl.
CPC ......... *B42D 25/313* (2014.10); *G06F 21/32* (2013.01); *G06F 21/72* (2013.01); *G06K 9/00087* (2013.01); *G06K 9/00885* (2013.01); *G06K 19/0701* (2013.01); *G06K 19/073* (2013.01); *G06K 19/0723* (2013.01); *G06K 19/07354* (2013.01); *G06K 19/07749* (2013.01); *H01L 21/822* (2013.01); *H01L 21/8234* (2013.01); *H01L 27/1225* (2013.01); *H01L 29/7869* (2013.01); *H01L 29/78648* (2013.01); *H01L 29/78696* (2013.01); *G06K 2009/00959* (2013.01); *H01L 21/8258* (2013.01); *H01L 27/0688* (2013.01); *H01L 27/088* (2013.01)

(58) Field of Classification Search
CPC ........ G07F 7/1008; G06F 21/32; G06F 21/31; G06K 9/00087; G06K 19/0723; G06K 19/07354; G06K 9/00885; G06K 19/0718
See application file for complete search history.

(56) References Cited

U.S. PATENT DOCUMENTS

| | | | |
|---|---|---|---|
| 5,744,864 A | 4/1998 | Cillessen et al. | |
| 5,929,845 A | 7/1999 | Wei et al. | |
| 7,566,010 B2 | 7/2009 | Yamazaki et al. | |
| 7,699,232 B2 | 4/2010 | Koyama et al. | |
| 8,083,128 B2 | 12/2011 | Dembo et al. | |
| 8,423,786 B2 | 4/2013 | Takaku et al. | |
| 8,614,916 B2 | 12/2013 | Nagatsuka et al. | |
| 2003/0167207 A1* | 9/2003 | Berardi | G06Q 10/025 |
| | | | 705/16 |
| 2006/0181394 A1 | 8/2006 | Clarke | |
| 2008/0065901 A1 | 3/2008 | Takaku et al. | |
| 2008/0076974 A1 | 3/2008 | Yamazaki et al. | |
| 2009/0083202 A1* | 3/2009 | Tanaka | G06N 3/063 |
| | | | 706/15 |
| 2012/0168500 A1 | 7/2012 | Li | |
| 2014/0072188 A1 | 3/2014 | Liu et al. | |
| 2015/0070507 A1* | 3/2015 | Kagan | G01D 4/002 |
| | | | 348/160 |
| 2015/0109201 A1 | 4/2015 | Yamazaki et al. | |
| 2015/0119031 A1 | 4/2015 | Brownworth | |

FOREIGN PATENT DOCUMENTS

| | | |
|---|---|---|
| JP | 11-505377 | 5/1999 |
| JP | 2005-332304 A | 12/2005 |
| JP | 2008-070931 A | 3/2008 |
| JP | 2012-238126 A | 12/2012 |
| JP | 2012-256400 A | 12/2012 |
| KR | 2008-0024070 A | 3/2008 |
| TW | 201227527 | 7/2012 |

OTHER PUBLICATIONS

International Search Report (Application No. PCT/IB2016/052034) dated Jul. 12, 2016.
Written Opinion (Application No. PCT/IB2016/052034) dated Jul. 12, 2016.

* cited by examiner

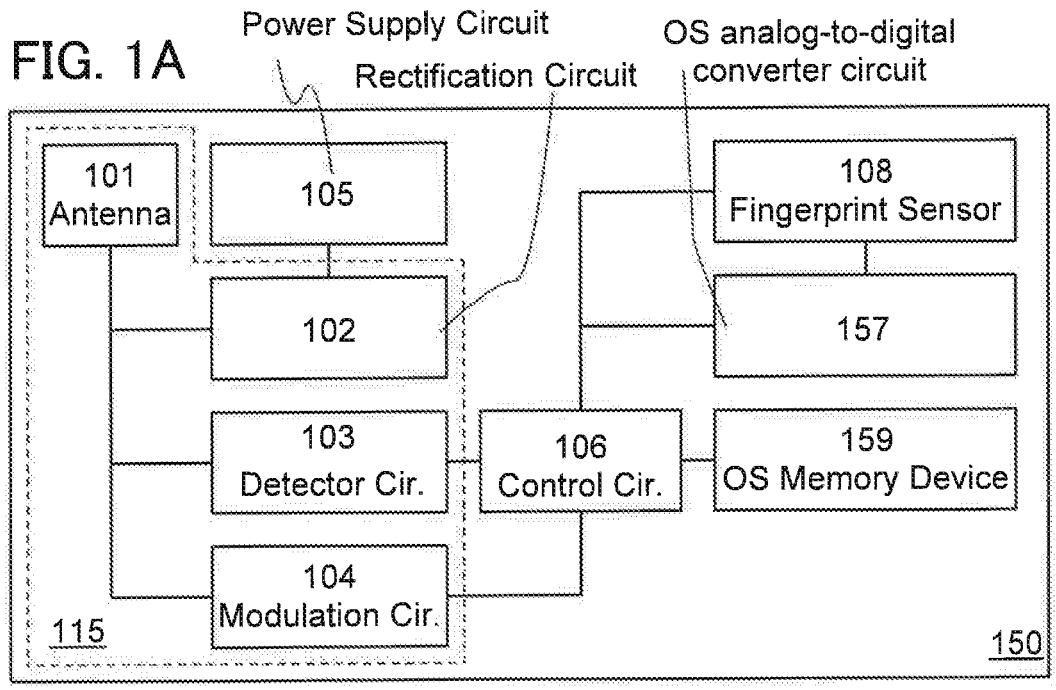
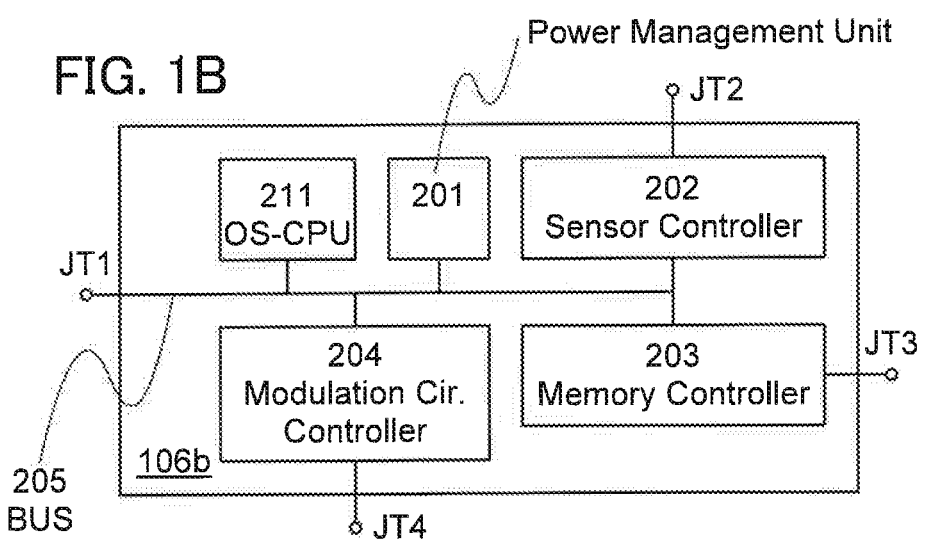

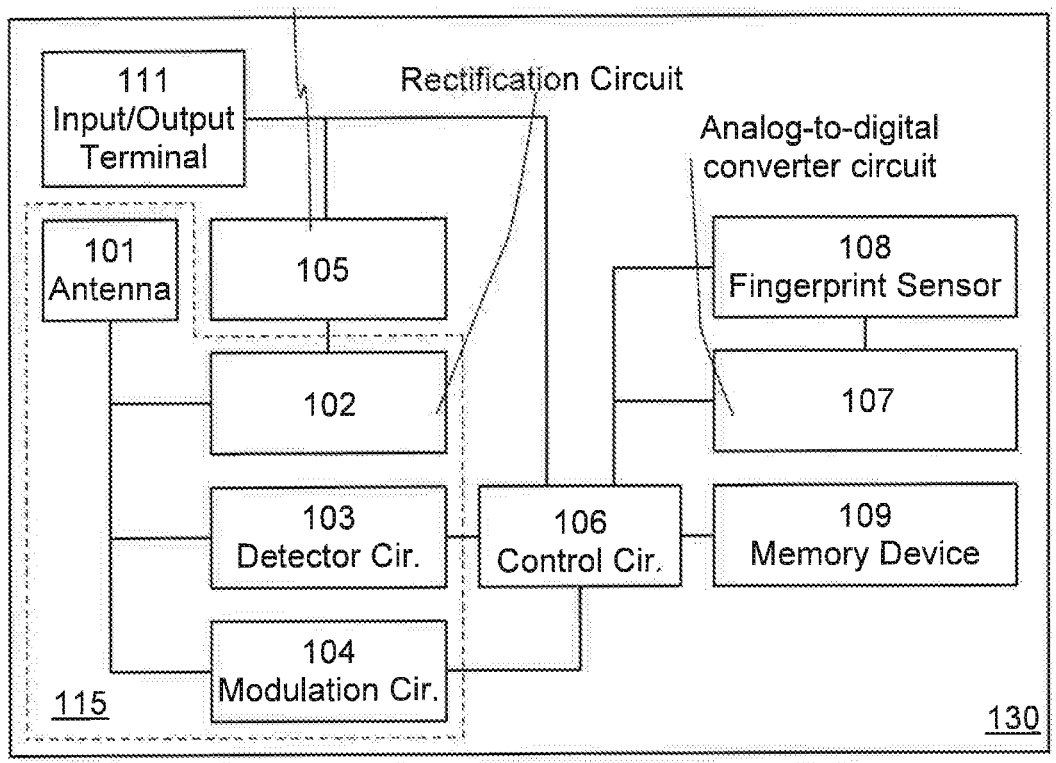
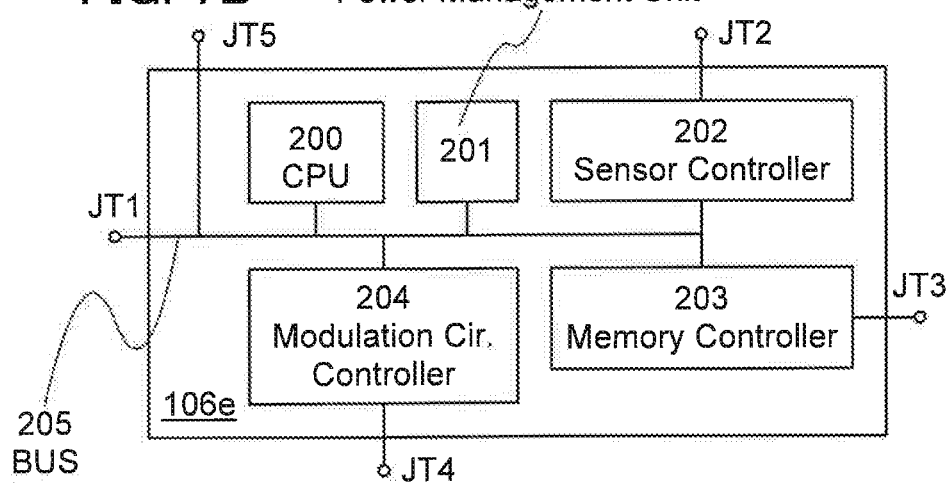

804

894, 895, 896

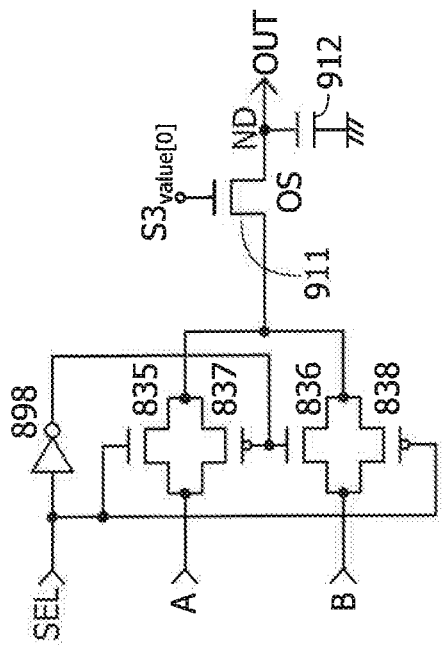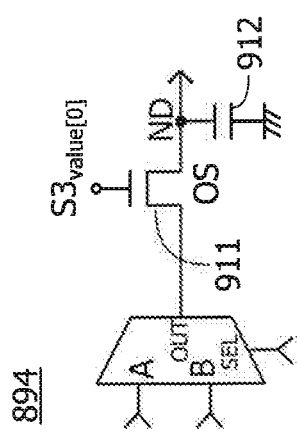
FIG. 31B
FIG. 31A

FIG. 35A
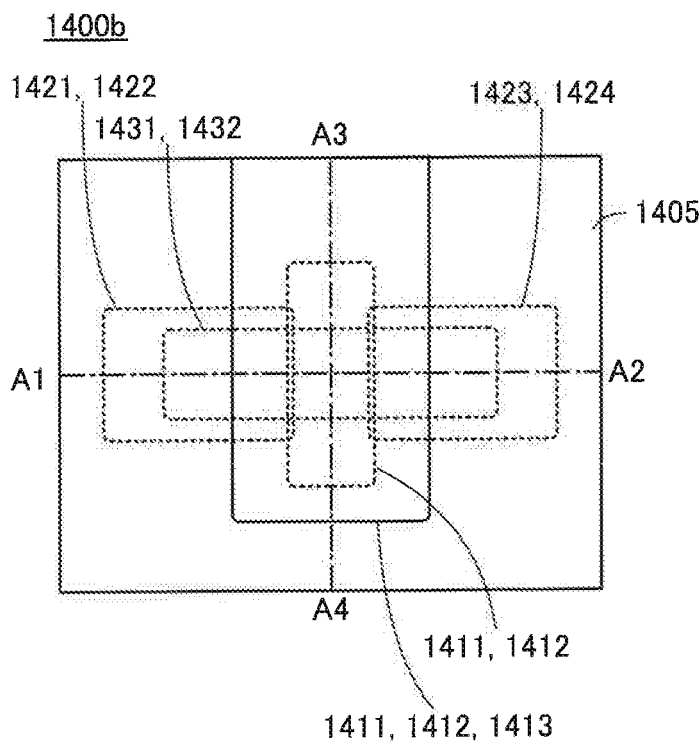
FIG. 35B
FIG. 35C
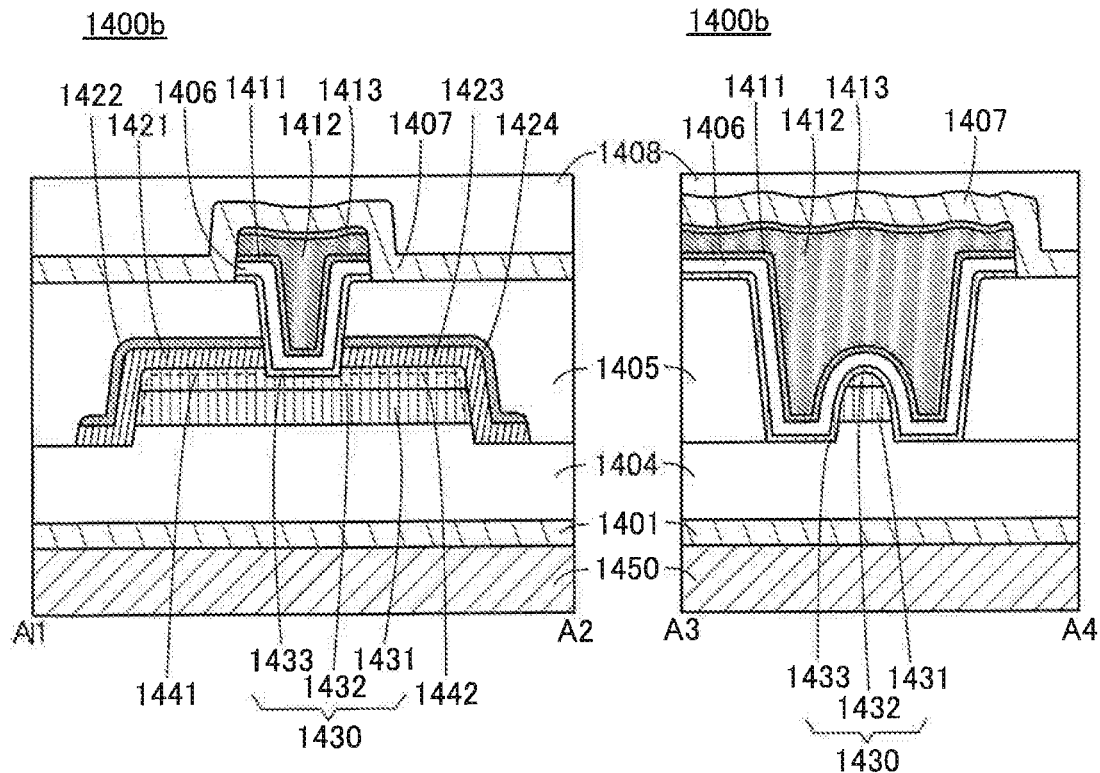

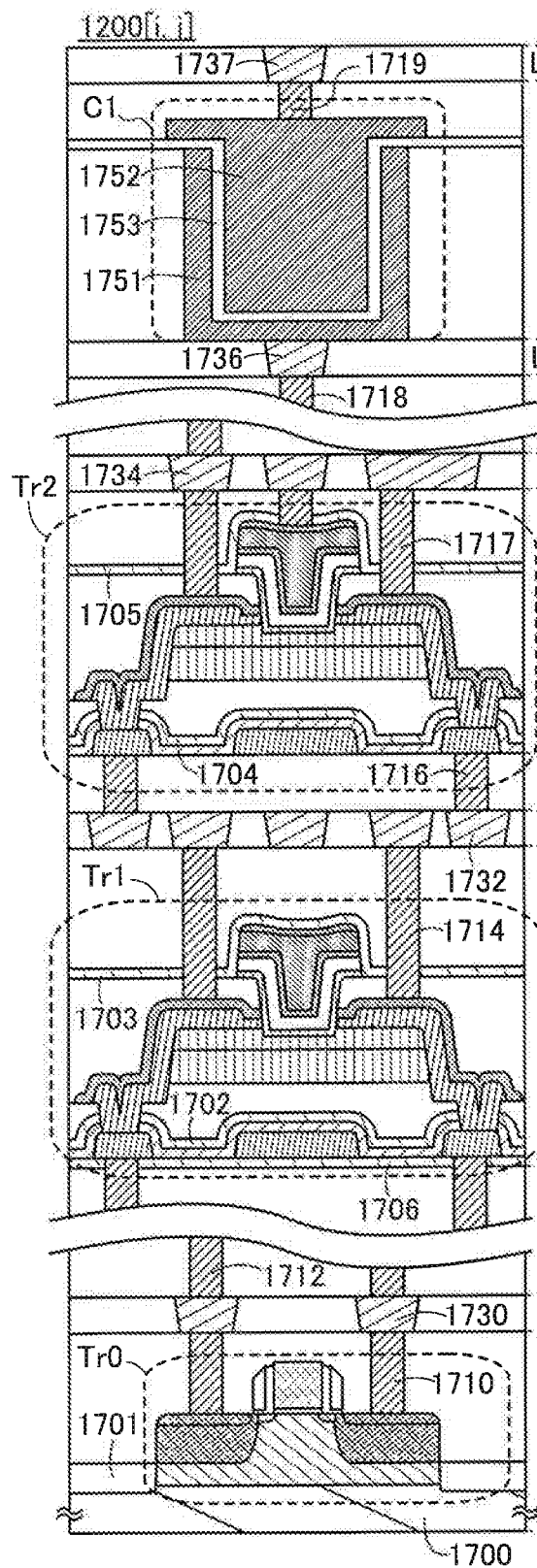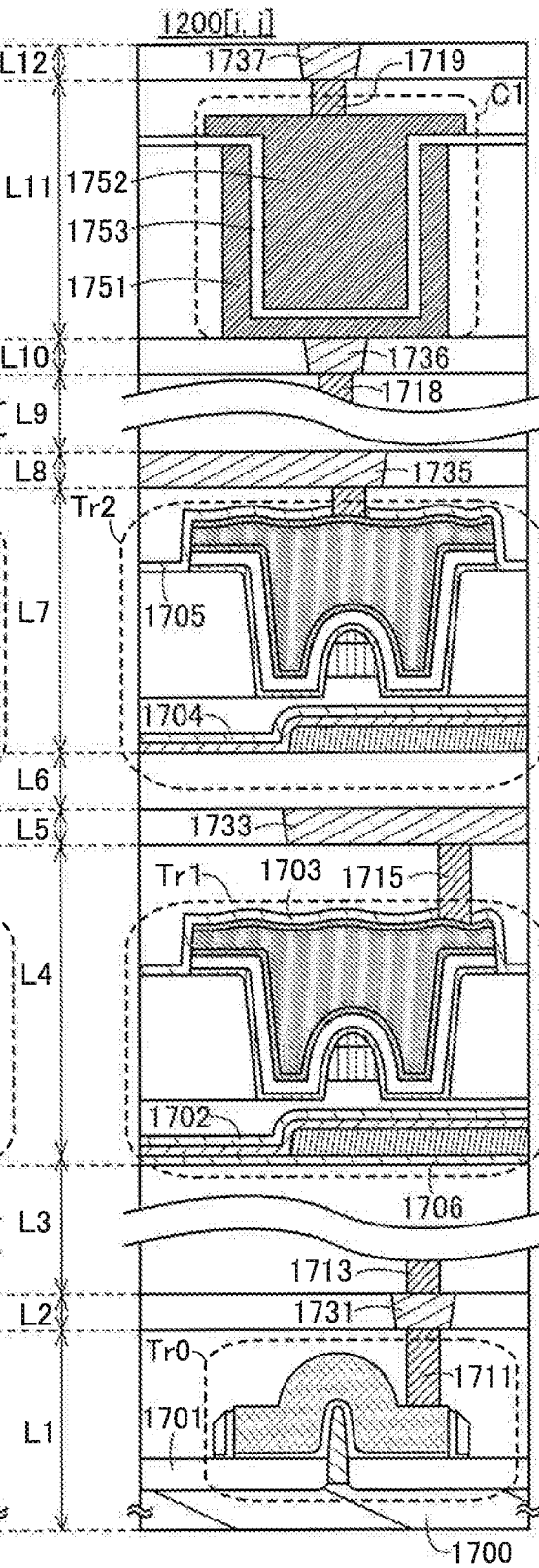

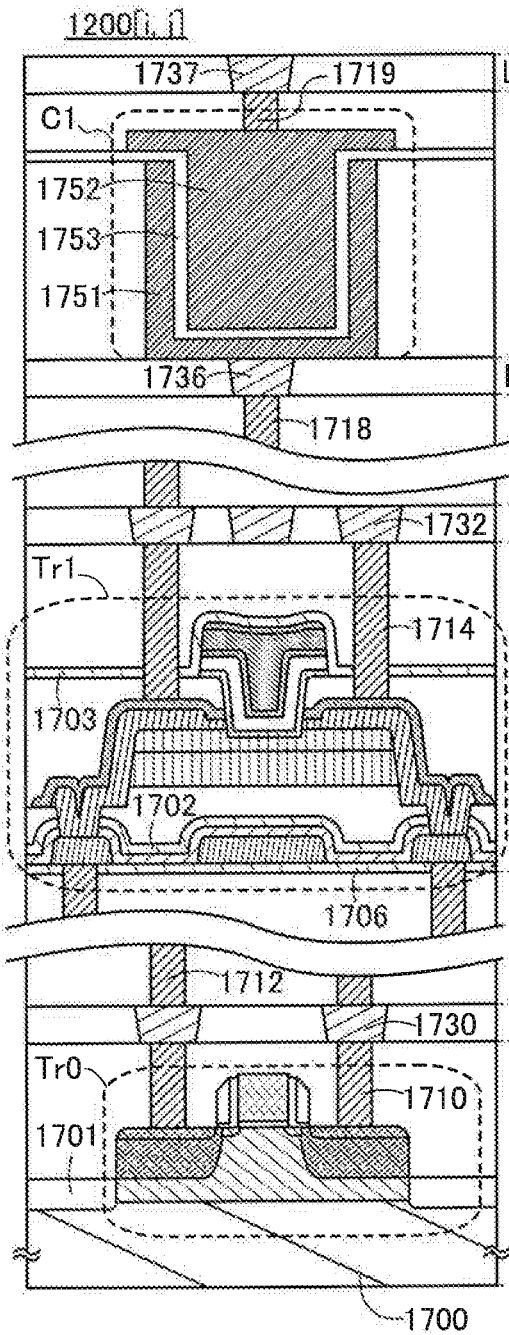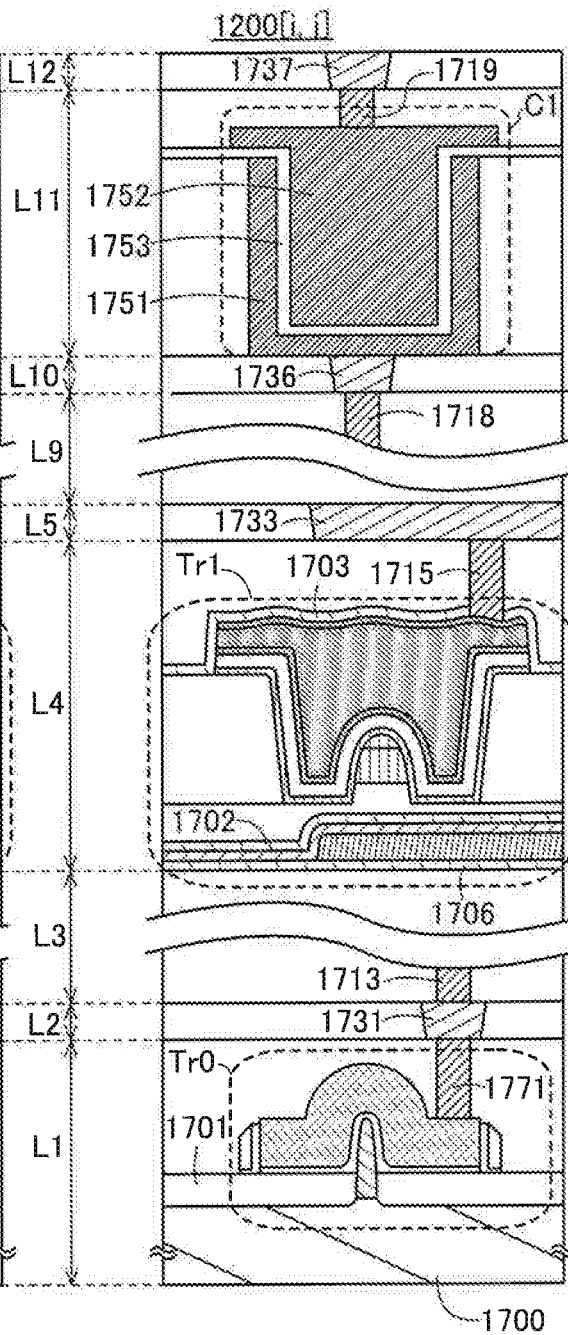

1

SEMICONDUCTOR DEVICE AND SYSTEM THEREOF

One embodiment of the present invention relates to a semiconductor device or a system thereof.

Note that one embodiment of the present invention is not limited to the above technical field. The technical field of the invention disclosed in this specification and the like relates to an object, a method, or a manufacturing method. Alternatively, one embodiment of the present invention relates to a process, a machine, manufacture, or composition (a composition of matter). Specifically, examples of the technical field of one embodiment of the present invention disclosed in this specification include a semiconductor device, a display device, a liquid crystal display device, a light-emitting device, a power storage device, an imaging device, a memory device, a processor, an electronic device, a driving method thereof, a manufacturing method thereof, a testing method thereof, and a system thereof.

BACKGROUND ART

In recent years, semiconductor devices such as memory devices and processors have been used for a variety of electronic devices such as personal computers, tablet terminals, and smartphones. The semiconductor devices are being improved in many aspects such as low power consumption and miniaturization.

One of the ways that have been proposed to achieve lower power consumption, miniaturization, and the like is the use of an oxide semiconductor for a semiconductor layer (hereinafter referred to as an active layer, a channel layer, or a channel formation region in some cases) of a transistor in a semiconductor device. For example, a transistor in which an oxide of indium, gallium, and zinc (hereinafter referred to as an In—Ga—Zn oxide in some cases) is used for a channel layer is given (see Patent Document 1).

Examples of the semiconductor device for which a transistor including an oxide in a channel formation region is used include a memory device and a processor. The transistor has a feature of extremely low off-state current flowing between a source and a drain (hereinafter referred to as a leakage current in some cases), and a memory device including the transistor can retain memory without power supply (see Patent Document 2). Furthermore, when the transistor is used for a processor, high-speed backup and high-speed restore can be achieved and the processor can have reduced power consumption (see Non-Patent Document 1).

PRIOR ART DOCUMENT

Patent Document

[Patent Document 1] Japanese Translation of PCT International Application No. H11-505377
[Patent Document 2] Japanese Published Patent Application No. 2012-256400
[Patent Document 3] Japanese Published Patent Application No. 2012-238126

Non-Patent Document

[Non-Patent Document 1] H. Tamura, K. Kato, T. Ishizu, T. Onuki. W. Uesugi, T. Ohmaru, K. Ohshima, H. Kobayashi, S. Yoneda, A. Isobe, N. Naoaki, S. Honda, Y. Suzuki, Y. Okazaki, T. Atsumi, Y. Shionoiri, Y. Maehashi, G. Goto, M. Fujita, J. Myers, P. Korpinen, J. Koyama, Y. Yamamoto, and S. Yamazaki: "Embedded and Cortex-M0 Core with Backup Circuits Using a 60-nm Crystalline Oxide Semiconductor for Power Gating", COOL Chips XVII, 2014, IEEE.

SUMMARY OF THE INVENTION

Problems to be Solved by the Invention

With a reduction in size of a semiconductor device, an electronic device that is a card in which a semiconductor device or an IC (Integrated Circuit) is incorporated, i.e., a so-called IC card, is widely spread. Specific examples of a card including an IC include a credit card, an electronic money card, an identification card such a driver's license, passage permission for a facility, and an employee ID card of a company. Although not having a form of a card, a passport also includes an IC. Therefore, in this specification, a passport is also given as a form of a card in some cases.

As one of reasons why IC cards have been spread, prevention of unfair use is given. Here, unfair use means, for example, the case of unfair payment with a credit card or an electronic money card of another person, the case of entry to a residence, a facility, or the like by pretense of another person using his/her passage permission, the case of illegal entry into a country by pretense of another person using his/her passport, or the like.

As a means for preventing unfair use given as the above examples, a method of storing a personal identification number or ID (Identification) in an IC card to prevent use of a card by a person other than the identical person. In particular, biometric authentication using a fingerprint, a vein, an iris, a voiceprint, a face shape, or the like as ID has been spread. For example, an application in which a fingerprint recognition device is incorporated in an IC card was filed (Patent Document 3).

In the case where the above-described authentication system is added to a card as described above, a fingerprint authentication sensor, a memory device, a CPU for operating the authentication system, and the like need to be mounted on the card. In other words, the number of semiconductor devices incorporated in the card is increased, so that the circuit area is enlarged. Furthermore, as the number of semiconductor devices and the number of circuits are increased, power consumption of the card is sometimes increased as a result.

As a means of storing ID, a memory device needs to be provided in an IC card. In the case of a volatile memory such as an SRAM (Static Random Access Memory), memory can only be retained by constant power supply; thus, a nonvolatile memory such as a ReRAM (Resistance Random Access Memory) is used. However, conventional nonvolatile memories have high power consumption at the time of writing operation and reading operation; therefore, in the case of a contactless IC card, a primary battery, a battery, or the like (hereinafter, collectively referred to as a battery in some cases) needs to be additionally mounted, and in the case of a contact IC card, external power supply is needed. An expiry date of an IC card is approximately three years to ten years after the issuance, and the IC card needs to include a memory device in which deterioration of memory data does not occur until the expiry date of the IC card.

Note that the above-described usage of the authentication system is not limited to a mode of a card (including a passport). For example, in recent years, mobile phones and smartphones have an electronic money function, a credit function, and the like, and a countermeasure against unfair use of them needs to be made.

An object of one embodiment of the present invention is to provide a novel semiconductor device. Another object of one embodiment of the present invention is to provide an electronic device including the novel semiconductor device. Another object of one embodiment of the present invention is to provide a novel memory device, a novel IC card, a novel system, or the like.

Another object of one embodiment of the present invention is to provide an IC card or an electronic device including a semiconductor device for an authentication system. Another object of one embodiment of the present invention is to provide a semiconductor device with low power consumption, an IC card including the semiconductor device, or an electronic device including the semiconductor device. Another object of one embodiment of the present invention is to provide a semiconductor device capable of retaining memory for a long time, an IC card including the semiconductor device, or an electronic device including the semiconductor device.

Note that the objects of one embodiment of the present invention are not limited to the above objects. The above objects do not disturb the existence of other objects. Note that other objects are the ones that are not described above and will be described below. Other objects will be apparent from and can be derived from the description of the specification, the drawings, and the like by those skilled in the art. Note that one embodiment of the present invention achieves at least one of the above descriptions and the other objects. Note that one embodiment of the present invention does not need to achieve all the above descriptions and the other objects.

Means for Solving the Problems (1)

One embodiment of the present invention is a semiconductor device including a transmission/reception circuit, a control circuit, an analog-to-digital converter circuit, a memory device, and a fingerprint sensor. The semiconductor device characterized in that: the transmission/reception circuit includes an antenna; the control circuit includes a first transistor; the memory device includes a second transistor; the analog-to-digital converter circuit includes a third transistor; at least one of the first to third transistors includes a retention node in one of a source and a drain and an oxide semiconductor in a channel formation region; the memory device stores first digital data that is fingerprint data for comparison and second digital data that is confidential data; the transmission/reception circuit is electrically connected to the control circuit; the control circuit is electrically connected to the fingerprint sensor, the analog-to-digital converter circuit, and the memory device; the fingerprint sensor is electrically connected to the analog-to-digital converter circuit; the transmission/reception circuit has a function of generating a first electrical signal to be input to the control circuit, using an input alternating signal generated by the antenna; the first electrical signal has an instruction for driving the control circuit; the control circuit has a function of, after decoding the electrical signal, transmitting a second electrical signal containing an instruction for reading operation to the memory device and transmitting a third electrical signal containing an driving instruction to the fingerprint sensor; the memory device has a function of reading the first digital data by receiving the second electrical signal and transmitting the first digital data to the control circuit; the fingerprint sensor has a function of obtaining analog data of a fingerprint by receiving the third electrical signal and inputting the analog data to the analog-to-digital converter circuit; the analog-to-digital converter circuit has a function of converting the analog data of the fingerprint into third digital data and transmitting the third digital data to the memory device and the control circuit; the memory device has a function of storing the third digital data; the control circuit has a function of comparing the first digital data and the third digital data; the control circuit has a function of transmitting a fourth electrical signal containing a reading operation instruction to the memory device in the case where the first digital data and the third digital data match each other; the memory device has a function of reading the second digital data by receiving the fourth electrical signal and transmitting the second digital data to the control circuit; the control circuit has a function of transmitting the second digital data to the transmission/reception circuit; and the transmission/reception circuit has a function of modulating the second digital data and transmitting the modulated second digital data from the antenna.

(2)

One embodiment of the present invention is a semiconductor device including an input/output terminal, a control circuit, an analog-to-digital converter circuit, a memory device, and a fingerprint sensor. The semiconductor device characterized in that: the control circuit includes a first transistor; the memory device includes a second transistor; the analog-to-digital converter circuit includes a third transistor; at least one of the first to third transistors includes a retention node in one of a source and a drain and an oxide semiconductor in a channel formation region; the memory device stores first digital data that is fingerprint data for comparison and second digital data that is confidential data; the input/output terminal is electrically connected to the control circuit; the control circuit is electrically connected to the fingerprint sensor, the analog-to-digital converter circuit, and the memory device; the fingerprint sensor is electrically connected to the analog-to-digital converter circuit; the input/output terminal has a function of supplying a first electrical signal to be input to the control circuit, to the inside of the semiconductor device; the first electrical signal has an instruction for driving the control circuit; the control circuit has a function of, after decoding the first electrical signal, transmitting a second electrical signal containing an instruction for reading operation to the memory device and transmitting a third electrical signal containing an driving instruction to the fingerprint sensor; the memory device has a function of reading the first digital data by receiving the second electrical signal and transmitting the first digital data to the control circuit; the fingerprint sensor has a function of obtaining analog data of a fingerprint by receiving the third electrical signal and inputting the analog data to the analog-to-digital converter circuit; the analog-to-digital converter circuit has a function of converting the analog data of the fingerprint into third digital data and transmitting the third digital data to the memory device and the control circuit; the memory device has a function of storing the third digital data; the control circuit has a function of comparing the first digital data and the third digital data; the control circuit has a function of transmitting a fourth electrical signal containing a reading operation instruction to the memory device in the case where the first digital data and the third digital data match each other; the memory device has a function of reading the second digital data by receiving the fourth electrical signal and transmitting the second digital data to the control circuit; and the control circuit has a function of transmitting the second digital data to the outside through the input/output terminal.

(3)

One embodiment of the present invention is the semiconductor device according to (1), further including an input/output terminal. The semiconductor device characterized in that: the input/output terminal is electrically connected to the control circuit; the input/output terminal has a function of inputting a fifth electrical signal from the outside of the semiconductor device to the control circuit; the fifth electrical signal has an instruction for driving the control circuit; the control circuit has a function of, after decoding the fifth electrical signal, transmitting the second electrical signal containing an instruction for reading operation to the memory device and transmitting the third electrical signal containing a driving instruction to the fingerprint sensor; and the control circuit has a function of transmitting the second digital data to the outside through the input/output terminal by receiving the second digital data.

(4)

One embodiment of the present invention is the semiconductor device according to (3), further comprising a display portion, an operation key, and a housing. The semiconductor device characterized in that: the display portion is electrically connected to the control circuit; and the operation key is electrically connected to the control circuit.

(5)

One embodiment of the present invention is the semiconductor device according to (4) characterized in that the display portion has a touch sensor function.

(6)

One embodiment of the present invention is the semiconductor device according to (4) or (5) characterized in that the housing has a structure which can be worn on a surface of a living thing or a surface of an inanimate object.

(7)

One embodiment of the present invention is the semiconductor device according to any one of (1) to (6), further including a capacitor, characterized in that the capacitor has a function of retaining a voltage of at least one of the retention nodes.

(8)

One embodiment of the present invention is the semiconductor device according to any one of (1) to (7), characterized in that: the memory device includes a first memory region and a second memory region; the first memory region is a region where writing operation and reading operation of data are performed; the second memory region is a region where only reading operation of data is performed; and the memory device has a function of storing the third digital data in the first memory region and a function of retaining the first digital data and the second digital data in the second memory region.

(9)

One embodiment of the present invention is a system including a semiconductor device, a first external device, and a second external device. The system characterized in that: the semiconductor device includes a transmission/reception circuit, a control circuit, and a memory device; the transmission/reception circuit includes a first antenna; the first external device includes a second antenna; the second external device includes a biological sensor; the control circuit includes a first transistor; the memory device includes a second transistor; at least one of the first transistor and the second transistor includes a retention node in one of a source and a drain and an oxide semiconductor in a channel formation region; the memory device stores first digital data that is biometric data for comparison and second digital data that is confidential data; the transmission/reception circuit is electrically connected to the control circuit; the control circuit is electrically connected to the memory device; the first external device is electrically connected to the second external device; the transmission/reception circuit has a function of generating a first electrical signal to be input to the control circuit, using an input alternating signal generated by the first antenna; the first electrical signal has an instruction for driving the control circuit; the control circuit has a function of, after decoding the first electrical signal, transmitting a second electrical signal containing an instruction for reading operation to the memory device and transmitting a third electrical signal containing a driving instruction for the second external device to the transmission/reception circuit; the memory device has a function of reading the first digital data by receiving the second electrical signal and transmitting the first digital data to the control circuit; the transmission/reception circuit has a function of transmitting the modulated third electrical signal from the first antenna to the second antenna by receiving the third electrical signal; the first external device has a function of transmitting the third electrical signal to the second external device; the second external device has a function of starting up the biological sensor by receiving the third electrical signal and obtaining third digital data that is biometric data and a function of transmitting the third digital data to the first external device; the first external device has a function of transmitting the third digital data from the second antenna to the first antenna; the transmission/reception circuit has a function of demodulating the third digital data received by the first antenna and transmitting the demodulated third digital data to the control circuit; the control circuit has a function of transmitting the third digital data to the memory device and storing the third digital data to the memory device; the control circuit has a function of comparing the first digital data and the third digital data; the control circuit has a function of transmitting a fourth electrical signal containing a reading operation instruction to the memory device in the case where the first digital data and the third digital data match each other; the memory device has a function of reading the second digital data by receiving the fourth electrical signal and transmitting the second digital data to the control circuit; the control circuit has a function of transmitting the second digital data to the transmission/reception circuit; and the transmission/reception circuit has a function of modulating the second digital data and transmitting the modulated second digital data from the first antenna to the second antenna.

(10)

One embodiment of the present invention is a system including a semiconductor device, a first external device, and a second external device. The system characterized in that: the semiconductor device includes an input/output terminal, a control circuit, and a memory device; the first external device includes a connection port; the second external device includes a biological sensor; the control circuit includes a first transistor; the memory device includes a second transistor; at least one of the first transistor and the second transistor includes a retention node in one of a source and a drain and an oxide semiconductor in a channel formation region; the memory device stores first digital data that is biometric data for comparison and second digital data that is confidential data; the input/output terminal is electrically connected to the control circuit; the control circuit is electrically connected to the memory device; the first external device is electrically connected to the second external device; the first external device and the input/output terminal are electrically connected to each other by attaching the semiconductor device to the connection port; the input/output terminal has a function of supplying a first electrical signal to be input to the control circuit, from the first external device to the inside of the semiconductor device; the first electrical signal has an instruction for driving the control circuit; the control circuit has a function of, after decoding the first electrical signal, transmitting a second electrical signal containing an instruction for reading operation to the memory device and transmitting a third electrical signal containing a driving instruction for the second external device to the first external device through the input/output terminal; the memory device has a function of reading the first digital data by receiving the second electrical signal and transmitting the first digital data to the control circuit; the first external device has a function of transmitting the third electrical signal to the second external device; the second external device has a function of starting up the biological sensor by receiving the third electrical signal and obtaining third digital data that is biometric data and a function of transmitting the third digital data to the first external device; the first external device has a function of transmitting the third digital data to the control circuit through the input/output terminal; the control circuit has a function of transmitting the third digital data to the memory device and storing the third digital data to the memory device; the control circuit has a function of comparing the first digital data and the third digital data; the control circuit has a function of transmitting a fourth electrical signal containing a reading operation instruction to the memory device in the case where the first digital data and the third digital data match each other; the memory device has a function of reading the second digital data by receiving the fourth electrical signal and transmitting the second digital data to the control circuit; and the control circuit has a function of transmitting the second digital data to the first external device through the input/output terminal.

(11)

One embodiment of the present invention is the system according to (9) or (10), characterized in that the first external device and the second external device are stored in a same housing to form a device.

(12)

One embodiment of the present invention is the system according to (9), characterized in that: the first external device and the second external device are stored in a same first housing to form a device; and the semiconductor device further includes a display portion, an operation key, and a second housing.

(13)

One embodiment of the present invention is the system according to (12), characterized in that the display portion of the semiconductor device has a touch sensor function.

(14)

One embodiment of the present invention is the system according to (12) or (13), characterized in that the second housing includes a structure which can be worn on a surface of a living thing or a surface of an inanimate object.

(15)

One embodiment of the present invention is the system according to any one of (9), (10), (12), and (13), characterized in that the biometric data is data relating to at least one of a fingerprint, a palmar crease, a handprint, a vein of a finger or a hand, a voiceprint, an iris, a face shape, and a gene.

(16)

One embodiment of the present invention is the system according to any one of (9), (10), (12), and (13), characterized in that the semiconductor device includes a capacitor; and the capacitor has a function of retaining a voltage of at least one of the retention nodes.

(17)

One embodiment of the present invention is the system according to any one of (9), (10), (12), and (13), characterized in that: the memory device includes a first memory region and a second memory region; the first memory region is a region where writing operation and reading operation of data are performed; the second memory region is a region where only reading operation of data is performed; and the memory device has a function of storing the third digital data in the first memory region and a function of retaining the first digital data and the second digital data in the second memory region.

Effect of the Invention

According to one embodiment of the present invention, a novel semiconductor device can be provided. Alternatively, according to one embodiment of the present invention, an electronic device including the novel semiconductor device can be provided. Alternatively, according to one embodiment of the present invention, a novel memory device, a novel IC card, a novel system, or the like can be provided. Alternatively, according to one embodiment of the present invention, an IC card or an electronic device including a semiconductor device for authentication system can be provided. Alternatively, according to one embodiment of the present invention, a semiconductor device with low power consumption, a card including the semiconductor device, and an electronic device including the semiconductor device can be provided. Alternatively, according to one embodiment of the present invention, a semiconductor device capable of retaining memory for a long time, an IC card including the semiconductor device, and an electronic device including the semiconductor device can be provided.

Note that the effects of one embodiment of the present invention are not limited to the above effects. The effects described above do not disturb the existence of other effects. Note that other effects are the ones that are not described above and will be described below. Other effects will be apparent from and can be derived from the description of the specification, the drawings, and the like by those skilled in the art. Note that one embodiment of the present invention has at least one of the above effects and other effects. Accordingly, one embodiment of the present invention does not have the aforementioned effects in some cases.

BRIEF DESCRIPTION OF DRAWINGS

FIG. 1 Block diagrams illustrating an example of a semiconductor device.

FIG. 7 Block diagrams illustrating an example of a semiconductor device.

FIG. 31 Block diagrams illustrating parts of an analog-to-digital converter circuit.

FIG. 35 A top view and cross-sectional views illustrating a structural example of a transistor.

FIG. 40 Cross-sectional views illustrating a structural example of a memory cell.

FIG. 41 Cross-sectional views illustrating a structural example of a memory cell.

MODE FOR CARRYING OUT THE INVENTION

In this specification, an oxide semiconductor is referred to as an OS (Oxide Semiconductor) in some cases. Thus, a transistor including the oxide semiconductor in a channel formation region is referred to as an OS transistor in some cases. A memory including the OS transistor is referred to as an OS memory in some cases. A memory device including the memory is referred to as an OS memory device in some cases. An analog-to-digital converter circuit including the OS transistor is referred to as an OS analog-to-digital converter circuit in some cases. A CPU including the OS transistor is referred to as an OS-CPU in some cases.

Embodiment 1

Structural Example 1

Figure 2A:
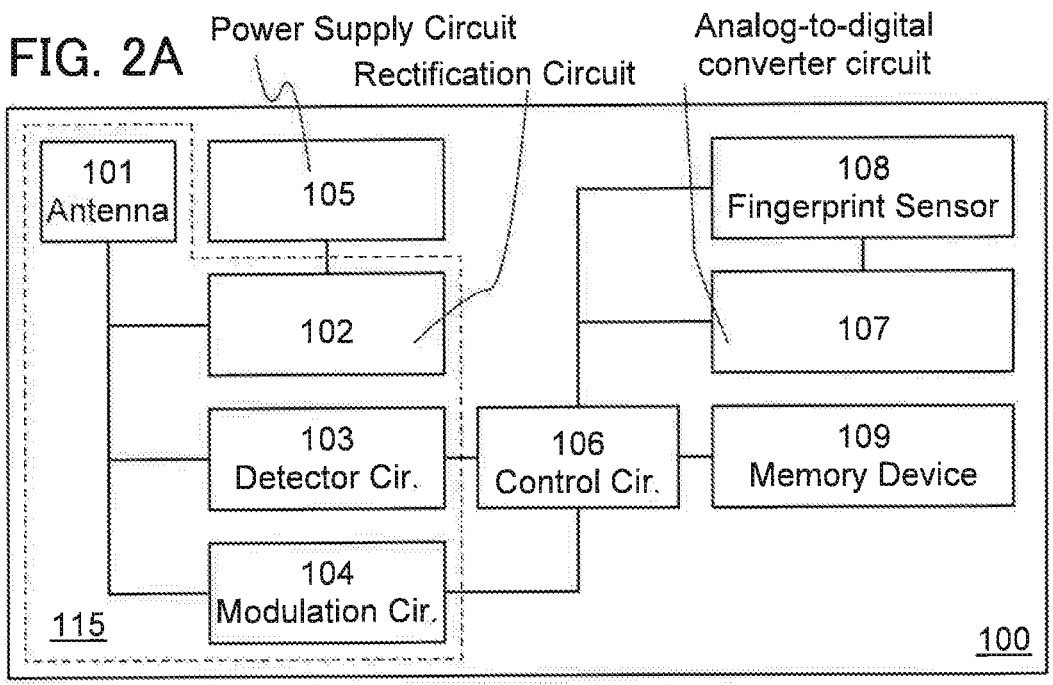
FIG. 2 Block diagrams illustrating an example of a semiconductor device.
Figure 2B:
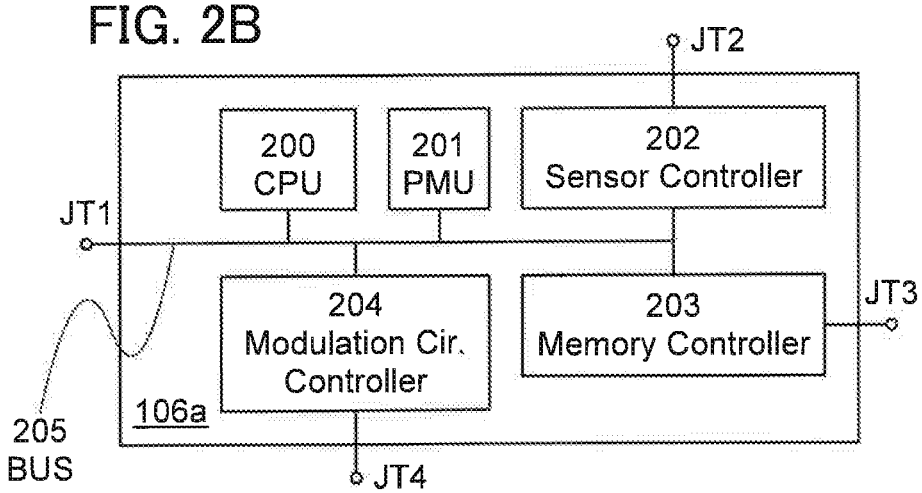

FIG. 2(A) and FIG. 2(B) are block diagrams showing an example of a semiconductor device of the disclosed invention. A semiconductor device 100 is a card for performing authentication by contactless communication.

The semiconductor device 100 includes a transmission/reception circuit 115, a power supply circuit 105, a control circuit 106, an analog-to-digital converter circuit 107, a fingerprint sensor 108, and a memory device 109. The transmission/reception circuit 115 includes an antenna 101, a rectification circuit 102, a detector circuit 103, and a modulation circuit 104.

The antenna 101 is electrically connected to the rectification circuit 102, the detector circuit 103, and the modulation circuit 104. The rectification circuit 102 is electrically connected to the power supply circuit 105. The control circuit 106 is electrically connected to the detector circuit 103, the modulation circuit 104, the analog-to-digital converter circuit 107, the fingerprint sensor 108, and the memory device 109.

The antenna 101 transmits and receives a wireless signal. Specifically, the antenna 101 has a function of receiving a wireless signal containing external data or an instruction for driving the semiconductor device 100 and converting the wireless signal into an electrical signal and a function of converting an electrical signal containing data included in the semiconductor device 100 into a wireless signal and transmitting the wireless signal to the outside.

The rectification circuit 102 is a circuit for generating an input potential by rectification, for example, half-wave voltage doubler rectification of an input alternating signal generated by reception of the wireless signal at the antenna 101 and smoothing of the rectified signal with a capacitor provided in a later stage. Although not illustrated in FIG. 2(A), a limiter circuit may be provided on the input side or the output side of the rectification circuit 102. The limiter circuit controls electric power so that electric power which is higher than or equal to certain electric power is not input to a circuit in a later stage if the amplitude of the input alternating signal is high and an internal generation voltage is high.

The power supply circuit 105 is a circuit for generating a stable power supply voltage from a potential input from the rectification circuit 102. Note that although not illustrated in FIG. 2(A), the power supply circuit 105 is electrically connected to the circuits to supply a power supply voltage to the circuits. Furthermore, a reset signal generation circuit may be provided inside the power supply circuit 105. The reset signal generation circuit is a circuit for generating a reset signal of a logic circuit (a CPU 200 described later) included in the control circuit 106 by utilizing rise of the stable power supply voltage.

The detector circuit 103 is a circuit for demodulating the input alternating signal from the antenna 101 by envelope detection and generates a demodulated signal.

The modulation circuit 104 is a circuit for performing modulation in accordance with data to be output from the antenna 101 to the outside.

The control circuit 106 is a circuit for decoding data contained in a demodulated signal from the detector circuit 103 and transmitting an operation signal to the circuits. Note that as a structural example of the control circuit 106, a control circuit 106*a* is shown in FIG. 2(B). The control circuit 106*a* includes the CPU 200, a power management unit 201, a sensor controller 202, a memory controller 203, a modulation circuit controller 204, and a bus 205. The CPU 200, the power management unit 201, the sensor controller 202, the memory controller 203, and the modulation circuit controller 204 are electrically connected to the bus 205. The bus 205 is electrically connected to the detector circuit 103 through a connection terminal JT1. The sensor controller 202 is electrically connected to the fingerprint sensor 108 and the analog-to-digital converter circuit 107 through a connection terminal JT2. The memory controller 203 is electrically connected to the memory device 109 through a connection terminal JT3. The modulation circuit controller 204 is electrically connected to the modulation circuit 104 through a connection terminal JT4.

The CPU 200 is a device that performs numerical calculation, information processing, device control, and the like. Specifically, the CPU 200 is a device that decodes an electrical signal transmitted from the detector circuit 103 and transmits an operation signal to the circuits on the basis of decoded contents. Furthermore, an OS transistor is preferably used for the CPU 200 to prevent an increase in power consumption of the CPU and an increase in leakage current due to miniaturization. Note that the CPU including an OS transistor will be described in Embodiment 5. Furthermore, the OS transistor will be described in Embodiment 9.

The power management unit 201 is a device that controls power for the circuits in the control circuit 106*a*.

The sensor controller 202 is a device that controls the analog-to-digital converter circuit 107 and the fingerprint sensor 108. Specifically, the sensor controller 202 has a function of communicating a signal between the CPU 200 and the analog-to-digital converter circuit 107 or the fingerprint sensor 108, a function of transmitting an operation signal to the analog-to-digital converter circuit 107 and the fingerprint sensor 108, and a function of receiving fingerprint data from the analog-to-digital converter circuit 107 and the fingerprint sensor 108 and transmitting the fingerprint data to a certain circuit in the control circuit 106*a*.

The memory controller 203 is a device that controls the memory device 109. Specifically, the memory controller 203 has a function of communicating a signal between the CPU 200 and the memory device 109. The memory controller 203 has a function of, when writing data to the memory device 109 is performed, transmitting a signal of a writing instruction and data to be written to the memory device 109, and the memory controller 203 has a function of, when reading data from the memory device 109 is performed, transmitting a signal of a reading instruction to the memory device 109, receiving data read from the memory device 109, and transmitting the read data to a certain circuit in the control circuit 106*a*.

The modulation circuit controller 204 is a device that controls the modulation circuit 104. Specifically, the modulation circuit controller 204 has a function of communicating a signal between the CPU 200 and the modulation circuit 104. The modulation circuit controller 204 has a function of, when the modulation circuit 104 receives a signal from the CPU 200, receiving data to be transmitted to the outside of the semiconductor device 100 and transmitting the data to the modulation circuit 104.

The fingerprint sensor 108 is a device that reads a fingerprint in contact when receiving an operation signal from the control circuit 106*a*.

The analog-to-digital converter circuit 107 is a circuit for converting a fingerprint read by the fingerprint sensor 108 into digital data (hereinafter referred to as data to be compared in some cases). Furthermore, although described in detail in Embodiment 8, a sample-and-hold circuit including an OS transistor is used for an analog digital circuit, which leads to lower power consumption.

The memory device 109 is a device that stores fingerprint data converted into digital data. The memory device 109 is also a device that stores confidential information such as fingerprint data of a holder of the semiconductor device 100 to perform authentication of data to be compared (hereinafter referred to as data for comparison in some cases) or credit card information.

A device that stores data to be compared is preferably a volatile memory such as a DRAM (Dynamic Random Access Memory) because the data to be compared becomes unnecessary after the authentication. In particular, when power consumption is desired to be reduced, the device that stores data to be compared is preferably an SRAM.

Meanwhile, in the case of data for comparison, card information, or the like, the data for comparison, card information, or the like does not need to be rewritten because the holder of the semiconductor device 100 is not changed. Therefore, a device that stores data for comparison, card information, or the like is preferably a ROM (Read Only Memory) such as a ReRAM. Accordingly, it is preferable that the memory device 109 include a volatile memory 109*a* capable of performing writing and reading and a nonvolatile memory 109*b* that is a read only memory as illustrated in a block diagram of FIG. 2(C), and that the volatile memory 109*a* and the nonvolatile memory 109*b* be electrically connected to the connection terminal JT3.

In particular, in the case where reduced power consumption and long-term retention of data for comparison are desired, it is more preferable to use a memory device including an OS transistor in a memory cell. Note that the memory cell including the OS transistor will be described in Embodiment 7, and the memory device will be described in Embodiment 6. In addition, the OS transistor will be described in Embodiment 9.

FIG. 1(A) and FIG. 1(B) show an example where an OS transistor is used for the semiconductor device 100. A semiconductor device 150 in FIG. 1(A) has a structure where the analog-to-digital converter circuit 107 in the semiconductor device 100 is replaced with an OS analog-to-digital converter circuit 157 and the memory device 109 is replaced with an OS memory device 159. Furthermore, as a structural example of the control circuit 106, a control circuit 106b in FIG. 1(B) is shown. The control circuit 106b has a structure where the CPU 200 in the control circuit 106a of the semiconductor device 100 is replaced with an OS-CPU 211.

Operation Example 1

Next, an operation example of the semiconductor device 100 described in Structural example 1 is described.

Figure 3A:
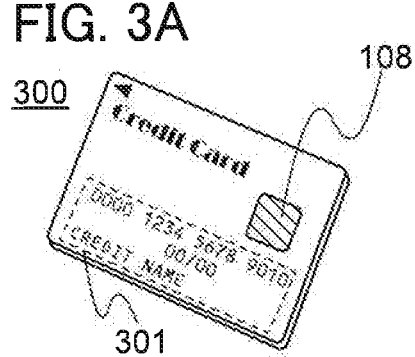
FIG. 3 Diagrams illustrating a semiconductor device and an operation example thereof.

FIG. 3(A) shows the appearance of a semiconductor device having the structure of the block diagram of the semiconductor device 100 in FIG. 2(A). Note that in this operation example, a credit card is given as an example of a semiconductor device 300. The semiconductor device 300 includes a printed portion 301 and the fingerprint sensor 108. On the printed portion 301, a card number, an expiry date, a name of a cardholder, and the like are printed.

Figure 3B:
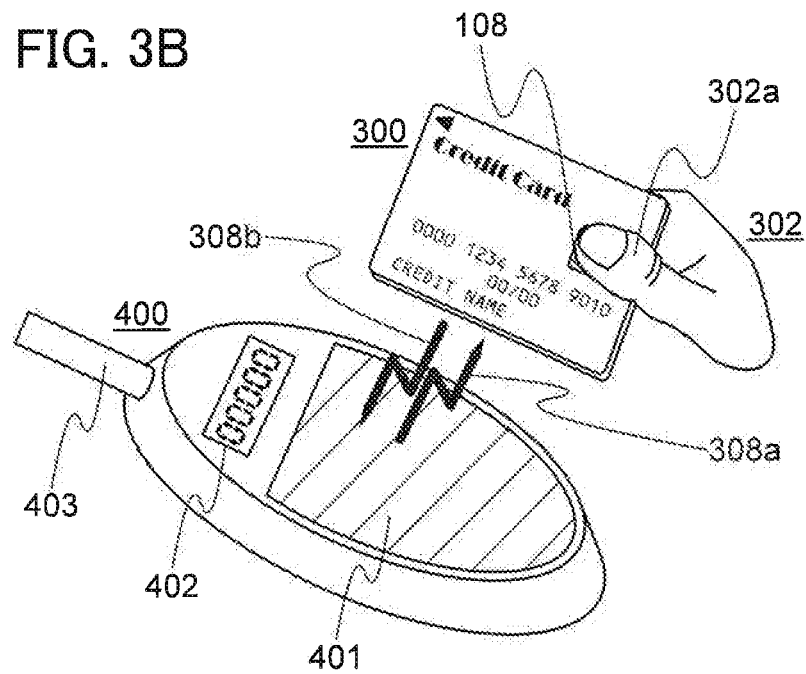

FIG. 3(B) shows an operation example of the semiconductor device 300 and an external device that communicates with the semiconductor device 300. A contactless card reader 400 that is the external device includes a reading portion 401, a display portion 402, and a wiring 403. The display portion 402 displays a payment amount, response whether communication between the semiconductor device 300 and the contactless card reader was able to be established, error description, an error code, or the like. Note that the contactless card reader 400 may be configured not to include the display portion 402.

FIG. 3(B) illustrates a state where the semiconductor device 300 is held by a hand 302 and communication with the contactless card reader 400 is performed while a finger 302a is in contact with the fingerprint sensor 108.

When payment is made with a credit card, the contactless card reader 400 is started up with operation by a store clerk. Specifically, by operation using a cash register or the like on the store side, the contactless card reader 400 is started up and set in a standby mode through the wiring 403. The standby mode means a state where a wireless signal 308a is transmitted from the reading portion 401.

When the contactless card reader 400 is set in the standby mode, a consumer holds the semiconductor device 300 over the reading portion 401. At this time, the semiconductor device 300 receives the wireless signal 308a with the antenna 101. The received wireless signal 308a is converted into an alternating-current electrical signal by the antenna 101 and transmitted to the rectification circuit 102 and the detector circuit 103.

The rectification circuit 102 rectifies the transmitted alternating-current electrical signal and generates an input potential to be input to the power supply circuit 105. The power supply circuit 105 can supply electric power to the circuits in the semiconductor device 300 by receiving the input potential.

The detector circuit 103 demodulates the transmitted alternating-current electrical signal by envelope detection and generates a demodulated signal. The demodulated signal is transmitted to the CPU 200 in the control circuit 106a, and an operation instruction contained in the demodulated signal is decoded. After decoding the operation instruction, the CPU 200 transmits an instruction for reading data for comparison to the memory device 109 through the memory controller 203. The memory device 109 transmits the data for comparison to the reading CPU 200 by receiving the instruction.

After obtaining the data for comparison, the CPU 200 transmits an operation signal to the fingerprint sensor 108 through the sensor controller 202. The fingerprint sensor 108 obtains fingerprint data by receiving the operation signal. Note that although timing when the finger 302a is in contact with the fingerprint sensor 108 is not particularly limited, the finger 302a is preferably in contact with the fingerprint sensor 108 while the semiconductor device 300 is held over the reading portion 401, since electric power is supplied to the semiconductor device 300 by the wireless signal 308a. Furthermore, the display portion 402 may have a function of displaying and notifying the timing. The fingerprint sensor 108 obtains a fingerprint of the finger 302a, and the obtained fingerprint data is converted into digital data by the analog-to-digital converter circuit 107. Then, then, the fingerprint data (data to be compared) converted into digital data is transmitted to the CPU 200 through the sensor controller 202.

The CPU 200 receives the data to be compared and then temporarily stores it in the memory device 109. The CPU 200 performs calculation for comparing the data for comparison which is read from the memory device 109 and the data to be compared which is obtained by the fingerprint sensor 108. In the case where the data for comparison and the data to be compared do not match each other, the CPU 200 transmits an operation signal to the fingerprint sensor 108 again and newly obtains data to be compared. Next, the data to be compared which has been temporarily stored in the memory device 109 is overwritten with the newly obtained data to be compared, and the CPU 200 performs comparison calculation between the data for comparison and the data to be compared again. These operations are repeated until data for comparison and data to be compared match each other.

In the case where the data for comparison and the data to be compared match each other, the CPU 200 reads credit card information such as a credit card number, an expiry date, and a credit card holder's name from the memory device 109 and transmits the information to the modulation circuit 104 through the modulation circuit controller 204.

Note that one of methods of comparison calculation is a method utilizing a neural network. A neural network is an information processing system modeled on a neural network, and it is considered that pattern recognition, associative storage, and the like can be performed at high speed. That is, the use of the neural network enables high-speed authentication of a fingerprint in some cases.

By the modulation circuit 104, modulation processing is performed on an electrical signal containing a credit card number, an expiry date, a credit card holder's name, and the like. After that, a modulated electrical signal is transmitted to the antenna 101.

After receiving the modulated electrical signal, the antenna 101 converts the electrical signal into a wireless signal 308b and transmits the wireless signal 308b to the contactless card reader 400. After receiving the wireless signal 308b, the contactless card reader 400 transmits information such as a credit card number, an expiry date, and a credit card holder's name to a device such as a cash register through the wiring 403.

By providing a fingerprint sensor in a credit card in such a manner, unfair use of the credit card by a person other than the identical person can be prevented.

Note that although the description is made using the semiconductor device 100 as an example in this operation example, this embodiment is not limited thereto. For example, the semiconductor device 150 including an OS transistor can be operated in a similar manner. Furthermore, the use of the OS transistor can reduce power consumption compared to the semiconductor device 100.

Note that although the description is made using a credit card as an example in this operation example, this embodiment is not limited thereto. For example, the above system may be used for an electronic money card. By adding an authentication system to an electronic money card, payment with electronic money by a person other than the identical person can be prevented. Furthermore, the contactless card reader 400 may be provided at an entrance of an area which only authorized persons can enter, e.g., a residence, an office, or a commercial facility so that authentication is performed with the semiconductor device 300. With such a structure, entry of a person other than the authorized persons to a keep-out area with the semiconductor device 300 can be prevented.

Note that this embodiment can be combined with the other embodiments shown in this specification as appropriate.

Embodiment 2

Structural Example 2

Figure 4A:
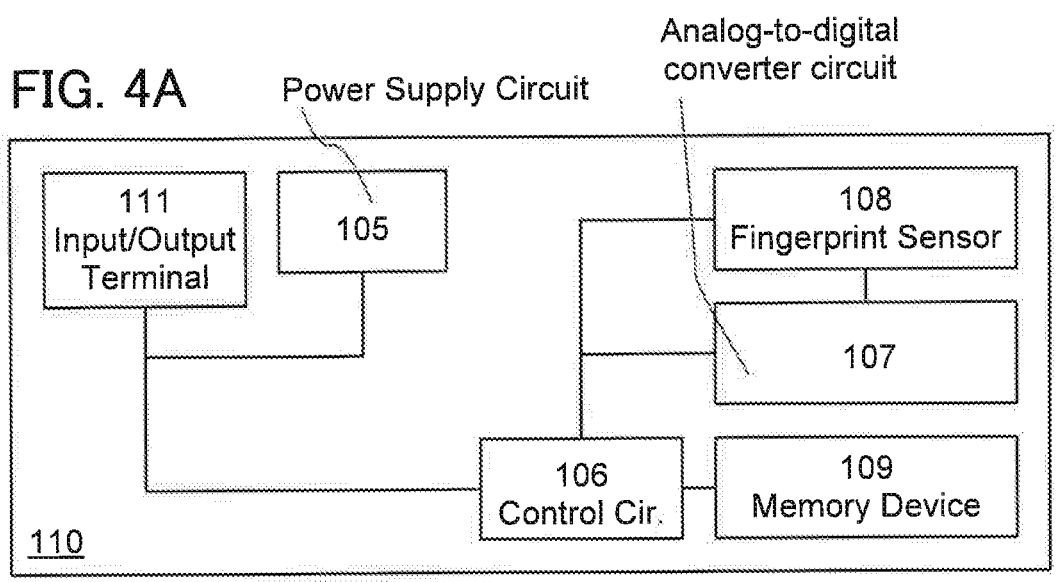
FIG. 4 Block diagrams illustrating an example of a semiconductor device.
Figure 4B:
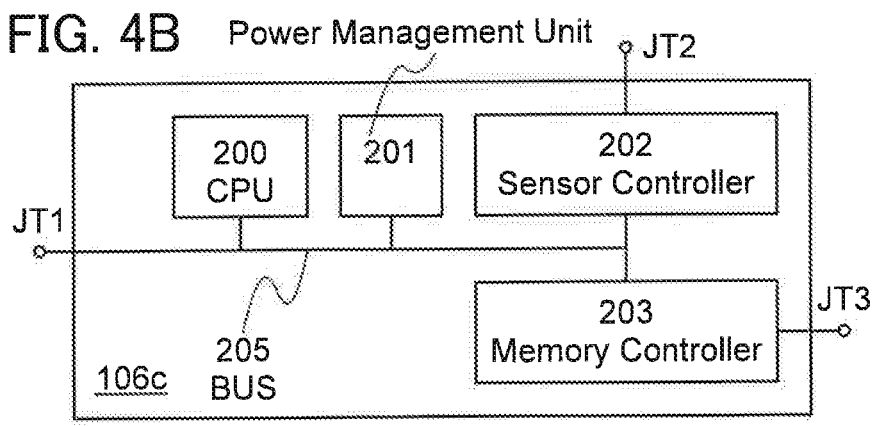

FIG. 4(A) and FIG. 4(B) are block diagrams showing an example of a semiconductor device of the disclosed invention. A semiconductor device 110 is a card for performing authentication by contact communication.

The semiconductor device 110 includes an input/output terminal 111, the power supply circuit 105, the control circuit 106, the analog-to-digital converter circuit 107, the fingerprint sensor 108, and the memory device 109.

The input/output terminal 111 is electrically connected to the power supply circuit 105 and the control circuit 106. The control circuit 106 is electrically connected to the analog-to-digital converter circuit 107, the fingerprint sensor 108, and the memory device 109.

The input/output terminal 111 is a terminal for connection with an external device and can make the semiconductor device 110 perform input and output by an electrical signal.

The power supply circuit 105 generates a stable power supply voltage from a potential input from the input/output terminal 111. Although not illustrated in FIG. 4(A), the power supply circuit 105 is electrically connected to the circuits to supply a power supply voltage to the circuits. Note that in the case where the stable power supply voltage can be supplied to the semiconductor device 110 from the external device side, the power supply circuit 105 does not necessarily have a function of generating a power supply voltage and may have only a function of supplying a power supply voltage to circuits. Furthermore, a reset signal generation circuit may be provided in the power supply circuit 105. The reset signal generation circuit is a circuit for generating a reset signal of a logic circuit (the CPU 200 described later) included in the control circuit 106 by utilizing rise of the stable power supply voltage.

The control circuit 106 is a circuit for decoding data contained in an electrical signal from the input/output terminal 111 and transmitting an operation signal to the circuits. Note that as a structural example of the control circuit 106, a control circuit 106c is shown in FIG. 4(B). The control circuit 106c includes the CPU 200, the power management unit 201, the sensor controller 202, the memory controller 203, and the bus 205. The CPU 200, the power management unit 201, the sensor controller 202, and the memory controller 203 are electrically connected to the bus 205. The bus 205 is electrically connected to the detector circuit 103 through the connection terminal JT1. The sensor controller 202 is electrically connected to the fingerprint sensor 108 and the analog-to-digital converter circuit 107 through the connection terminal JT2. The memory controller 203 is electrically connected to the memory device 109 through the connection terminal JT3.

The CPU 200 is a device that performs numerical calculation, information processing, device control, and the like. Specifically, the CPU 200 is a device that decodes an electrical signal transmitted from the detector circuit 103 and transmits an operation signal to the circuits on the basis of decoded contents. Furthermore, the details will be described in Embodiment 5. The CPU 200 preferably includes a flip-flop circuit capable of backup or an SRAM cell capable of backup in order that information held by the CPU 200 is stored only for a short time. In particular, the flip-flop circuit capable of backup and the SRAM cell preferably include an OS transistor. Thus, the transistor can have a low off-state current and can store data for a long time without power supply.

The power management unit 201 is a device that controls power for the circuits in the control circuit 106c.

The sensor controller 202 is a device that controls the analog-to-digital converter circuit 107 and the fingerprint sensor 108. Specifically, the sensor controller 202 has a function of communicating a signal between the CPU 200 and the analog-to-digital converter circuit 107 or the fingerprint sensor 108, a function of transmitting an operation signal to the analog-to-digital converter circuit 107 and the fingerprint sensor 108, and a function of receiving fingerprint data from the analog-to-digital converter circuit 107 and the fingerprint sensor 108 and transmitting the fingerprint data to a certain circuit in the control circuit 106c.

The memory controller 203 is a device that controls the memory device 109. Specifically, the memory controller 203 has a function of communicating a signal between the CPU 200 and the memory device 109. The memory controller 203 has a function of, when writing data to the memory device 109 is performed, transmitting a signal of a writing instruction and data to be written to the memory device 109, and the memory controller 203 has a function of, when reading data from the memory device 109 is performed, transmitting a signal of a reading instruction to the memory device 109, receiving data read from the memory device 109, and transmitting the read data to a certain circuit in the control circuit 106c.

The fingerprint sensor 108 is a device that reads a fingerprint in contact when receiving an operation signal from the control circuit 106c.

The analog-to-digital converter circuit 107 is a circuit for converting a fingerprint read by the fingerprint sensor 108 into digital data (data to be compared). Furthermore, although described in detail in Embodiment 8, a sample-and-hold circuit including an OS transistor is used for an analog digital circuit, which leads to lower power consumption.

The memory device 109 is a device that stores fingerprint data converted into digital data. The memory device 109 is also a device that stores confidential information such as fingerprint data of a holder of the semiconductor device 110 to perform authentication of data to be compared (hereinafter referred to as data for comparison in some cases) or credit card information.

A device that stores data to be compared is preferably a volatile memory such as a DRAM because the data to be compared becomes unnecessary after the authentication. In particular, when power consumption is desired to be reduced, the device that stores data to be compared is preferably an SRAM.

Meanwhile, in the case of data for comparison, the data for comparison does not need to be rewritten because the holder of the semiconductor device 110 is not changed. Therefore, a device that stores data for comparison is preferably a ROM such as a ReRAM. Accordingly, it is preferable that the memory device 109 include the volatile memory 109a capable of performing writing and reading and the nonvolatile memory 109b that is a read only memory as illustrated in the block diagram of FIG. 2(C), and that the volatile memory 109a and the nonvolatile memory 109b be electrically connected to the connection terminal JT3.

In particular, in the case where reduced power consumption and long-term retention of data for comparison are desired, it is more preferable to use a memory device including an OS transistor in a memory cell. Note that the memory cell including the OS transistor will be described in Embodiment 7, and the memory device each will be described in Embodiment 6. In addition, the OS transistor will be described in Embodiment 9.

Figure 5A:
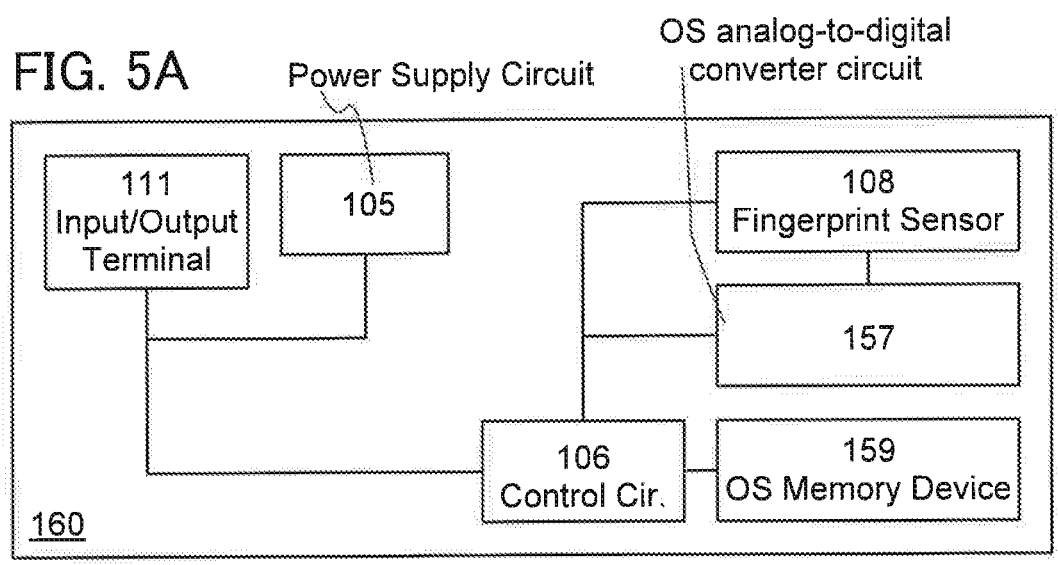
FIG. 5 Block diagrams illustrating an example of a semiconductor device.
Figure 5B:
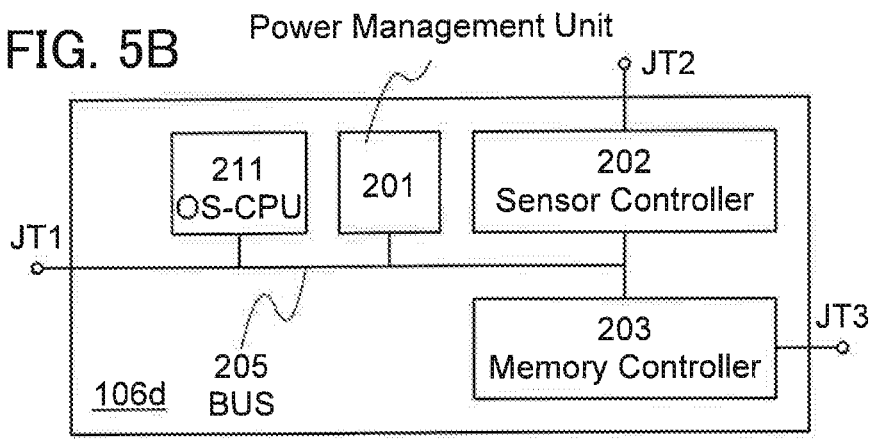

FIG. 5(A) and FIG. 5(B) show an example where an OS transistor is used for the semiconductor device 110. A semiconductor device 160 in FIG. 5(A) has a structure where the analog-to-digital converter circuit 107 in the semiconductor device 110 is replaced with the OS analog-to-digital converter circuit 157 and the memory device 109 is replaced with the OS memory device 159. Furthermore, as a structural example of the control circuit 106, a control circuit 106d in FIG. 5(B) is shown. The control circuit 106d has a structure where the CPU 200 in the control circuit 106c of the semiconductor device 110 is replaced with the OS-CPU 211.

Operation Example 2

Next, an operation example of the semiconductor device 110 described in Structural example 2 is described.

Figure 6A:
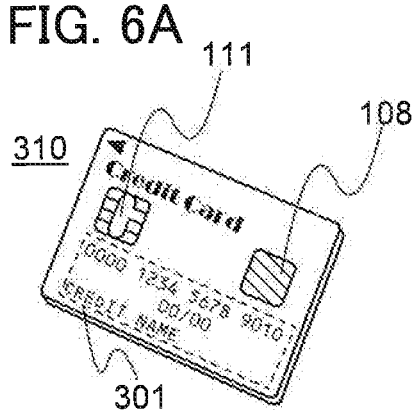
FIG. 6 Diagrams illustrating a semiconductor device and an operation example thereof, and a cross-sectional view.

FIG. 6(A) shows the appearance of a semiconductor device having the structure of the block diagram of the semiconductor device 110 in FIG. 4(A). Note that in this operation example, a credit card is given as an example of a semiconductor device 310. The semiconductor device 310 includes the printed portion 301, the fingerprint sensor 108, and the input/output terminal 111. On the printed portion 301, a card number, an expiry date, a name of a cardholder, and the like are printed.

Figure 6B:
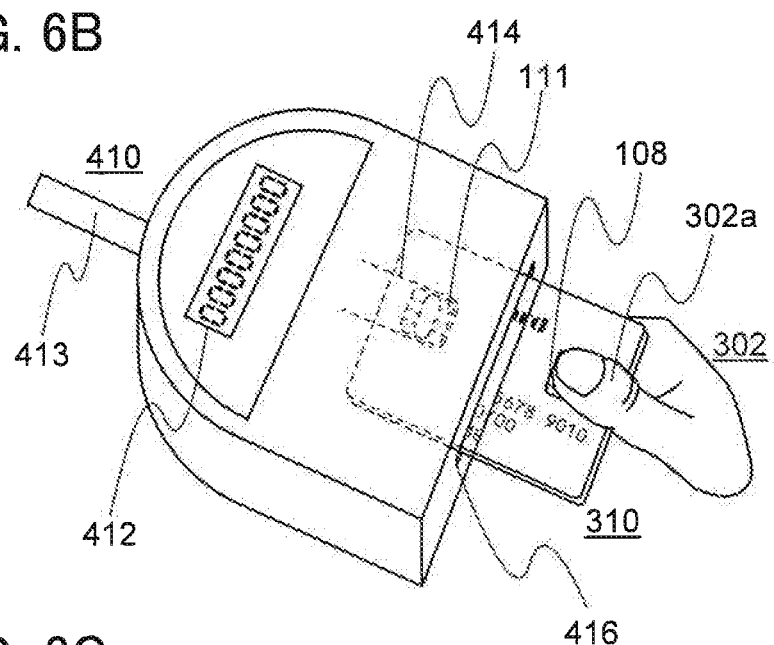

FIG. 6(B) illustrates an external device that communicates with the semiconductor device 310. A contact card reader 410 that is the external device includes an internal terminal 414, a display portion 412, a wiring 413, and a card port 416. The display portion 412 displays a payment amount, response whether communication between the semiconductor device 310 and the contactless card reader was able to be established, error description, an error code, or the like. Note that the contact card reader 410 may be configured not to include the display portion 412.

FIG. 6(B) illustrates a state where the semiconductor device 310 is held by the hand 302 and communication with the contact card reader 410 is performed while the finger 302a is in contact with the fingerprint sensor 108.

Figure 6C:
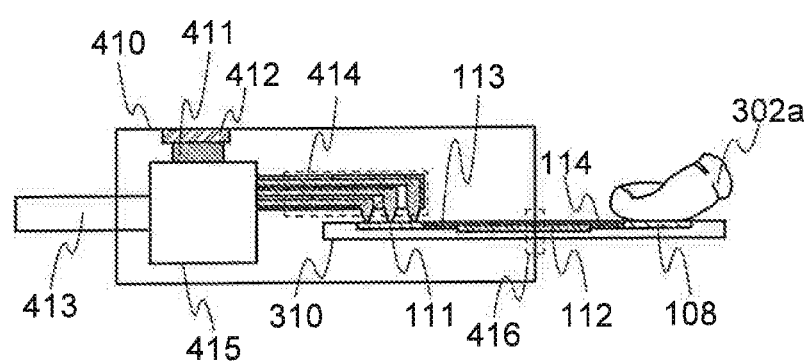

FIG. 6(C) is a cross-sectional view of the contact card reader 410 and the semiconductor device 310 in FIG. 6(B). In FIG. 6(C), the semiconductor device 310 includes the input/output terminal 111, an internal circuit 112, the fingerprint sensor 108, a wiring 113, and a wiring 114. In the case where the semiconductor device 310 has the structure of the semiconductor device 110, the internal circuit 112 includes the power supply circuit 105, the control circuit 106, the analog-to-digital converter circuit 107, and the memory device 109. Furthermore, in the case where the semiconductor device 310 has the structure of the semiconductor device 160, the internal circuit 112 includes the power supply circuit 105, the control circuit 106, the OS analog-to-digital converter circuit 157, and the OS memory device 159.

In FIG. 6(C), the contact card reader 410 includes a wiring 411, the internal terminal 414, and a control device 415. The control device 415 is electrically connected to the wiring 411, the wiring 413, and the internal terminal 414. The wiring 411 is electrically connected to the display portion 412. As illustrated in FIG. 6(C), when the semiconductor device 310 is inserted into the card port 416 of the contact card reader 410, the input/output terminal 111 and the internal terminal 414 are in contact with each other. Thus, electrical connection is made between the contact card reader 410 and the semiconductor device 310. Consequently, electric power can be supplied from the wiring 413 to the semiconductor device 310 through the contact card reader 410, and the contact card reader 410 and the semiconductor device 310 enter a state of being capable of communicating with each other.

The control device 415 has a function of controlling operation of the contact card reader 410. Specifically, the control device 415 has a function of receiving a driving signal for the contact card reader 410 which is transmitted from the wiring 413, a function of transmitting information to be displayed on the display portion 412 through the wiring 411, a function of transmitting a signal, data, or the like including an operation instruction to the semiconductor device 310 through the internal terminal 414, and a function of receiving card information from the semiconductor device 310 through the internal terminal 414.

When payment is made with a credit card, the contact card reader 410 is started up with operation by a store clerk. Specifically, by operation using a cash register or the like on the store side, the contact card reader 410 is driven via the wiring 413. When the contact card reader 410 is in a driving state, by inserting the semiconductor device 310 into the contact card reader 410, electric power is supplied to the semiconductor device 310 through the wiring 413 and the internal terminal 414. Then, a driving signal is transmitted from the control device 415 to the semiconductor device 310 through the internal terminal 414.

Electric power supplied to the semiconductor device 310 is transmitted to the power supply circuit 105. The power supply circuit 105 can supply electric power to the circuits in the semiconductor device 310 by receiving an input potential.

The driving signal transmitted to the semiconductor device 310 is input from the input/output terminal 111 to the control circuit 106. Specifically, the driving signal is transmitted to the CPU 200 in the control circuit 106c, and an operation instruction contained in the driving signal is decoded. After decoding the operation instruction, the CPU 200 transmits a signal containing an instruction for reading data for comparison (fingerprint data of a holder of the semiconductor device 310) which is stored in the memory device 109 in advance, through the memory controller 203. The memory device 109 reads and transmits the data for comparison to the reading CPU 200 by receiving the instruction.

After obtaining the data for comparison, the CPU 200 transmits an operation signal to the fingerprint sensor 108 through the sensor controller 202. The fingerprint sensor 108 obtains fingerprint data (data to be compared) by receiving the operation signal. Note that although timing when the finger 302a is in contact with the fingerprint sensor 108 is not particularly limited, the finger 302a is preferably in contact with the fingerprint sensor 108 while the semiconductor device 310 is inserted into the contact card reader 410, since electric power is supplied to the semiconductor device 310 through the internal terminal 414. The fingerprint sensor 108 obtains a fingerprint of the finger 302a, and the obtained fingerprint data is converted into digital data by the analog-to-digital converter circuit 107. Then, then, the fingerprint data (data to be compared) converted into digital data is transmitted to the CPU 200 through the sensor controller 202.

The CPU 200 receives the data to be compared and then temporarily stores it in the memory device 109. The CPU 200 performs calculation for comparing the data for comparison which is read from the memory device 109 and the data to be compared which is obtained by the fingerprint sensor 108. In the case where the data for comparison and the data to be compared do not match each other, the CPU 200 transmits an operation signal to the fingerprint sensor 108 again and newly obtains data to be compared. Next, the data to be compared which has been temporarily stored in the memory device 109 is overwritten with the newly obtained data to be compared, and the CPU 200 performs comparison calculation between the data for comparison and the data to be compared again. These operations are repeated until data for comparison and data to be compared match each other.

When the data for comparison and the data to be compared match each other, the CPU 200 transmits a signal containing an instruction for reading card information such as a card number, an expiry date, and a cardholder name to the memory device 109. The memory device 109 receives the instruction signal and then transmits the card information to the CPU 200. The CPU 200 transmits the card information to the contact card reader 410 through the input/output terminal 111.

The contact card reader 410 receives the card information from the input/output terminal 111 and transmits the information such as a card number, an expiry date, and a cardholder name to a device such as a cash register through the wiring 413.

By providing a fingerprint sensor in a credit card in such a manner, unfair use of the credit card by a person other than the identical person can be prevented.

Note that although the description is made using the semiconductor device 110 as an example in this operation example, this embodiment is not limited thereto. For example, the semiconductor device 160 including an OS transistor can be operated in a similar manner. Furthermore, the use of the OS transistor can reduce power consumption compared to the semiconductor device 110.

Note that although the description is made using a credit card as an example in this operation example, this embodiment is not limited thereto. For example, the above system may be used for an electronic money card. By adding an authentication system to an electronic money card, payment with electronic money by a person other than the identical person can be prevented. Furthermore, the contact card reader 410 may be provided at an entrance of an area which only authorized persons can enter, e.g., a residence, an office, or a commercial facility so that authentication is performed with the semiconductor device 310. With such a structure, entry of a person other than the authorized persons to a keep-out area with the semiconductor device 310 can be prevented.

Note that this embodiment can be combined with the other embodiments shown in this specification as appropriate.

Embodiment 3

In this embodiment, structural examples that are different from those in Embodiment 1 and Embodiment 2 are described.

Structural Example 3

FIG. 7(A) and FIG. 7(B) are block diagrams showing an example of a semiconductor device of the disclosed invention. A semiconductor device 130 is a card capable of both of contact and contactless communications.

The semiconductor device 130 includes the transmission/reception circuit 115, the input/output terminal 111, the power supply circuit 105, the control circuit 106, the analog-to-digital converter circuit 107, the fingerprint sensor 108, and the memory device 109. The transmission/reception circuit 115 includes the antenna 101, the rectification circuit 102, the detector circuit 103, and the modulation circuit 104.

As a structural example of the control circuit 106, a control circuit 106e is shown in FIG. 7(B). The control circuit 106e includes the CPU 200, the power management unit 201, the sensor controller 202, the memory controller 203, the modulation circuit controller 204, and the bus 205. The CPU 200, the power management unit 201, the sensor controller 202, the memory controller 203, and the modulation circuit controller 204 are electrically connected to the bus 205. The bus 205 is electrically connected to the detector circuit 103 through the connection terminal JT1. The sensor controller 202 is electrically connected to the fingerprint sensor 108 and the analog-to-digital converter circuit 107 through the connection terminal JT2. The memory controller 203 is electrically connected to the memory device 109 through the connection terminal JT3. The modulation circuit controller 204 is electrically connected to the modulation circuit 104 through the connection terminal JT4. The bus 205 is electrically connected to the power supply circuit 105 and the input/output terminal 111 through the connection terminal JT5.

The semiconductor device 130 has a structure in which the semiconductor device 100 in Structural example 1 and the semiconductor device 110 in Structural example 2 are combined. Therefore, Structural example 1 and Structural example 2 are referred to for description of the circuits included in the semiconductor device 130.

Such a structure enables compatibility with both of the contact and contactless communications.

Figure 2C:
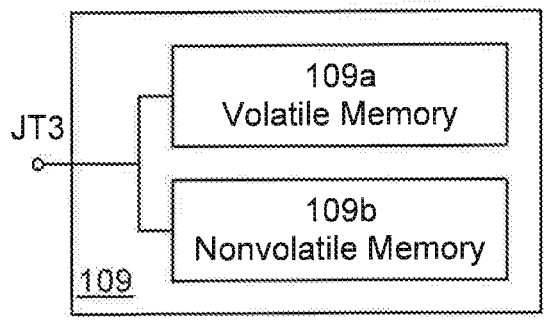

Furthermore, the memory device 109 can have the structure of FIG. 2(C) described in Structural example 1 and Structural example 2.

Furthermore, the semiconductor device 130 can include an OS transistor as in FIG. 1(A) and FIG. 1(B). In such a case, a structure in which the analog-to-digital converter circuit 107, the memory device 109, and the CPU 200 are replaced with the OS analog-to-digital converter circuit 157, the OS memory device 159, and the OS-CPU 211, respectively is used (not illustrated). Thus, low power consumption or miniaturization of the semiconductor device 130 can be achieved.

Operation Example 3

An operation example of contactless communication of the semiconductor device 130 is described in <Operation example 1> and that of contact communication of the semiconductor device 130 is described in <Operation example 2>.

Structural Example 4

Figure 8A:
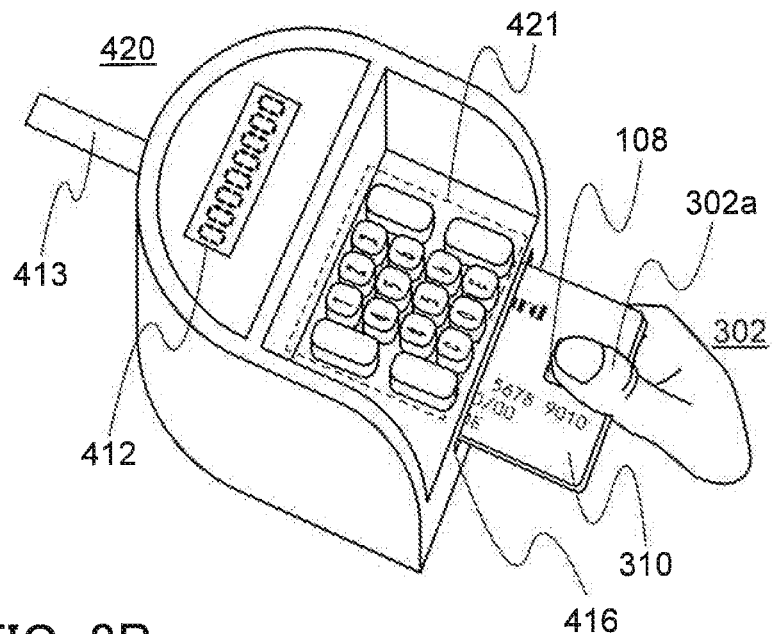
FIG. 8 A diagram illustrating an operation example of a semiconductor device and a cross-sectional view.
Figure 8B:
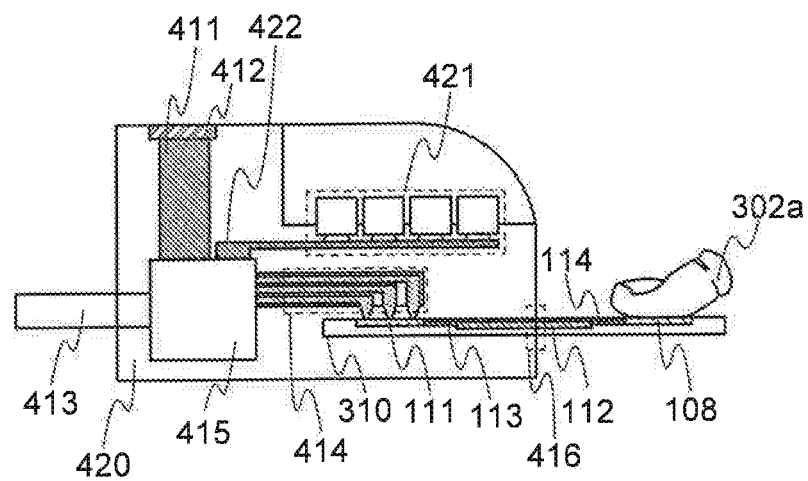

FIG. 8(A) and FIG. 8(B) illustrate a card reader using an authentication method different from those in Embodiment 1 and Embodiment 2.

FIG. 8(A) illustrates a state where the semiconductor device 310 including the input/output terminal 111 and the fingerprint sensor 108 is inserted into a contact card reader 420. Note that the semiconductor device 310 has the structure of the block diagram of the semiconductor device 110 in FIG. 4. The contact card reader 420 includes the display portion 412, the wiring 413, an input button portion 421, and the card port 416.

The display portion 412 displays a payment amount, response whether communication between the semiconductor device 310 and the contact card reader 420 was able to be established, error description, an error code, or the like. The display portion 412 also displays contents input by the input button portion 421. Note that confidential contents, e.g., a personal identification number, are not displayed, and a symbol "*" is displayed instead of the number. Note that the contact card reader 420 may be configured not to include the display portion 412.

The wiring 413 is electrically connected to a device such as a cash register on the store side, and the contact card reader and the device such as a cash register on the store side communicate with each other through the wiring 413.

The input button portion 421 includes input buttons of 0 to 9, an enter button, a delete button, a cancel button, and the like (buttons of 0 to 9, a button denoted by C, a button denoted by E, and four plain buttons are illustrated in FIG. 8(A)). Note that this structural example is not limited to the above-described buttons. For example, in the case where not all the above-described buttons are needed or in the case where the above-described buttons are not sufficient, only necessary buttons are selected and designed.

By providing the input button portion 421 in the contact card reader in this manner, authentication using a personal identification number can be performed as well as fingerprint authentication.

FIG. 8(B) is a cross-sectional view of FIG. 8(A). In FIG. 8(B), the semiconductor device 310 includes the input/output terminal 111, the internal circuit 112, the fingerprint sensor 108, the wiring 113, and the wiring 114. In the case where the semiconductor device 310 has the structure of the semiconductor device 110, the internal circuit 112 includes the power supply circuit 105, the control circuit 106, the analog-to-digital converter circuit 107, and the memory device 109. Furthermore, in the case where the semiconductor device 310 has the structure of the semiconductor device 160, the internal circuit 112 includes the power supply circuit 105, the control circuit 106, the OS analog-to-digital converter circuit 157, and the OS memory device 159.

In FIG. 8(B), the control device 415 is included inside the contact card reader 420, and the control device 415 has a function of controlling operation of the contact card reader 420.

The control device 415 is electrically connected to the wiring 411, the wiring 413, a wiring 422, and the internal terminal 414. The display portion 412 is electrically connected to the wiring 411. The input button portion 421 is electrically connected to the wiring 422. The control device 415 has a function of displaying information on the display portion 412 through the wiring 411. Furthermore, the control device 415 has a function of reading contents input by the input button portion 421, through the wiring 422.

As illustrated in FIG. 8(A) and FIG. 8(B), when the semiconductor device 310 is inserted into the card port 416 of the contact card reader 420, the input/output terminal 111 and the internal terminal 414 are in contact with each other. Thus, electrical connection is made between the contact card reader 420 and the semiconductor device 310. Consequently, electric power can be supplied from the wiring 413 to the semiconductor device 310 through the contact card reader 420, and the contact card reader 420 and the semiconductor device 310 enter a state of being capable of communicating with each other.

Operation Example 4

When payment is made with a credit card, the contact card reader 420 is started up with operation by a store clerk. Specifically, by operation using a cash register or the like on the store side, the contact card reader 420 is driven via the wiring 413. When the contact card reader 420 is in a driving state, by inserting the semiconductor device 310 into the contact card reader 420, electric power is supplied to the semiconductor device 310 through the wiring 413 and the internal terminal 414. Then, a driving signal is transmitted from the control device 415 to the semiconductor device 310.

Electric power supplied to the semiconductor device 310 is transmitted to the power supply circuit 105. The power supply circuit 105 can supply electric power to the circuits in the semiconductor device 310 by receiving an input potential.

The driving signal transmitted to the semiconductor device 310 is input to the control circuit 106. Specifically, the driving signal is transmitted to the CPU 200 in the control circuit 106c, and an operation instruction contained in the driving signal is decoded. After decoding the operation instruction, the CPU 200 transmits an instruction for reading data for comparison to the memory device 109 through the memory controller 203. The memory device 109 reads and transmits the data for comparison to the reading CPU 200 by receiving the instruction.

After obtaining the data for comparison, the CPU 200 transmits an operation signal to the fingerprint sensor 108 through the sensor controller 202. The fingerprint sensor 108 obtains fingerprint data (data to be compared) by receiving the operation signal. Note that although timing when the finger 302a is in contact with the fingerprint sensor 108 is not particularly limited, the finger 302a is preferably in contact with the fingerprint sensor 108 while the semiconductor device 310 is inserted into the contact card reader 420, since electric power is supplied to the semiconductor device 310 through the internal terminal 414. The fingerprint sensor 108 obtains a fingerprint of the finger 302a, and the obtained fingerprint data is converted into digital data by the analog-to-digital converter circuit 107. Then, then, the fingerprint data (data to be compared) converted into digital data is transmitted to the CPU 200 through the sensor controller 202.

The CPU 200 receives the data to be compared and then temporarily stores it in the memory device 109. The CPU 200 performs calculation for comparing the data for comparison which is read from the memory device 109 and the data to be compared which is obtained by the fingerprint sensor 108. In the case where the data for comparison and the data to be compared do not match each other, the CPU 200 transmits an operation signal to the fingerprint sensor 108 again and newly obtains data to be compared. Next, the data to be compared which has been temporarily stored in the memory device 109 is overwritten with the newly obtained data to be compared, and the CPU 200 performs comparison calculation between the data for comparison and the data to be compared again. These operations are repeated until data for comparison and data to be compared match each other.

A period during which a personal identification number is input is provided while these operations are repeated. When a personal identification number (hereinafter referred to as a personal identification number to be compared) is input by the input button portion 421, a driving signal containing the personal identification number to be compared is input to the input/output terminal 111 through the wiring 422, the control device 415, and the internal terminal 414. The input electrical signal is transmitted to the CPU 200.

After receiving the driving signal, the CPU 200 decodes the personal identification number to be compared. After the decoding, the CPU 200 transmits an instruction for reading a personal identification number for comparison to the memory device 109 through the memory controller 203. The memory device 109 reads the personal identification number for comparison by receiving the instruction and transmits it to the CPU 200. After receiving the personal identification number for comparison, the CPU 200 compares the personal identification number for comparison and the personal identification number to be compared which is already received.

When the data for comparison and the data to be compared match each other and the personal identification number for comparison and the personal identification number to be compared match each other, the CPU 200 reads card information such as a card number, an expiry date, and a cardholder name from the memory device 109 and transmits the information to the input/output terminal 111.

The contact card reader 410 receives the card information from the input/output terminal 111 and transmits the information such as a card number, an expiry date, and a cardholder name to a device such as a cash register through the wiring 413.

By providing not only a fingerprint sensor in a credit card but also a button for input of a personal identification number in a card reader in such a manner, unfair use of the credit card by a person other than the identical person can be prevented.

Note that in this structural example, a code for comparison which is input to the input button portion 421 is not limited to a personal identification number. For example, a pass code of a combination of an alphabet and a number may be used.

Note that although the semiconductor device 310 that performs contact communication is used as an example in this structural example, the semiconductor device 300 that performs contactless communication may be used. In this case, an input button portion is provided in a contactless card reader, and a personal identification number is input to perform authentication while the semiconductor device 300 is held over the contactless card reader.

Note that although the description is made using the semiconductor device 110 as an example in this structural example, this embodiment is not limited thereto. For example, the semiconductor device 160 including an OS transistor can be operated in a similar manner. Furthermore, the use of the OS transistor can reduce power consumption compared to the semiconductor device 110.

Note that although the description is made using a credit card as an example in this structural example, this embodiment is not limited thereto. For example, the above system may be used for an electronic money card. By adding an authentication system to an electronic money card, payment with electronic money by a person other than the identical person can be prevented. Furthermore, the contact card reader 420 may be provided at an entrance of an area which only authorized persons can enter, e.g., a residence, an office, or a commercial facility so that authentication is performed with the semiconductor device 310. With such a structure, entry of a person other than the authorized persons to a keep-out area with the semiconductor device 310 can be prevented.

Structural Example 5

In this structural example, an example using authentication other than a fingerprint will be described.

Figure 10A:
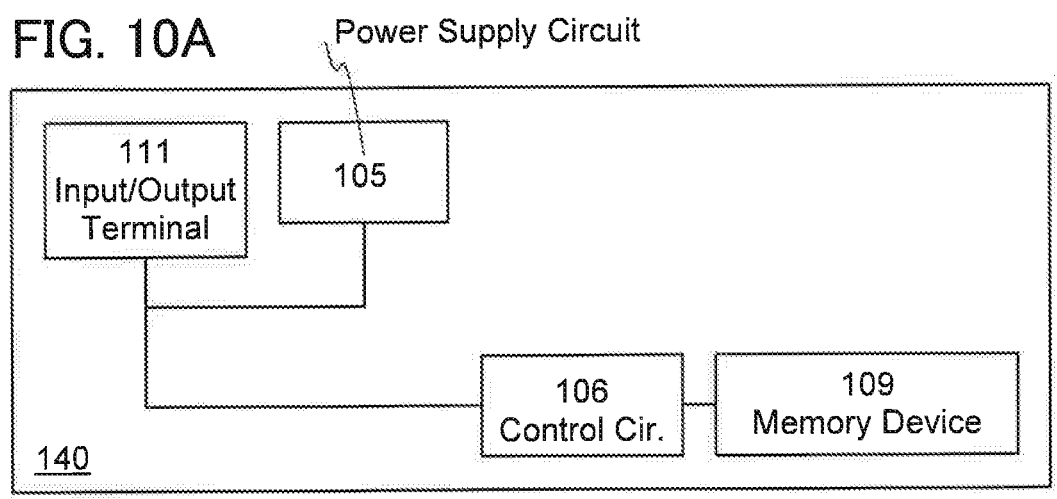
FIG. 10 Block diagrams illustrating an example of a semiconductor device.
Figure 10B:
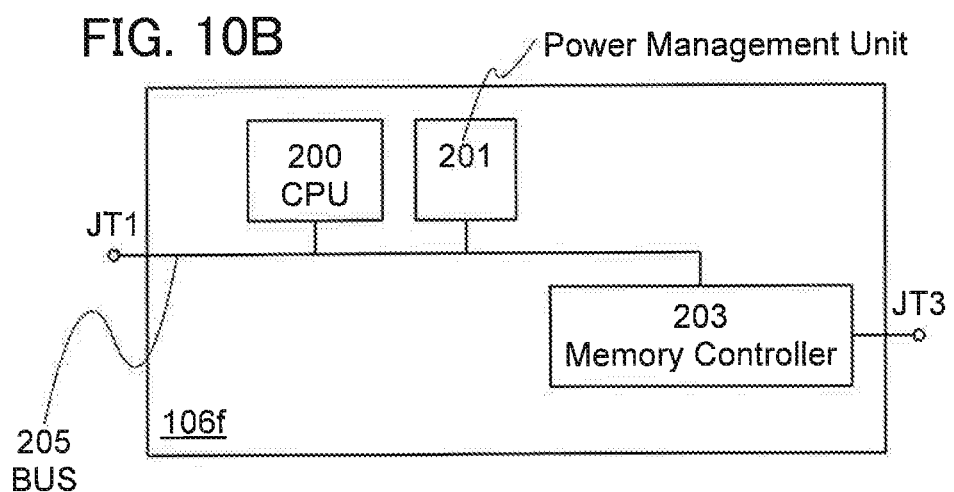

FIG. 10(A) and FIG. 10(B) are block diagrams showing an example of a semiconductor device. A semiconductor device 140 is a card capable of contact communication.

The semiconductor device 140 includes the input/output terminal 111, the power supply circuit 105, the control circuit 106, and the memory device 109.

As a structural example of the control circuit 106, a control circuit 106f is shown in FIG. 10(B). The control circuit 106f includes the CPU 200, the power management unit 201, the memory controller 203, and the bus 205. The CPU 200, the power management unit 201, and the memory controller 203 are electrically connected to the bus 205. The bus 205 is electrically connected to the detector circuit 103 through the connection terminal JT1. The memory controller 203 is electrically connected to the memory device 109 through the connection terminal JT3.

Next, an appearance and peripheral devices of the semiconductor device 330 are described.

Figure 12A:
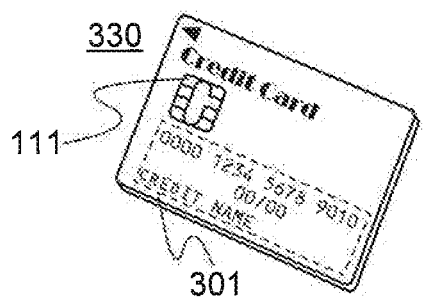
FIG. 12 Diagrams illustrating a semiconductor device and operation examples thereof.
Figure 12B:
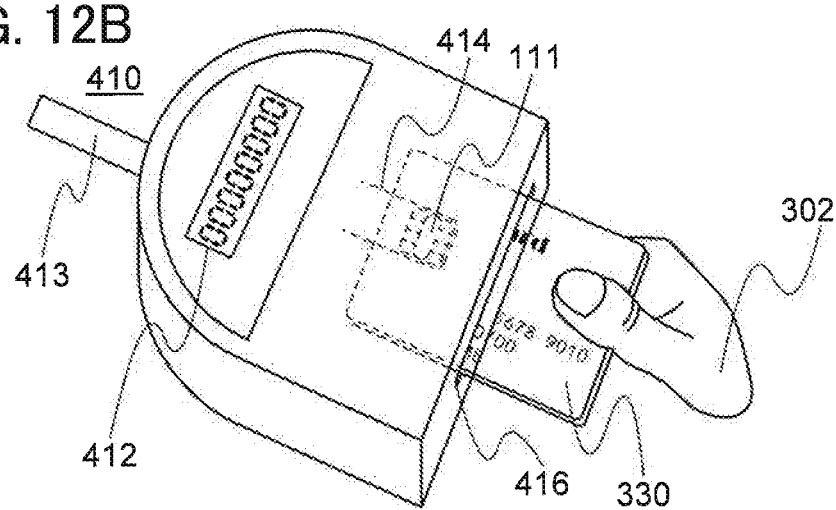

FIG. 12(A) shows the appearance of a semiconductor device having the structure of the block diagram of the semiconductor device 140 in FIG. 10(B). Note that in this operation example, a credit card is given as an example of the semiconductor device 330. The semiconductor device 330 includes the printed portion 301 and the input/output terminal 111. On the printed portion 301, a card number, an expiry date, a name of a cardholder, and the like are printed. FIG. 12(B) illustrates an external device that communicates with the semiconductor device 330. The contact card reader 410 that is the external device includes the internal terminal 414, the display portion 412, the wiring 413, and the card port 416. The display portion 412 displays a payment amount, response whether communication between the semiconductor device 330 and the contact card reader 410 was able to be established, error description, an error code, or the like. Note that the contact card reader 410 may be configured not to include the display portion 412.

Figure 12C:
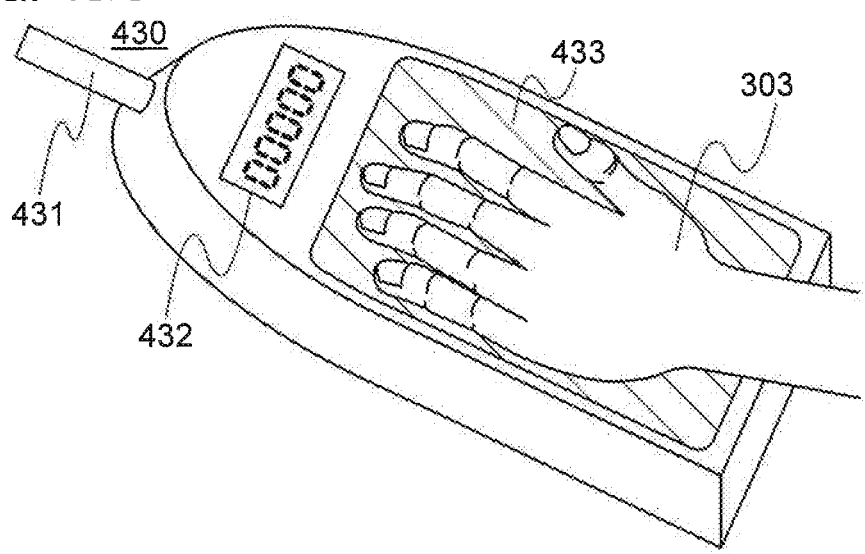

FIG. 12(C) illustrates an external device different from the contact card reader 410. A vein reading device 430 includes a display portion 432, a wiring 431, and a vein reading portion 433. The display portion 432 displays a payment amount, response whether communication between the contact card reader 410 and the vein reading device 430 was able to be established, error description, an error code, or the like. Note that the vein reading device 430 may be configured not to include the display portion 432.

Figure 13:
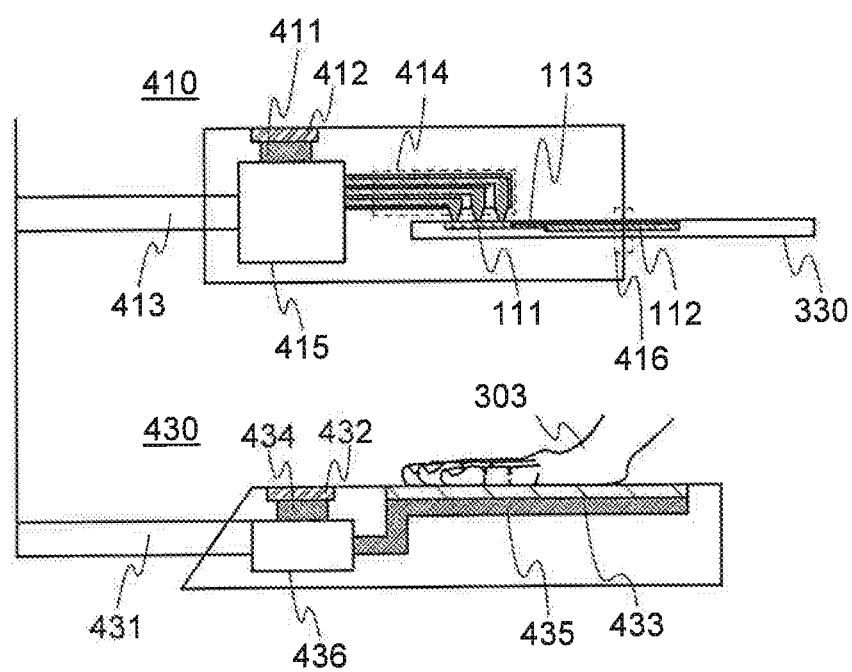
FIG. 13 A cross-sectional view in operation of FIG. 12.

FIG. 13 is a cross-sectional view of the contact card reader 410 in FIG. 12(B) and the vein reading device 430 in FIG. 12(C). In FIG. 12, the semiconductor device 330 includes the input/output terminal 111, the internal circuit 112, and the wiring 113. The internal circuit 112 includes the power supply circuit 105, the control circuit 106, and the memory device 109.

In FIG. 13, the contact card reader 410 includes the wiring 411, the internal terminal 414, and the control device 415. The control device 415 is electrically connected to the wiring 411, the wiring 413, and the internal terminal 414. The wiring 411 is electrically connected to the display portion 412. As illustrated in FIG. 13, when the semiconductor device 330 is inserted into the contact card reader 410, the input/output terminal 111 and the internal terminal 414 are in contact with each other. Thus, electrical connection is made between the contact card reader 410 and the semiconductor device 330. Consequently, electric power can be supplied from the wiring 413 to the semiconductor device 330 through the contact card reader 410, and the contact card reader 410 and the semiconductor device 330 enter a state of being capable of communicating with each other.

The control device 415 has a function of controlling operation of the contact card reader 410. Specifically, the control device 415 has a function of receiving a driving signal for the contact card reader 410 which is transmitted from the wiring 413, a function of transmitting information to be displayed on the display portion 412 through the wiring 411, a function of transmitting a signal, data, or the like including an operation instruction to the semiconductor device 330 through the internal terminal 414, and a function of receiving card information from the semiconductor device 330 through the internal terminal 414.

In FIG. 13, the vein reading device 430 includes a wiring 435, a wiring 434, and a control device 436. The control device 436 is electrically connected to the wiring 435, the wiring 434, and the wiring 431. The wiring 435 is electrically connected to the vein reading portion 433, and the wiring 434 is electrically connected to the display portion 432.

The control device 436 has a function of controlling operation of the vein reading device 430. Specifically, the vein reading device 430 has a function of receiving a driving signal for the vein reading device 430 which is transmitted from the wiring 431, a function of transmitting information to be displayed on the display portion 432 through the wiring 434, and a function of receiving vein data from the vein reading portion 433 through the wiring 435.

Operation Example 5

When payment is made with a credit card, the contact card reader 410 is started up with operation by a store clerk. Specifically, by operation using a cash register or the like on the store side, the contact card reader 410 is driven via the wiring 413. Furthermore, the vein reading device 430 is driven via the wiring 431 at the same timing. Note that the vein reading device 430 is in a standby mode until the contact card reader 410 responds. When the contact card reader 410 is in a driving state, by inserting the semiconductor device 330 into the contact card reader 410, electric power is supplied to the semiconductor device 330 through the wiring 413 and the contact card reader 410. Then, a driving signal is transmitted from the contact card reader 410 to the semiconductor device 330 through the internal terminal 414.

Electric power supplied to the semiconductor device 330 is transmitted to the power supply circuit 105. The power supply circuit 105 can supply electric power to the circuits in the semiconductor device 330 by receiving an input potential.

The driving signal transmitted to the semiconductor device 330 is input from the input/output terminal 111 to the control circuit 106. Specifically, the driving signal is transmitted to the CPU 200 in the control circuit 106f, and an operation instruction contained in the driving signal is decoded. After decoding the operation instruction, the CPU 200 transmits an instruction for reading data for comparison (vein data of a holder of the semiconductor device 330) which is stored in the memory device 109 in advance, through the memory controller 203. The memory device 109 reads and transmits the data for comparison to the reading CPU 200 by receiving the instruction.

After obtaining the data for comparison, the CPU 200 transmits a signal of an instruction for reading a vein to the control device 415 through the input/output terminal 111. Then, the control device 415 transmits the signal of an instruction for reading a vein to the control device 436 through the wiring 413 and the wiring 431. The vein reading device 430 starts reading a vein by receiving the signal. Specifically, the control device 436 transmits a signal for starting reading to the vein reading portion 433 through the wiring 435. At this time, an inner surface of a hand 303 is in contact with the vein reading portion 433; thus, the vein reading portion 433 can obtain a vein of the inner side of the hand 303 as data to be compared. The obtained data to be compared is transmitted to the control device 415 through the control device 436, the wiring 431, and the wiring 413. After receiving the data to be compared, the control device 415 transmits the data to be compared to the semiconductor device 330 through the internal terminal 414.

The data to be compared which is transmitted to the semiconductor device 330 is input to the control circuit 106 from the input/output terminal 111. Specifically, the data to be compared is transmitted to the CPU 200 in the control circuit 106f, and calculation for comparing with the data for comparison is carried out. In the case where the data for comparison and the data to be compared do not match each other, the contact card reader 410 transmits an operation signal to the vein reading device 430 again and newly obtains data to be compared. After the data to be compared is obtained, the vein reading device 430 transmits the data to be compared to the semiconductor device 330 through the contact card reader 410 and calculation for comparing with the data for comparison is carried out again. These operations are repeated until data for comparison and data to be compared match each other.

When the data for comparison and the data to be compared match each other, the CPU 200 transmits a signal containing an instruction for reading card information such as a card number, an expiry date, and a cardholder name to the memory device 109. The memory device 109 receives the instruction signal and then transmits the card information to the CPU 200. The CPU 200 transmits the card information to the contact card reader 410 through the input/output terminal 111.

The contact card reader 410 receives the card information from the input/output terminal 111 and transmits the information such as a card number, an expiry date, and a cardholder name to a device such as a cash register through the wiring 413.

As described above, the use of an external authentication device does not need a fingerprint sensor provided for the credit card and enables personal authentication using biometric identification other than a fingerprint. That is, unfair use of the credit card by a person other than the identical person can be prevented.

Figure 9A:
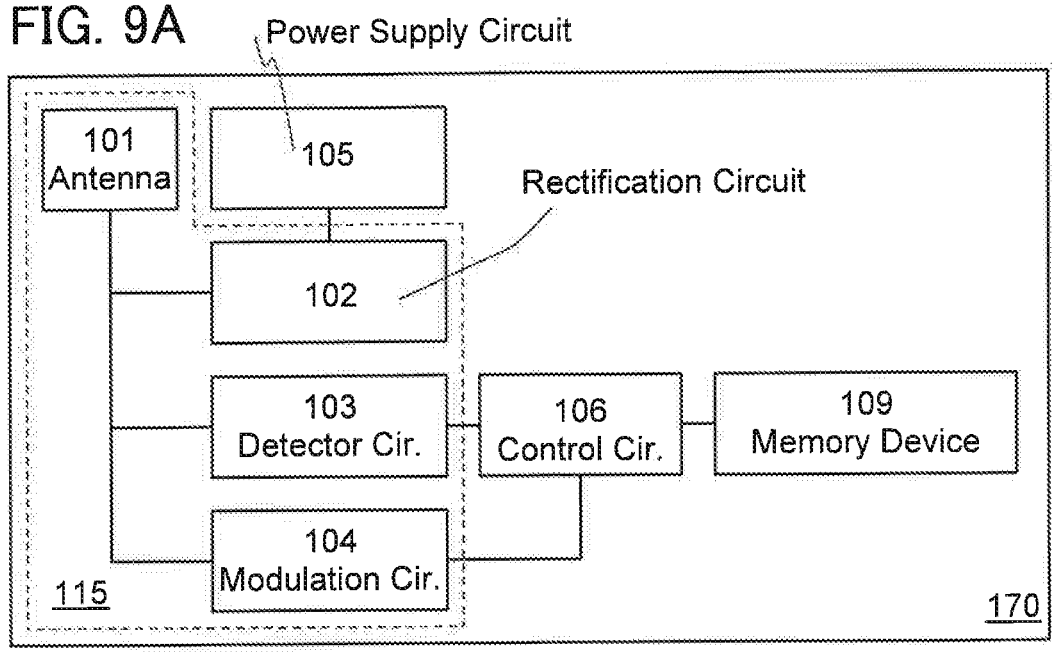
FIG. 9 Block diagrams illustrating an example of a semiconductor device.

Furthermore, although an authentication method using contact communication is described in this structural example, an authentication method using contactless communication may be employed by using the contactless card reader 400 instead of the contact card reader 410. A structural example of the semiconductor device in such a case is illustrated in a block diagram of FIG. 9.

A semiconductor device 170 includes the transmission/reception circuit 115, the power supply circuit 105, the control circuit 106, and the memory device 109. The transmission/reception circuit 115 includes the antenna 101, the rectification circuit 102, the detector circuit 103, and the modulation circuit 104.

Figure 9B:
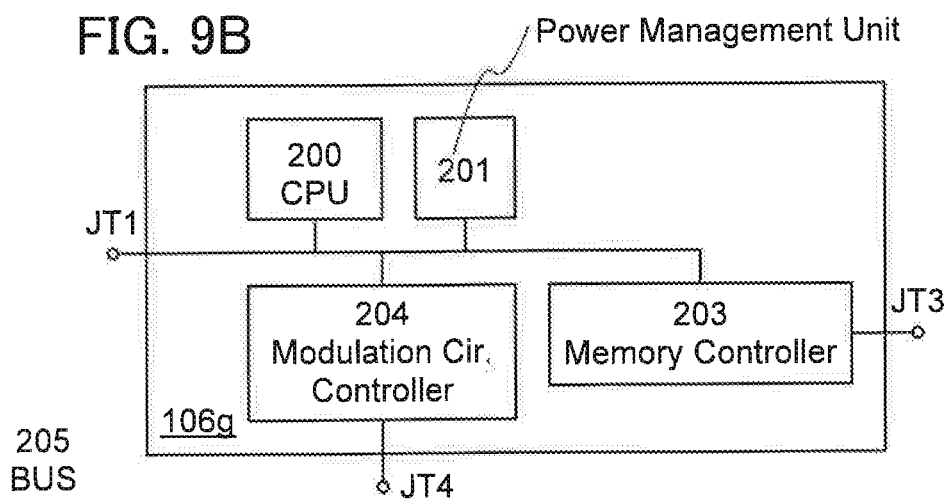

As a structural example of the control circuit 106, a control circuit 106g is shown in FIG. 9(B). The control circuit 106g includes the CPU 200, the power management unit 201, the memory controller 203, the bus 205, and the modulation circuit controller 204. The CPU 200, the power management unit 201, the memory controller 203, and the modulation circuit controller 204 are electrically connected to the bus 205. The bus 205 is electrically connected to the detector circuit 103 through the connection terminal JT1. The memory controller 203 is electrically connected to the memory device 109 through the connection terminal JT3. The modulation circuit controller 204 is electrically connected to the modulation circuit 104 through the connection terminal JT4.

When the above-described structure of the semiconductor device is used and the contactless card reader 400 and the vein reading device 430 are electrically connected to each other, even by a contactless communication method, personal authentication using biological identification other than a fingerprint can be performed and unfair use of the credit card by a person other than the identical person can be prevented.

Figure 11A:
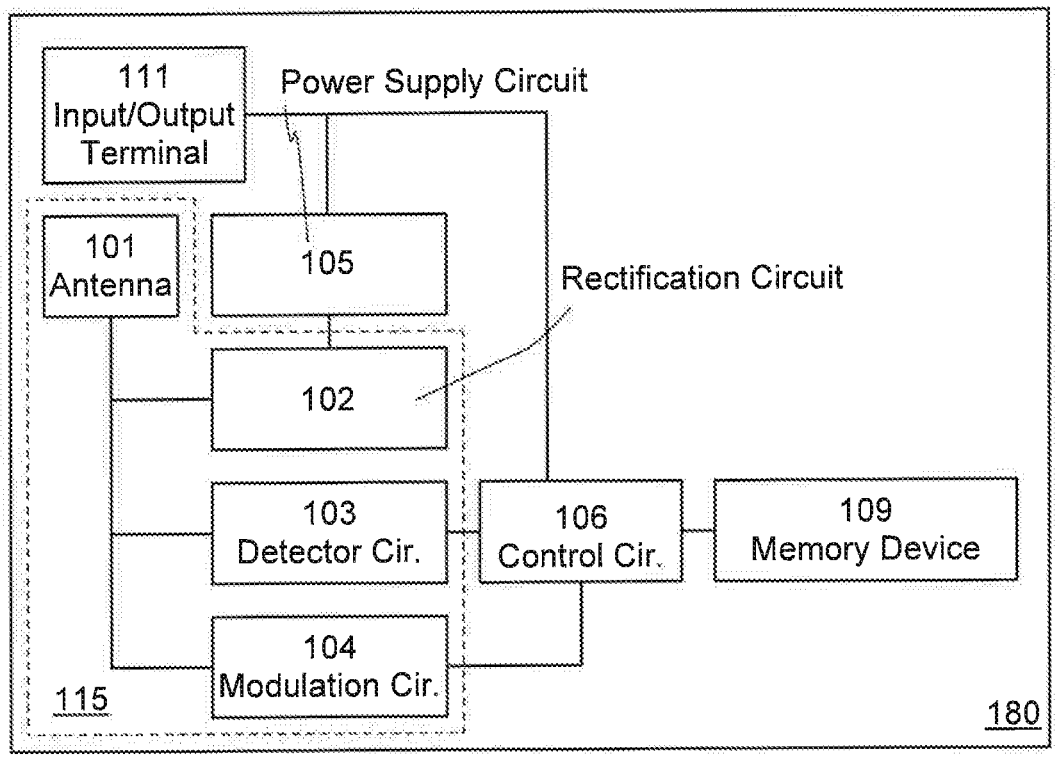
FIG. 11 Block diagrams illustrating an example of a semiconductor device.

Alternatively, a semiconductor device using both of contact and contactless communications may be used. A structural example of the semiconductor device in such a case is illustrated in a block diagram of FIG. 11.

A semiconductor device 180 includes the transmission/reception circuit 115, the input/output terminal 111, the power supply circuit 105, the control circuit 106, and the memory device 109. The transmission/reception circuit 115 includes the antenna 101, the rectification circuit 102, the detector circuit 103, and the modulation circuit 104.

Figure 11B:
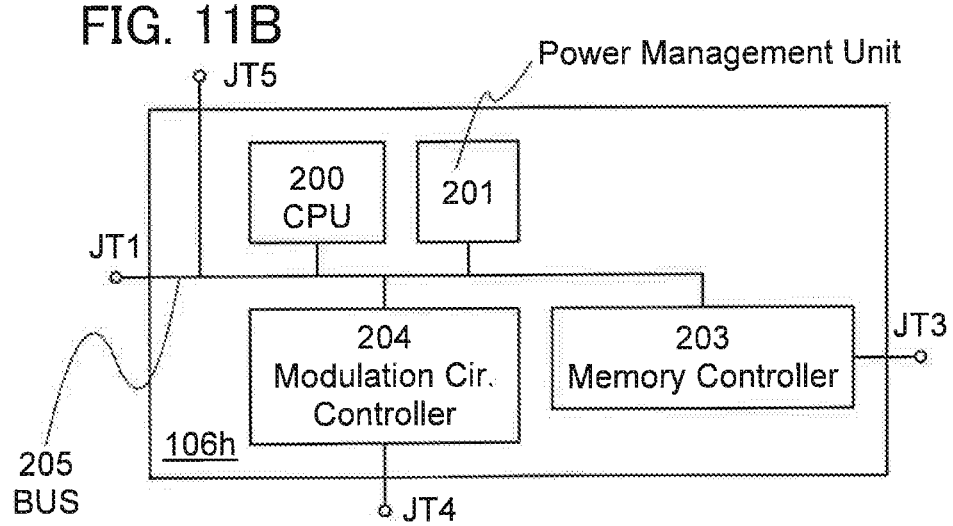

As a structural example of the control circuit 106, a control circuit 106h is shown in FIG. 11(B). The control circuit 106h includes the CPU 200, the power management unit 201, the memory controller 203, the bus 205, and the modulation circuit controller 204. The CPU 200, the power management unit 201, the memory controller 203, and the modulation circuit controller 204 are electrically connected to the bus 205. The bus 205 is electrically connected to the detector circuit 103 through the connection terminal JT1. The memory controller 203 is electrically connected to the memory device 109 through the connection terminal JT3. The modulation circuit controller 204 is electrically connected to the modulation circuit 104 through the connection terminal JT4. The bus 205 is electrically connected to the input/output terminal 111 and the power supply circuit 105 through the connection terminal JT5.

The above-described structure of the semiconductor device can be compatible with both of the contactless card reader 400 and the contact card reader 410. Thus, personal authentication using biometric identification other than a fingerprint can be performed by both of the contact and contactless communication methods and unfair use of the credit card by a person other than the identical person can be prevented.

Figure 14A:
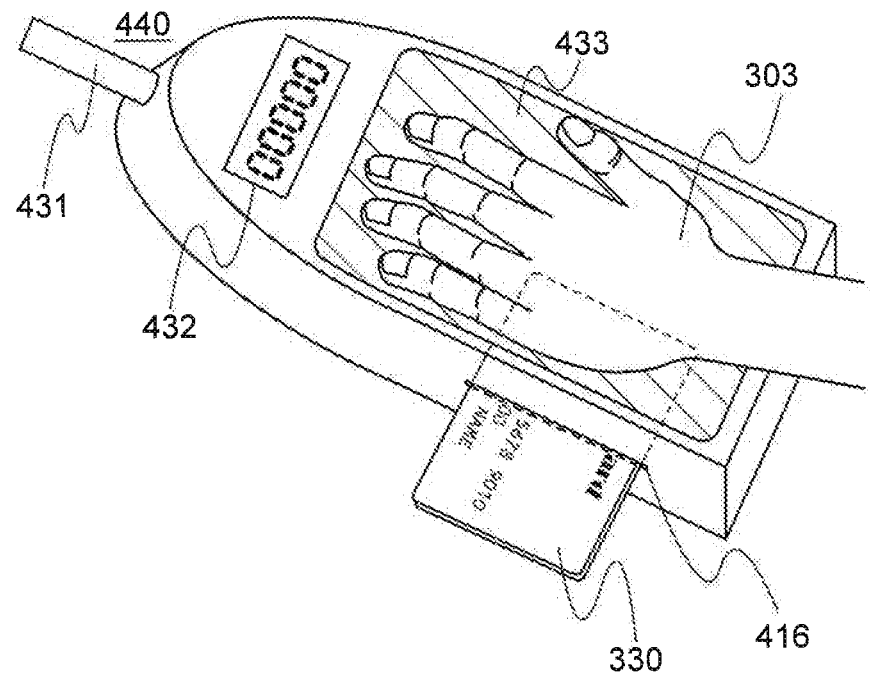
FIG. 14 Diagrams illustrating a semiconductor device and operation examples thereof.
Figure 14B:
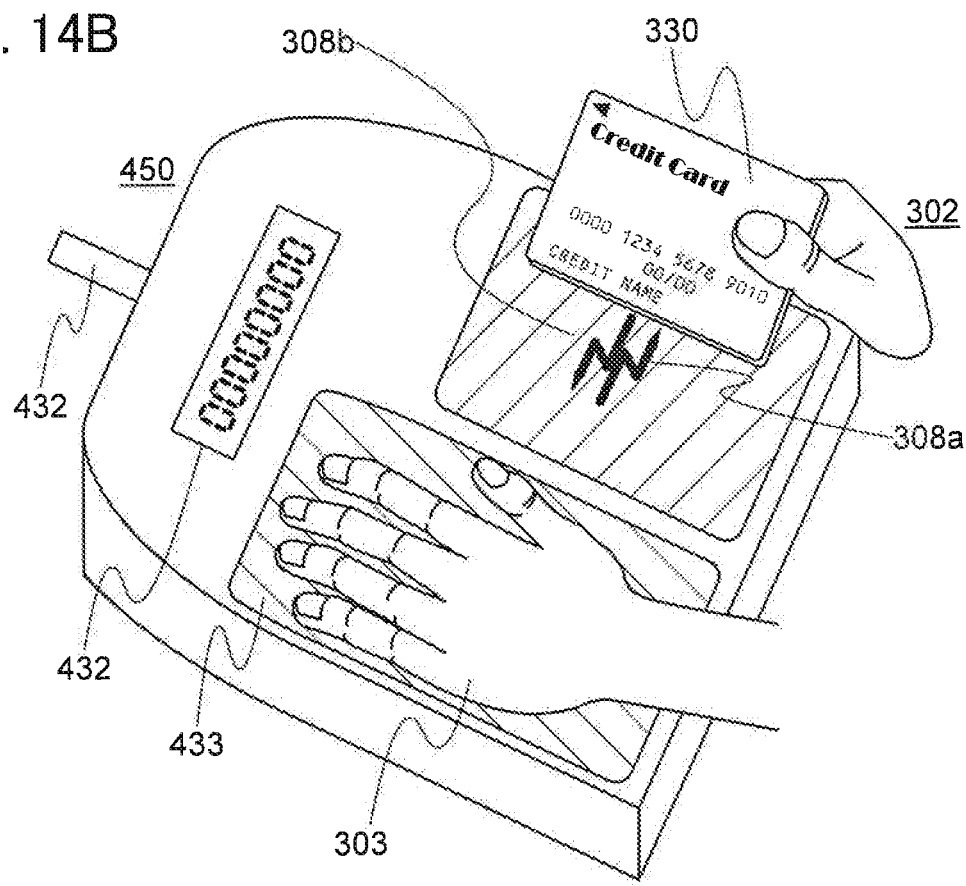

Furthermore, although examples of two types of devices, a contact card reader and a biological sensor or a contactless card reader and a biological sensor, are shown above, this structural example is not limited thereto. For example, as illustrated in FIG. 14(A), an electronic device 440 may be used in which the card port 416 is provided in a biological sensor (a vein reading device is illustrated as an example in FIG. 14(A)) so that the contact card reader 410 and the vein reading device 430 are integrated. Alternatively, as illustrated in FIG. 14(B), an electronic device 450 may be used in which the contactless card reader 400 and a biological sensor (the vein reading device 430 is illustrated as an example in FIG. 14(B)) are integrated. Thus, direct communication can be performed between the card reader and the biological sensor.

Moreover, this structural example is not limited to an authentication method using a vein of a palm. For example, an authentication method with a device for obtaining a fingerprint, a palmar crease, a handprint, a vein of a finger or a hand, a voiceprint, an iris, a face shape, a gene, or the like can be employed.

Note that this embodiment can be combined with the other embodiments shown in this specification as appropriate.

Embodiment 4

In this embodiment, a semiconductor device having a mode different from that of the above-described credit card will be described.

Structural Example 6

Figure 15:
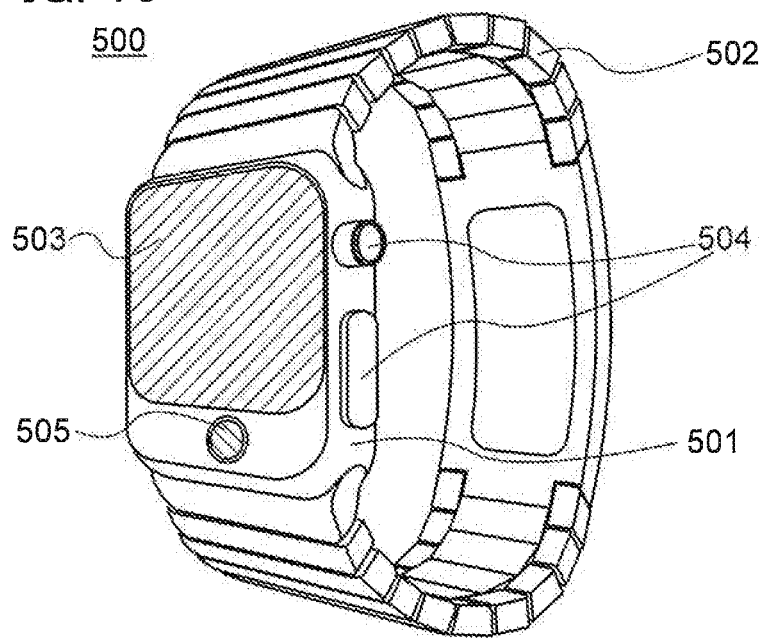
FIG. 15 A diagram illustrating an example of a semiconductor device.

FIG. 15 illustrates an example of a semiconductor device of the disclosed invention. A semiconductor device 500 is a wristwatch-type wearable computer.

The semiconductor device 500 includes a housing 501, a belt 502, a display portion 503, an operation key 504, and a fingerprint sensor 505.

Figure 16A:
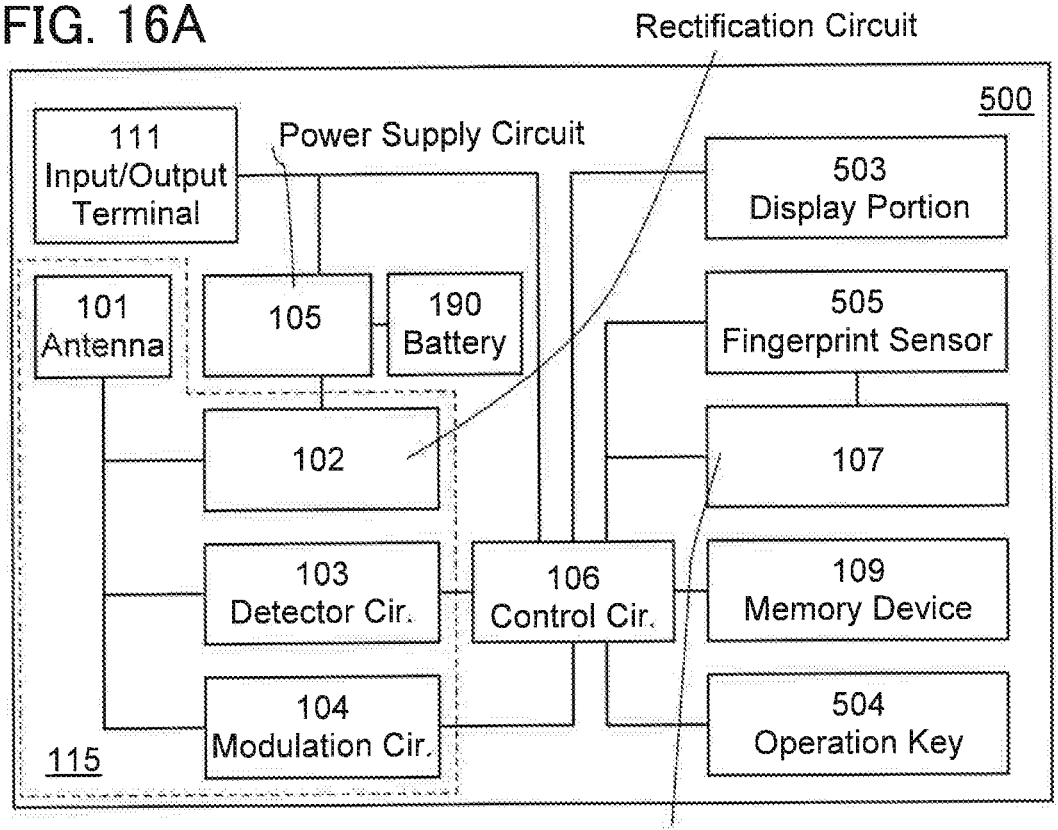
FIG. 16 Block diagrams illustrating an example of a semiconductor device.
Figure 16B:
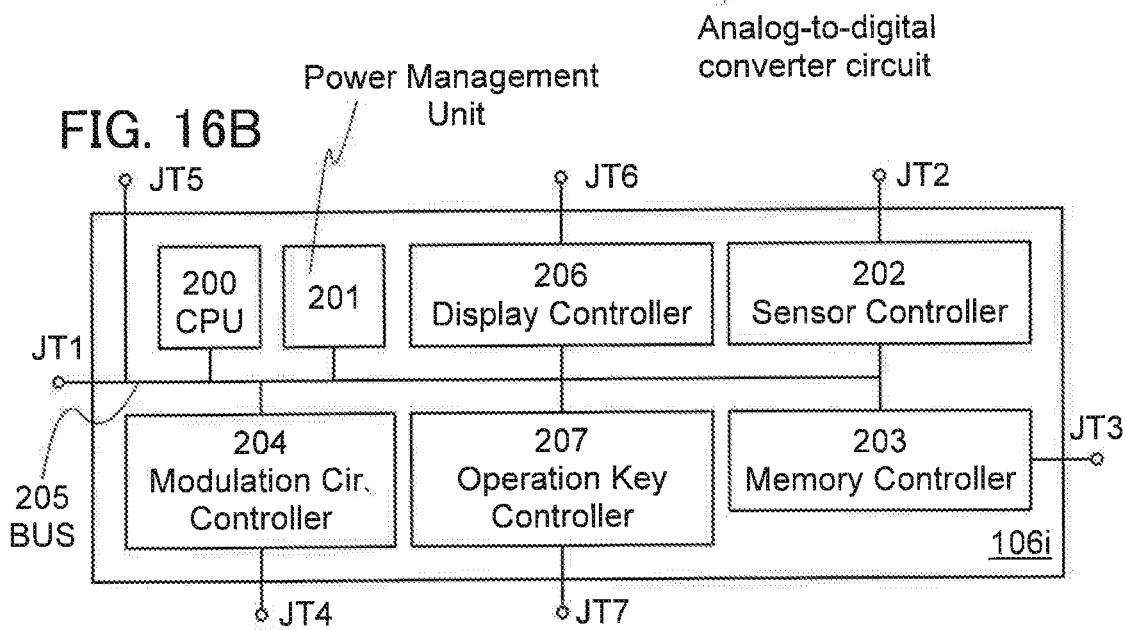

FIG. 16(A) and FIG. 16(B) show an example of a block diagram of the semiconductor device 500.

The semiconductor device 500 has a structure in which the display portion 503, the operation key 504, and a battery 190 are added to the semiconductor device 130 in Structural example 3. Thus, the description of the portions already described in Structural example 3 is omitted and only different portions are described.

The battery 190 is electrically connected to the power supply circuit 105. The display portion 503 is electrically connected to the control circuit 106. The operation key 504 is electrically connected to the control circuit 106.

As a structural example of the control circuit 106, a control circuit 106i in FIG. 16(B) is shown. The control circuit 106i has a structure where a display controller 206 and an operation key controller 207 are added to the control circuit 106e. The display controller 206 and the operation key controller 207 are electrically connected to the bus 205. The display controller 206 is electrically connected to the display portion 503 through the connection terminal JT6. The operation key controller 207 is electrically connected to the operation key 504 through the connection terminal JT7.

The display portion 503 is a display device including a display element or a light-emitting device including a light-emitting element. Examples of the display portion 503 include a light-emitting device using an inorganic or organic EL (Electro Luminescence) element, a display device using an LED (Light Emitted Diode), a display device using a liquid crystal element, a display device using a MEMS (Micro Electro Mechanical Systems) shutter display element, and a display device using electronic ink or an electrophoretic element. The display portion 503 has a function of displaying information with the operation key 504 or the like. Furthermore, by providing a touch panel in the display portion 503, operation using the touch panel may be performed. Furthermore, the display portion 503 may be formed over a flexible substrate.

The operation key 504 is an interface for operating the semiconductor device 500. Furthermore, as described above, a touch panel may be provided in the display portion 503 to perform operation using the touch panel. In this case, the operation key 504 is not necessarily provided.

The fingerprint sensor 505 is a device for performing authentication of a holder of the semiconductor device 500. An authentication method is described later in Operation example 6. Furthermore, the authentication method is not limited to a fingerprint as long as authentication can be performed. For example, authentication may be performed using a sensor that can recognize a vein of a finger or a palm, a vein around a wrist, a voiceprint, an iris, a face shape, or the like instead of the fingerprint sensor 505.

The semiconductor device 500 has a credit card function and a function of storing ID information, like the semiconductor device 130. Specifically, the memory device 109 stores card information such as a credit card number, an expiry date, and a credit name and a fingerprint, a vein, a voiceprint, an iris, a face shape, and the like which are used as data for comparison.

Furthermore, the memory device 109 can have the structure of FIG. 2(C) described in Structural example 1 and Structural example 2.

The battery 190 has a function of storing external electric power supplied from the input/output terminal 111, through the power supply circuit 105. Furthermore, the power supply circuit 105 has a function of generating a stable power supply voltage from a potential input from the charged battery 190. Note that although not illustrated in FIG. 16, the power supply circuit 105 is electrically connected to the circuits to supply a power supply voltage to the circuits.

Note that by providing a microphone and a speaker, the device can also be used as a mobile phone (not illustrated). Furthermore, in the case where the semiconductor device 500 is used as an information terminal such as a mobile phone, a smartphone, or a tablet, the use of a biometric authentication system using the fingerprint sensor 505, the above-described biological sensor, or the like can prevent the use of the information terminal by a person other than the identical person.

Furthermore, the semiconductor device 500 can include an OS transistor as in FIG. 1(A) and FIG. 1(B). In such a case, a structure in which the analog-to-digital converter circuit 107, the memory device 109, and the CPU 200 are replaced with the OS analog-to-digital converter circuit 157, the OS memory device 159, and the OS-CPU 211, respectively is used (not illustrated). Thus, low power consumption or miniaturization of the semiconductor device 500 can be achieved.

Operation Example 6

Next, an operation example using the semiconductor device 500 will be described.

Figure 17:
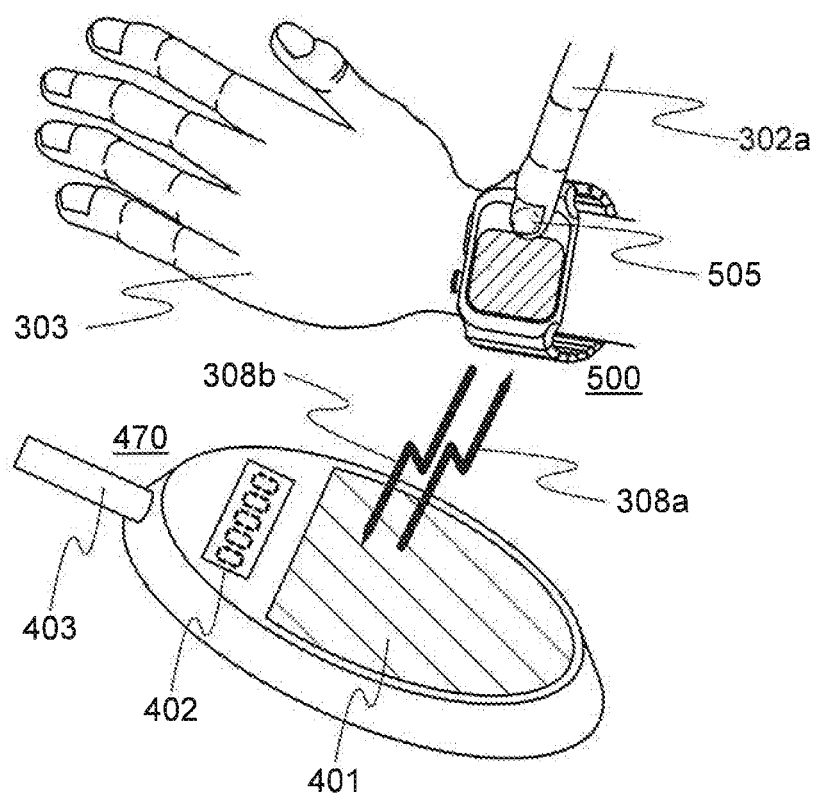
FIG. 17 A diagram illustrating a semiconductor device and an operation example thereof.

FIG. 17 shows an operation example of the semiconductor device 500 and an external device that communicates with the semiconductor device 500. An electronic device 470 that is the external device includes the reading portion 401, the display portion 402, and the wiring 403. Note that the electronic device 470 has a function similar to that of the contactless card reader 400 described in Operation example 1. The display portion 402 displays a payment amount, response whether communication between the semiconductor device 300 and the contactless card reader was able to be established, error description, an error code, or the like. Note that the electronic device 470 may be configured not to include the display portion 402.

Note that this operation example can be described by replacing the semiconductor device 300 with the semiconductor device 500, replacing the contactless card reader 400 with the electronic device 470, and replacing the fingerprint sensor 108 with the fingerprint sensor 505 in Operation example 1. Thus, in this operation example, portions similar to those in Operation example 1 are omitted and only different portions are described.

FIG. 17 shows an example using the semiconductor device 500. A state where the semiconductor device 500 is worn on a wrist of the hand 303 and communicates with the electronic device 470 while the finger 302a of the hand 302 opposite to the hand 303 is held on the fingerprint sensor 505 is illustrated.

When payment is made with a credit card, the electronic device 470 is started up with operation by a store clerk. Specifically, by operation using a cash register or the like on the store side, the electronic device 470 is driven via the wiring 403. The standby mode means a state where the wireless signal 308a is transmitted from the reading portion 401.

When the electronic device 470 becomes in the standby mode, a consumer holds the semiconductor device 500 over the reading portion 401. The description of Operation example 1 is referred to for communication between the semiconductor device 500 and the electronic device 470 and operation of the semiconductor device 500 at this time.

The description of Operation example 1 is referred to for a function of the rectification circuit 102. Note that since the semiconductor device 500 is driven by the battery 190, the semiconductor device 500 does not necessarily include the rectification circuit 102.

The description of Operation example 1 is referred to for a function of the detector circuit 103.

The description of Operation example 1 is referred to for receiving of a demodulated signal and reading of data for comparison (data of a fingerprint of a holder of the semiconductor device 500) from the memory device 109 which are performed by the CPU 200.

After obtaining the data for comparison, the CPU 200 transmits an operation signal to the fingerprint sensor 505 through the sensor controller 202. The fingerprint sensor 505 obtains fingerprint data by receiving an operation signal. Note that although timing when the finger 302*a* is in contact with the fingerprint sensor 505 is not particularly limited, the display portion 402 or the display portion 503 may have a function of displaying and notifying the timing. The fingerprint sensor 505 obtains a fingerprint of the finger 302*a*, and the obtained fingerprint data is converted into digital data by the analog-to-digital converter circuit 107. Then, the fingerprint data (data to be compared) converted into digital data is transmitted to the CPU 200 through the sensor controller 202.

In the case where the data for comparison and the data to be compared match each other, the CPU 200 reads information such as a credit card number, an expiry date, and a credit name from the memory device 109 and transmits the information to the modulation circuit 104 through the modulation circuit controller 204.

By the modulation circuit 104, modulation processing is performed on an electrical signal containing a credit card number, an expiry date, a credit name, and the like. After that, a modulated electrical signal is transmitted to the antenna 101.

After receiving the modulated electrical signal, the antenna 101 converts the electrical signal into the wireless signal 308*b* and transmits the wireless signal 308*b* to the electronic device 470. After receiving the wireless signal 308*b*, the electronic device 470 transmits the information such as a credit card number, an expiry date, and a credit name to a device such as a cash register through the wiring 403.

As described above, a credit function can be utilized in a mode different from a credit card. Furthermore, by providing a fingerprint sensor as well, unfair use of a credit function by a person other than the identical person can be prevented.

Note that although this operation example is described using a watch-type wearable device including a fingerprint sensor as an example, this embodiment is not limited thereto. For example, authentication may be performed using an external authentication device as in Structural example 5 without including a biological sensor such as a fingerprint sensor in a watch-type wearable device.

Figure 18:
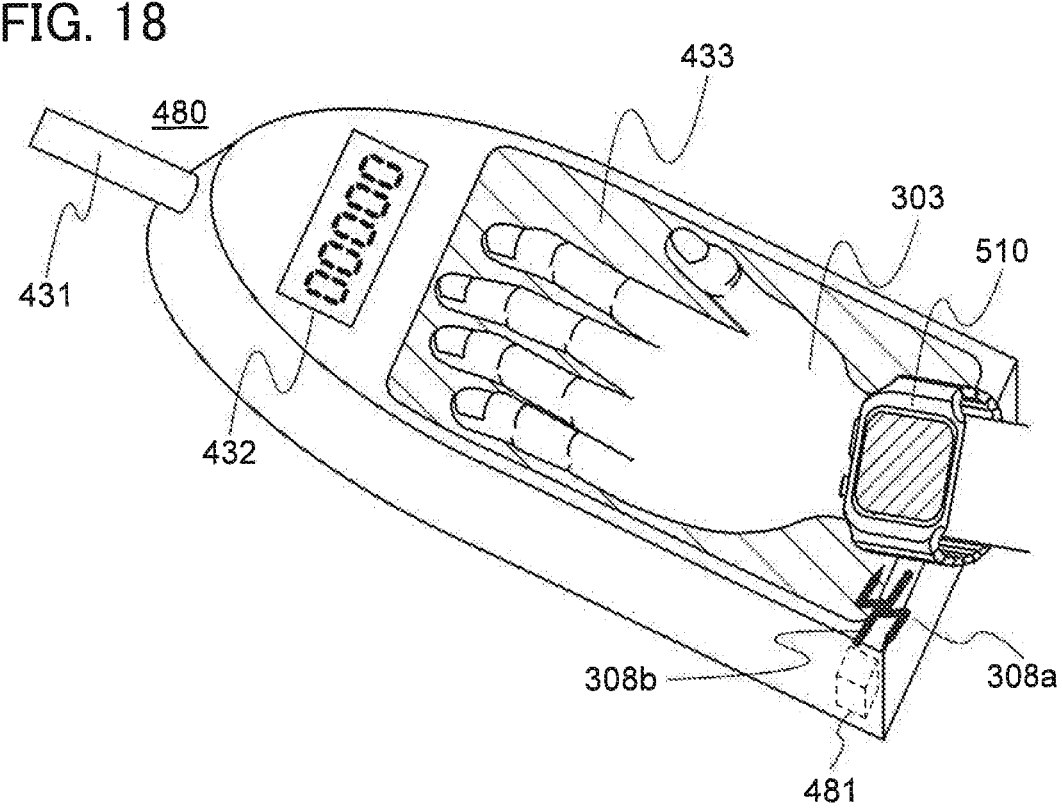
FIG. 18 A diagram illustrating a semiconductor device and an operation example thereof.

A specific example is shown in FIG. 18. A semiconductor device 510 is one in which the fingerprint sensor 505 is removed from the semiconductor device 500. Furthermore, the electronic device 480 is shown as an example of the biological sensor.

The electronic device 480 has a structure similar to that of the vein reading device 430 described in Structural example 5 and includes the display portion 432, the wiring 431, and the vein reading portion 433. In addition, in this specific example, a transmission/reception device 481 is provided in the electronic device 480.

The transmission/reception device 481 includes an antenna and has a function of performing wireless communication with the transmission/reception circuit 115 of the semiconductor device 510 (wireless communication using the wireless signal 308*a* and the wireless signal 308*b* is illustrated in FIG. 18). That is, direct communication can be performed between the semiconductor device 510 and the electronic device 480.

Thus, between the semiconductor device 510 and the electronic device 480, a vein of the hand 303 read by the vein reading portion 433 can be transmitted to the semiconductor device 510 and information such as a credit card number, an expiry date, and a credit name stored in the memory device 109 of the semiconductor device 510 can be transmitted to the electronic device 480. By such a method, personal identification can be performed using biometric authentication other than a fingerprint.

Although an example where a credit function is added to a semiconductor device is described in this embodiment, this embodiment is not limited thereto. For example, the above system may be used for an electronic money card. By adding an authentication system to an electronic money card, payment with electronic money by a person other than the identical person can be prevented. Furthermore, the electronic device 470 or the electronic device 480 may be provided at an entrance of an area which only authorized persons can enter, e.g., a residence, an office, or a commercial facility so that authentication is performed with the semiconductor device 500. With such a structure, entry of a person other than the authorized persons to a keep-out area with the semiconductor device 500 can be prevented.

Although a wristwatch-type wearable device is described as an example in this embodiment, this embodiment is not limited thereto. For example, a mode of a mobile phone, a smartphone, or a tablet terminal may be used instead of the above-described wristwatch-type wearable device. For example, a bracelet-type or ring-type wearable device may be used instead of the above-described wristwatch-type wearable device. For example, a mode in which a glasses-type wearable device and an iris sensor are combined may be used instead of the above-described wristwatch-type wearable device. A mode in which clothing such as a glove or a wristband includes a semiconductor device may be used instead of the watch-type wearable device.

That is, without limited to the wristwatch-type wearable device described in this embodiment, the above-described alternative device can be selected to be worn on a portion other than a wrist. Furthermore, although an example where the device is worn by a human is described in this operation example, the disclosed invention may include a structure which can be worn by a living thing other than a human in some cases. In addition, the disclosed invention may include a structure which can be worn on a so-called inanimate object, e.g., a charger or an electronic device for transmitting and receiving data.

Note that this embodiment can be combined with the other embodiments shown in this specification as appropriate.

Embodiment 5

In this embodiment, a structural example of a CPU of one embodiment of the present invention will be described with reference to FIG. 19.

Figure 19:
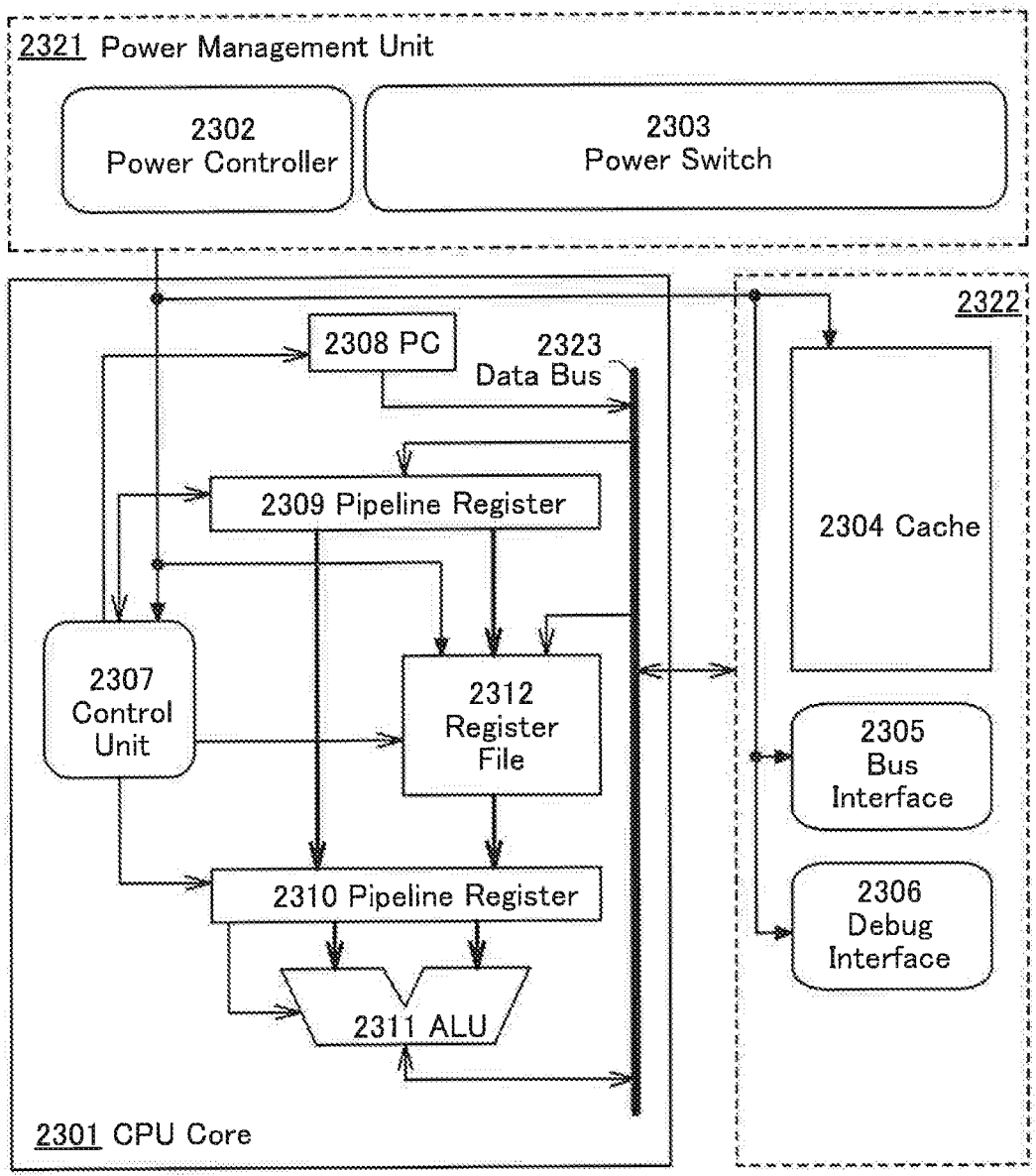
FIG. 19 A block diagram illustrating an example of a CPU.

A semiconductor device 2300 shown in FIG. 19 includes a CPU core 2301, a power management unit 2321, and a peripheral circuit 2322. The power management unit 2321 includes a power controller 2302 and a power switch 2303.

The peripheral circuit 2322 includes a cache 2304 including cache memory, a bus interface 2305, and a debug interface 2306.

The CPU core 2301 includes a data bus 2323, a control unit 2307, a PC 2308 (PC: program counter), a pipeline register 2309, a pipeline register 2310, an ALU 2311, and a register file 2312. Data is transmitted between the CPU core 2301 and the peripheral circuit 2322 such as the cache 2304 via the data bus 2323.

When a p-channel Si transistor and an OS transistor described later in Embodiment 9 (preferably a transistor which includes an oxide semiconductor including In, Ga, and Zn in a channel formation region) are used for the semiconductor device 2300, the circuits of the semiconductor device 2300 can be miniaturized. That is, the semiconductor device 2300 with a reduced size can be provided. Furthermore, a characteristic of extremely low off-state current is utilized by using an OS transistor, the semiconductor device 2300 with reduced power consumption can be provided. Moreover, the semiconductor device 2300 can have a higher operating speed. Particularly when the Si transistors are only p-channel ones, the manufacturing cost can be reduced.

The control unit 2307 has a function of decoding and executing instructions contained in a program such as input applications by controlling the overall operations of the PC 2308, the pipeline register 2309, the pipeline register 2310, the ALU 2311, the register file 2312, the cache 2304, the bus interface 2305, the debug interface 2306, and the power controller 2302.

The ALU 2311 has a function of performing a variety of arithmetic operations such as four arithmetic operations and logic operations.

The cache 2304 has a function of temporarily storing frequently used data. The PC 2308 is a register having a function of storing an address of an instruction to be executed next. Note that although not shown in FIG. 19, the cache 2304 is provided with a cache controller for controlling the operation of the cache memory.

The pipeline register 2309 has a function of temporarily storing instruction data.

The register file 2312 includes a plurality of registers including a general purpose register and can store data that is read from the main memory, data obtained as a result of arithmetic operations in the ALU 2311, or the like.

The pipeline register 2310 is a register having a function of temporarily storing data used for arithmetic operations of the ALU 2311, data obtained as a result of arithmetic operations of the ALU 2311, or the like.

The bus interface 2305 has a function of a path for data between the semiconductor device 2300 and various devices outside the semiconductor device 2300. The debug interface 2306 has a function of a path of a signal for inputting an instruction to control debugging to the semiconductor device 2300.

The power switch 2303 has a function of controlling supply of a power supply voltage to various circuits included in the semiconductor device 2300 other than the power controller 2302. The above various circuits belong to several different power domains. The power switch 2303 controls whether the power supply voltage is supplied to the various circuits in the same power domain. In addition, the power controller 2302 has a function of controlling the operation of the power switch 2303.

The semiconductor device 2300 having the above structure is capable of performing power gating. A description will be given of an example of the power gating operation sequence.

First, by the CPU core 2301, timing for stopping the supply of the power supply voltage is set in a register of the power controller 2302. Then, an instruction of starting power gating is sent from the CPU core 2301 to the power controller 2302. Then, various registers and the cache 2304 included in the semiconductor device 2300 start data saving. Then, the power switch 2303 stops the supply of a power supply voltage to the various circuits other than the power controller 2302 included in the semiconductor device 2300. Then, an interrupt signal is input to the power controller 2302, whereby the supply of the power supply voltage to the various circuits included in the semiconductor device 2300 is started. Note that a counter may be provided in the power controller 2302 to be used to determine the timing of starting the supply of the power supply voltage regardless of input of an interrupt signal. Next, the various registers and the cache 2304 start data restoration. Then, execution of an instruction is resumed in the control unit 2307.

Such power gating can be performed in the whole processor or one or a plurality of logic circuits included in the processor. Furthermore, power supply can be stopped even for a short time. Consequently, power consumption can be reduced at a fine spatial or temporal granularity.

In performing power gating, information held by the CPU core 2301 or the peripheral circuit 2322 is preferably saved in a short time. In that case, the power can be turned on or off in a short time, and an effect of saving power becomes significant.

In order that the information held by the CPU core 2301 or the peripheral circuit 2322 be saved in a short time, the information is preferably saved in a flip-flop circuit itself (referred to as a flip-flop circuit capable of backup operation). Furthermore, the information is preferably saved in an SRAM cell itself (referred to as an SRAM cell capable of backup operation). The flip-flop circuit and SRAM cell which are capable of backup operation preferably include OS transistors (preferably transistors including an oxide semiconductor containing In, Ga, and Zn) in a channel formation region. Consequently, the transistor has a low off-state current; thus, the flip-flop circuit and SRAM cell which are capable of backup operation can retain information for a long time without power supply. In addition, when the transistor has a high switching speed, the flip-flop circuit and SRAM cell which are capable of backup operation can save and restore data in a short time in some cases.

Figure 20:
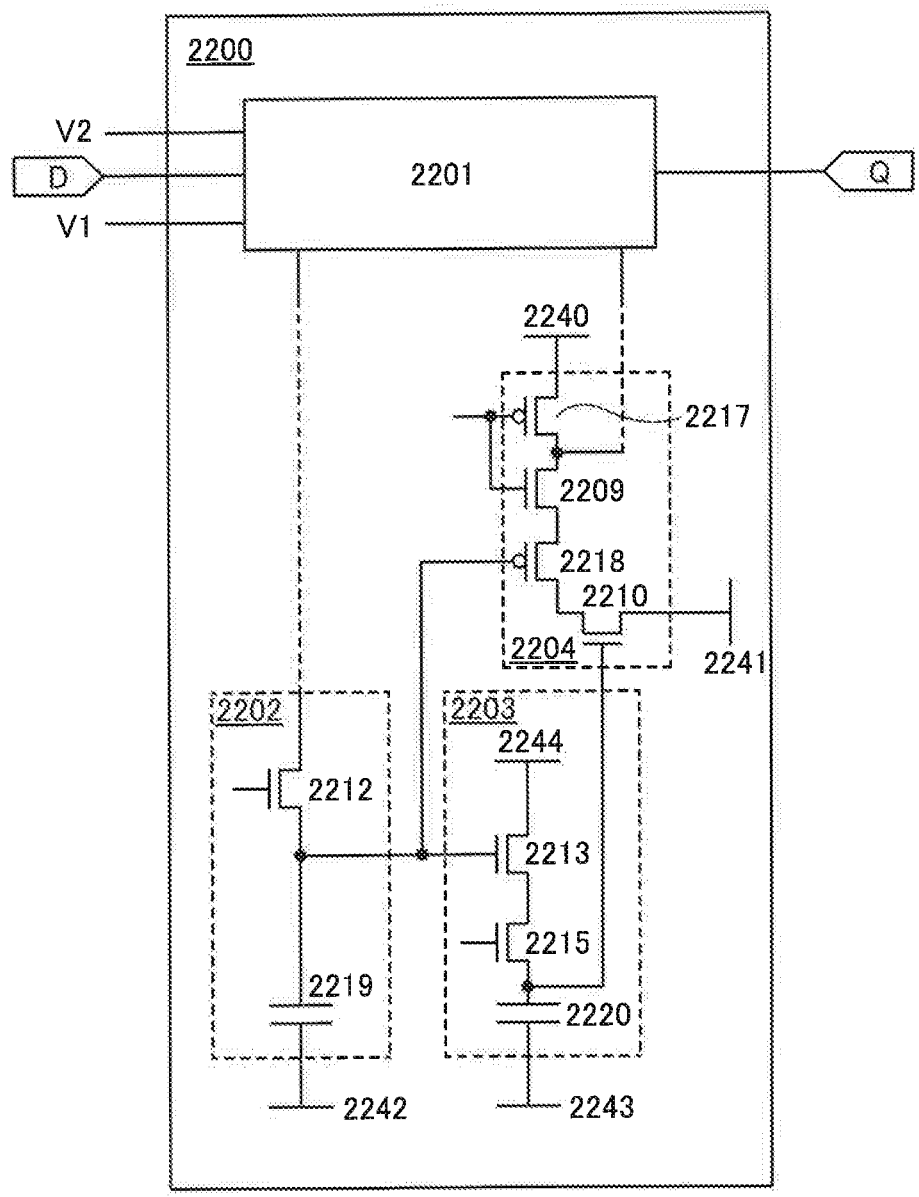
FIG. 20 A block diagram illustrating an example of a flip-flop circuit.
Figure 21:
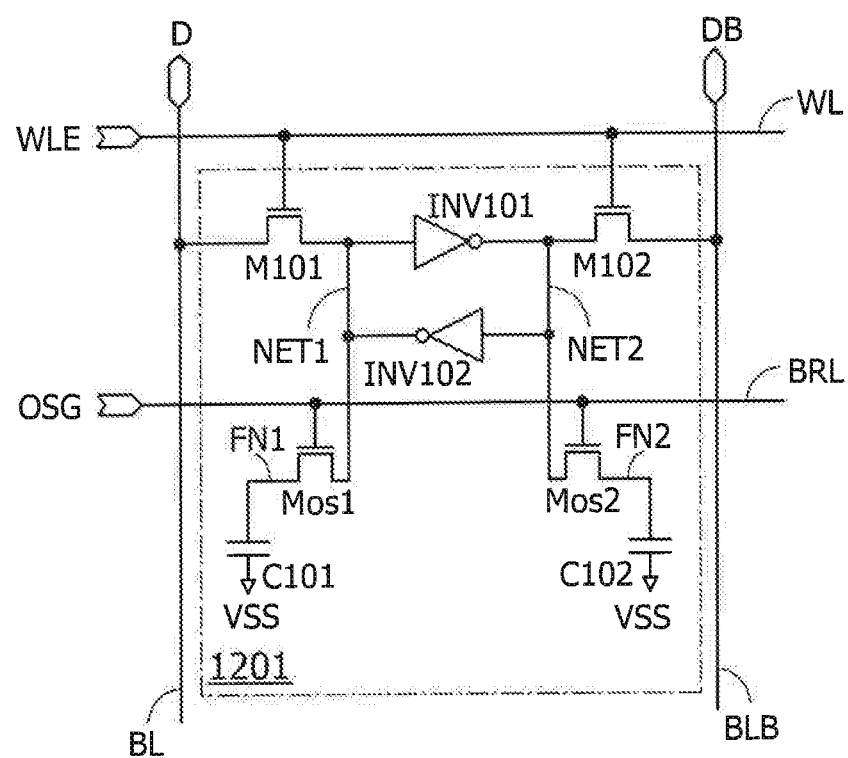
FIG. 21 A circuit diagram illustrating an example of a memory cell.

Examples of the flip-flop circuit capable of backup operation and the SRAM cell capable of backup operation are described using FIG. 20 and FIG. 21.

A semiconductor device 2200 shown in FIG. 20 is an example of the flip-flop circuit capable of backup operation. The semiconductor device 2200 includes a first memory circuit 2201, a second memory circuit 2202, a third memory circuit 2203, and a read circuit 2204. As a power supply voltage, a potential difference between a potential V1 and a potential V2 is supplied to the semiconductor device 2200. One of the potential V1 and the potential V2 is at a high level, and the other is at a low level. An example of the structure of the semiconductor device 2200 when the potential V1 is at a low level and the potential V2 is at a high level will be described below.

The first memory circuit 2201 has a function of retaining data when a signal D including the data is input in a period during which the power supply voltage is supplied to the semiconductor device 2200. Furthermore, the first memory circuit 2201 outputs a signal Q including the retained data in the period during which the power supply voltage is supplied to the semiconductor device 2200. On the other hand, the first memory circuit 2201 cannot retain data in a period during which the power supply voltage is not supplied to the semiconductor device 2200. That is, the first memory circuit 2201 can be referred to as a volatile memory circuit.

The second memory circuit 2202 has a function of reading the data held in the first memory circuit 2201 to store (or save) it. The third memory circuit 2203 has a function of reading the data held in the second memory circuit 2202 to store (or save) it. The read circuit 2204 has a function of reading the data held in the second memory circuit 2202 or the third memory circuit 2203 to store (or restore) it in the first memory circuit 2201.

In particular, the third memory circuit 2203 has a function of reading the data held in the second memory circuit 2202 to store (or save) it even in the period during which the power supply voltage is not supplied to the semiconductor device 2200.

As shown in FIG. 20, the second memory circuit 2202 includes a transistor 2212 and a capacitor 2219. The third memory circuit 2203 includes a transistor 2213, a transistor 2215, and a capacitor 2220. The read circuit 2204 includes a transistor 2210, a transistor 2218, a transistor 2209, and a transistor 2217.

The transistor 2212 has a function of charging and discharging the capacitor 2219 in accordance with data held in the first memory circuit 2201. The transistor 2212 is desirably capable of charging and discharging the capacitor 2219 at a high speed in accordance with data held in the first memory circuit 2201. Specifically, the transistor 2212 desirably contains crystalline silicon (preferably polycrystalline silicon, more preferably single crystal silicon) in a channel formation region.

The conduction state or the non-conduction state of the transistor 2213 is determined in accordance with the charge held in the capacitor 2219. The transistor 2215 has a function of charging and discharging the capacitor 2220 in accordance with the potential of a wiring 2244 when the transistor 2213 is in a conduction state. It is desirable that the off-state current of the transistor 2215 be extremely low. Specifically, the transistor 2215 is desirably an OS transistor (preferably a transistor including an oxide semiconductor containing In, Ga, and Zn in a channel formation region).

Specific connection relations between the elements will be described. One of a source and a drain of the transistor 2212 is connected to the first memory circuit 2201. The other of the source and the drain of the transistor 2212 is connected to one electrode of the capacitor 2219, a gate of the transistor 2213, and a gate of the transistor 2218. The other electrode of the capacitor 2219 is connected to a wiring 2242. One of a source and a drain of the transistor 2213 is connected to the wiring 2244. The other of the source and the drain of the transistor 2213 is connected to one of a source and a drain of the transistor 2215. The other of the source and the drain of the transistor 2215 is connected to one electrode of the capacitor 2220 and a gate of the transistor 2210. The other electrode of the capacitor 2220 is connected to a wiring 2243. One of a source and a drain of the transistor 2210 is connected to a wiring 2241. The other of the source and the drain of the transistor 2210 is connected to one of a source and a drain of the transistor 2218. The other of the source and the drain of the transistor 2218 is connected to one of a source and a drain of the transistor 2209. The other of the source and the drain of the transistor 2209 is connected to one of a source and a drain of the transistor 2217 and the first memory circuit 2201. The other of the source and the drain of the transistor 2217 is connected to a wiring 2240. Although a gate of the transistor 2209 is connected to a gate of the transistor 2217 in FIG. 20, the gate of the transistor 2209 is not necessarily connected to the gate of the transistor 2217.

The transistor described later in Embodiment 9 as an example can be applied to the transistor 2215. Thus, the off-state current of the transistor 2215 can be low, and the semiconductor device 2200 can retain information for a long time without power supply. The favorable switching characteristics of the transistor 2215 allow the semiconductor device 2200 to perform high-speed backup and high-speed recovery.

The memory cell 1201 in FIG. 21 is an example of an SRAM cell capable of backup operation. The memory cell 1201 includes a transistor M101, a transistor M102, a transistor Mos1, a transistor Mos2, an inverter INV101, an inverter INV102, a capacitor C101, and a capacitor C102. The semiconductor device 100 is connected to a wiring WL, a wiring BL, a wiring BLB, and a wiring BRL. Furthermore, the low power supply voltage (VSS) or the like is applied to the memory cell 1201 as power supply voltage.

An input node of the inverter INV101 is electrically connected to an output node of the inverter INV102 and an output node of the inverter INV101 is electrically connected to an input node of the inverter INV102, so that an inverter loop circuit is formed by the inverter INV101 and the inverter INV102. A gate of the transistor M101 and a gate of the transistor M102 are connected to the wiring WL. The transistor M101 functions as a switch that connects the wiring BL to the input node of the inverter INV101, and the transistor M102 functions as a switch that connects the wiring BLB to the input node of the inverter INV102.

The wiring WL functions as a writing/reading word line, and a signal (WLE) for selecting a memory cell is input from a word line driver circuit. The wirings BL and BLB function as bit lines that transmit data signals D and DB. The data signal DB is a signal that is obtained by inverting the logic value of the data signal D. The data signals D and DB are supplied from a bit line driver circuit. Furthermore, the wirings BL and BLB are also wirings for transmitting data read from the memory cell 1201 to an output circuit.

The memory cell 1201 corresponds to a circuit which includes a volatile memory circuit including the inverter INV101, the inverter INV102, the transistor M101, and the transistor M102 and a pair of memory circuits. Note that the pair of memory circuits are formed using a memory circuit including the transistor Mos1 and the capacitor C101 (hereinafter referred to as a memory circuit (Mos1 and C101)) and a memory circuit including the transistor Mos2 and the capacitor C102 (hereinafter referred to as a memory circuit (Mos2 and C102)). The memory circuit (Mos1 and C101) and the memory circuit (Mos2 and C102) are each a circuit for backing up data of the volatile memory circuit by storing potentials held in a node NET1 and a node NET2, respectively. These memory circuits turn on the transistors Mos1 and Mos2 to charge or discharge the capacitors C101 and C102 so that data is written, and turns off them to store charge accumulated in the capacitors so that data is retained without power supply.

Data is recovered by turning on the transistors Mos1 and Mos2. The transistors Mos1 and Mos2 are turned on while supply of power to the inverters INV101 and INV102 is stopped, whereby a node FN1 and the node NET1 are connected to each other so that charge is shared by the node FN1 and the node NET1, and a node FN2 and the node NET2 are connected to each other so that charge is shared by the node FN2 and the node NET2. Then, power is supplied to the inverters INV101 and INV102, so that data is restored to the inverter loop circuit depending on the potentials of the node NET1 and the node NET2. After that, the transistors Mos1 and Mos2 are turned off.

Gates of the transistors Mos1 and Mos2 are connected to the wiring BRL. A signal OSG is input to the wiring BRL. In response to the signal OSG, the pair of memory circuits (the memory circuit (the transistor Mos1 and the capacitor C101) and the memory circuit (the transistor Mos2 and the capacitor C102)) are driven and backup or recovery operation is performed.

Structures and operations of the memory circuit (Mos1 and C101) and the memory circuit (Mos2 and C102) are described below.

The memory circuit (Mos1 and C101) and the memory circuit (Mos2 and C102) each accumulate charge in the capacitors C101 and C102, so that the potentials of the nodes FN1 and FN2 are held. When the transistors Mos1 and Mos2 are turned on, the node NET1 and the node FN1 are connected to each other and the potential held in the node NET1 is applied to the node FN1. Furthermore, when the transistor Mos2 is turned on, the node NET2 and the node FN2 are connected to each other and the potential held in the node NET2 is applied to the node FN2. In addition, turning off the transistors Mos1 and Mos2 brings the nodes FN1 and FN2 into an electrically floating state, so that charge accumulated in the capacitors C101 and C102 is held and the memory circuits are brought into a data retention state.

For example, in the case where the node FN1 is at H level, charge may leak from C101 and the voltage thereof might decrease gradually. Each of the transistors Mos1 and Mos2 is preferably an OS transistor (transistor including an oxide semiconductor containing In, Ga, and Zn in a channel formation region). Consequently, leakage current flowing between a source and a drain in an off state (off-state current) is extremely low; thus, voltage variation of the node FN1 can be suppressed. That is, the memory circuit (Mos1 and C101) can be operated as a nonvolatile memory circuit or a memory circuit that can retain data for a long time without power supply. Furthermore, in a similar manner, the memory circuit (Mos2 and C102) can be used as a backup memory circuit of the volatile memory circuit including the inverter INV101, the inverter INV102, the transistor M101, and the transistor M102.

The transistor described later in Embodiment 9 as an example can be applied to the transistors Mos1 and Mos2. Because of the low off-state current of the transistors Mos1 and Mos2, the semiconductor device 100 can retain information for a long time without power supply. The favorable switching characteristics of the transistors Mos1 and Mos2 allow the memory cell 1201 to perform high-speed backup and high-speed recovery.

With the transistor including an oxide semiconductor in a channel formation region described later in Embodiment 9, the flip-flop circuit and SRAM cell which are capable of backup operation can be formed, and these can be used in the semiconductor device 2300. As a result, the power of the semiconductor device can be turned on or off in a short time and power consumption thereof can be further reduced.

Furthermore, the flip-flop circuit and SRAM cell which are capable of backup operation are used in the semiconductor device 2300 to reduce the manufacturing cost. In particular, n-channel transistors used in the flip-flop circuit and SRAM cell may each be replaced with the transistor which includes an oxide semiconductor in a channel formation region and is described as an example in the above embodiment. When Si transistors are only p-channel ones, the manufacturing cost can be reduced.

Note that the CPU according to one embodiment of the present invention is not limited to the above description. For example, if necessary, the present invention can be applied to and used for a GPU (Graphics Processing Unit), a PLD (Programmable Logic Device), a DSP (Digital Signal Processor), an MCU (Microcontroller Unit), an RFIC (Radio Frequency Integrated Circuit), a custom LSI, or the like.

Note that this embodiment can be combined with the other embodiments shown in this specification as appropriate.

Embodiment 6

A configuration example of a memory device of one embodiment of the present invention will be described with reference to FIG. 22.

Figure 22:
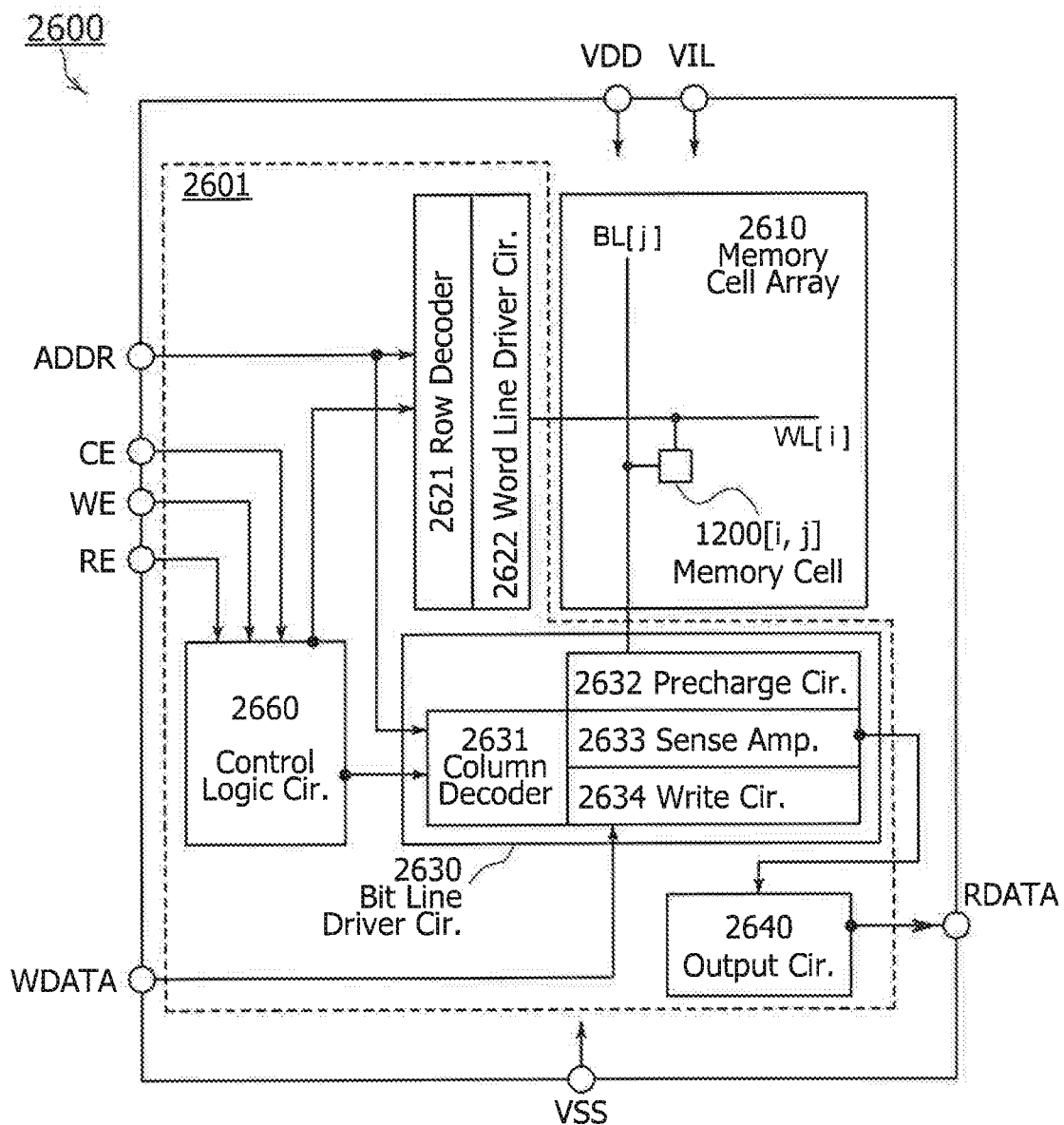
FIG. 22 A block diagram illustrating an example of a memory cell.

FIG. 22 illustrates a configuration example of a memory device. A memory device 2600 includes a peripheral circuit 2601 and a memory cell array 2610. The peripheral circuit 2601 includes a row decoder 2621, a word line driver circuit 2622, a bit line driver circuit 2630, an output circuit 2640, and a control logic circuit 2660.

The bit line driver circuit 2630 includes a column decoder 2631, a precharge circuit 2632, a sense amplifier 2633, and a write circuit 2634.

In the memory cell array 2610, m memory cells 1200[$i,j$] in the row direction and n memory cells 1200[$i,j$] in the column direction (m and n are each an integer greater than or equal to 1) (i is an integer greater than or equal to 1 an less than or equal to m, and j is an integer greater than or equal to 1 and less than or equal to n) are arranged in a matrix (only one memory cell 1200[$i,j$] is shown in FIG. 22). The memory cell 1200[$i,j$] is electrically connected to the bit line driver circuit 2630 through a wiring BL[j] and is electrically connected to the word line driver circuit 2622 through a wiring WL[i].

The configurations of the memory cell array 2610 and the peripheral circuit 2601 depend on the type of a memory cell used for the memory cell 1200[$i,j$]. For example, in the case where the memory cell 1201 is used as the memory cell 1200[$i,j$], wirings from the bit line driver circuit 2630 are two wirings, which are the wiring BL and the wiring BLB, and wirings from the word line driver circuit 2622 are two wirings, which are the wiring WL and the wiring BRL. In this case, the precharge circuit 2632 has a function of precharging the wiring BL and the wiring BLB and a function of making the voltages of the wiring BL and the wiring BLB in the same column equal. Furthermore, the sense amplifier 2633 has a function of amplifying data signals (D and DB) read from the wiring BL and the wiring BLB. The amplified data signal is output as a digital data signal RDATA to the outside of the memory device 2600 through the output circuit 2640.

For example, in the case where the memory cell 1203 in FIG. 23(A) described later is used as the memory cell 1200[$i,j$], a wiring from the bit line driver circuit 2630 is one wiring, which is the wiring BL, and a wiring from the word line driver circuit 2622 is one wiring, which is the wiring WL. In this case, the precharge circuit 2632 has a function of precharging the wiring BL. Furthermore, the sense amplifier 2633 has a function of amplifying a data signal (D) read from the wiring BL. The amplified data signal is output as a digital data signal RDATA to the outside of the memory device 2600 through the output circuit 2640.

Thus, wirings of the memory cell array 2610 illustrated in FIG. 22 are not limited to the wirings BL[i] and WL[j] and the number of the wirings of the memory cell array 2610 can be changed depending on the configuration of the memory cell 1200[$i,j$] as appropriate.

As power supply voltages, a low power supply voltage (VSS), a high power supply voltage (VDD) for the peripheral circuit 2601, and a high power supply voltage (VIL) for the memory cell array 2610 are supplied to the memory device 2600 from the outside.

Control signals (CE, WE, and RE), an address signal ADDR, and a data signal WDATA are input to the memory device 2600 from the outside. The address data signal ADDR is input to the row decoder 2621 and the column decoder 2631, and the data signal WDATA is input to the write circuit 2634.

The control logic circuit 2660 processes the signals (CE, WE, and RE) input from the outside, and generates control signals for the row decoder 2621 and the column decoder 2631. CE is a chip enable signal, WE is a write enable signal, and RE is a read enable signal. Signals processed by the control logic circuit 2660 are not limited to those listed above, and other control signals may be input as necessary.

Note that whether each circuit or each signal described above is provided can be determined as appropriate and as needed.

When a p-channel Si transistor and an OS transistor (preferably a transistor including an oxide semiconductor containing In, Ga, and Zn in a channel formation region) described later in Embodiment 9 are used in the memory device 2600, the memory device 2600 with a reduced size can be provided. In addition, the memory device 2600 whose power consumption can be reduced can be provided. Furthermore, the memory device 2600 whose operation speed can be increased can be provided. In particular, by using only a p-channel transistor as the Si transistor, the manufacturing cost can be reduced.

Furthermore, a memory cell described later in Embodiment 7 can be used as a memory cell in the memory cell array 2610.

Note that this embodiment can be combined with the other embodiments shown in this specification as appropriate.

Embodiment 7

Configuration examples of a memory cell of one embodiment of the present invention will be described with reference to FIG. 23(A) to FIG. 23(D), FIG. 24(A), and FIG. 24(B).

Figure 23A:
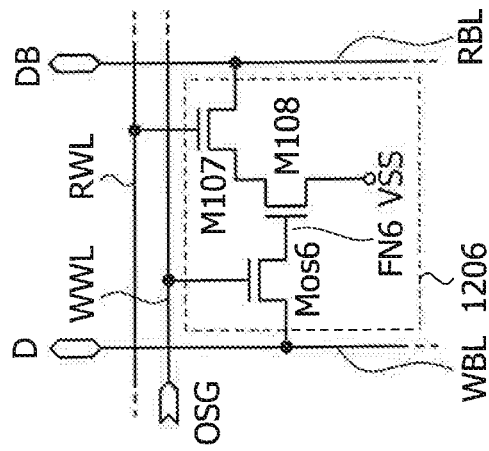
FIG. 23 Circuit diagrams illustrating examples of a memory cell.

FIG. 23(A) is a circuit diagram illustrating a configuration example of a memory cell. The memory cell 1203 includes a transistor Mos3 and a capacitor C103. One of a source and a drain of the transistor Mos3 is electrically connected to the wiring BL. The other of the source and the drain of the transistor Mos3 is electrically connected to one electrode of the capacitor C103. A gate of the transistor Mos3 is electrically connected to the wiring WL. The low power supply potential (VSS) is applied to the other electrode of the capacitor C103.

A node FN3 is provided between the other of the source and the drain of the transistor Mos3 and the one electrode the capacitor C103 and serves as a data retention portion. The transistor Mos3 functions as a switch that connects the node FN3 to the wiring BL. The signal D is input and output to and from the wiring BL as a write signal and a read signal. As a signal for selecting a memory cell, the signal OSG is input to the WL.

Data writing and data reading are performed when the transistor Mos3 is turned on to connect the node FN3 to the wiring BL.

Figure 24A:
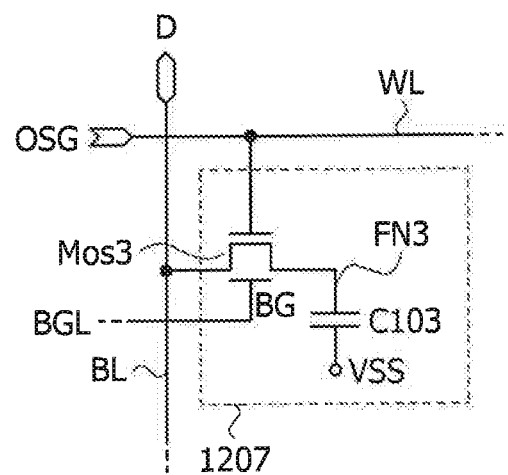
FIG. 24 Circuit diagrams illustrating examples of a memory cell.
Figure 24B:
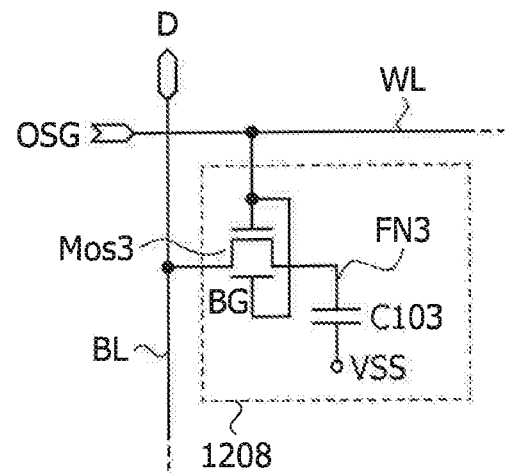

Furthermore, FIG. 24(A) and FIG. 24(B) illustrate a memory cell 1207 and a memory cell 1208 in each of which a back gate is added to the memory cell 1203. The memory cell 1207 is a circuit in which a back gate BG and a wiring BGL are provided for the transistor Mos3, and a predetermined potential is applied to the back gate BG from the wiring BGL. The threshold voltage of the transistor Mos3 can be varied by applying the potential from the wiring BGL. The memory cell 1208 is a circuit in which the back gate BG is provided for the transistor Mos3 and electrically connected to a front gate of the transistor Mos3 (or the wiring WL). With this structure, the same potential is applied to the front gate and a back gate BG, so that the amount of current flowing through the transistor Mos3 when the transistor Mos3 is on can be increased.

Note that the back gate can be provided not only in the memory cell 1207 and the memory cell 1208 but also in other memory cells. For example, the back gate can be provided in a memory cell 1204, a memory cell 1205, a memory cell 1206, and the memory cell 1201 to be described in this embodiment.

Figure 23B:
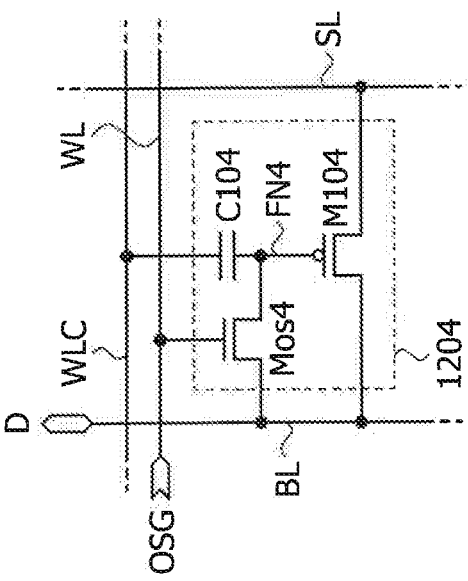

FIG. 23(B) is a circuit diagram illustrating a configuration example of a memory cell. The memory cell 1204 includes a transistor Mos4, a transistor M104, and a capacitor C104. One of a source and a drain of the transistor Mos4 is electrically connected to the wiring BL. The other of the source and the drain of the transistor Mos4 is electrically connected to one electrode of the capacitor C104 and a gate of the transistor M104. A gate of the transistor Mos4 is electrically connected to the wiring WL. One of a source and a drain of the transistor M104 is electrically connected to the wiring BL. The other of the source and the drain of the transistor M104 is electrically connected to a wiring SL. The other electrode of the capacitor C104 is electrically connected to a wiring WLC.

A node FN4 is provided among the other of the source and the drain of the transistor Mos4, the gate of the transistor M104, and the one electrode the capacitor C104 and serves as a data retention portion. The transistor Mos4 functions as a switch that connects the node FN4 to the wiring BL. The signal OSG is input to the wiring WL as a signal for selecting a memory cell. The capacitor C104 connects the wiring WLC to the node FN4. The wiring WLC is a wiring for supplying constant voltage to the terminal of the capacitor C104 in a writing operation and a reading operation. The transistor M104 is a p-channel transistor.

While constant voltage is applied to the wirings WLC and SL, data is written by turning on the transistor Mos4 and connecting the node FN4 to the wiring BL. For data reading, constant voltage is applied to the wirings BL, WLC, and SL. The value of current flowing between the source and the drain of the transistor M104 changes depending on the voltage of the node FN4. The wiring BL is charged or discharged by the current between the source and the drain of the transistor M104, so that the value of data retained in the memory cell 1204 can be read by detecting the voltage (signal D) of the wiring BL.

Note that the transistor M104 can be an n-channel transistor. That is, a voltage applied to the wirings (BL, SL, and WLC) is determined on the basis of the conductivity type of the transistor M104.

Figure 23C:
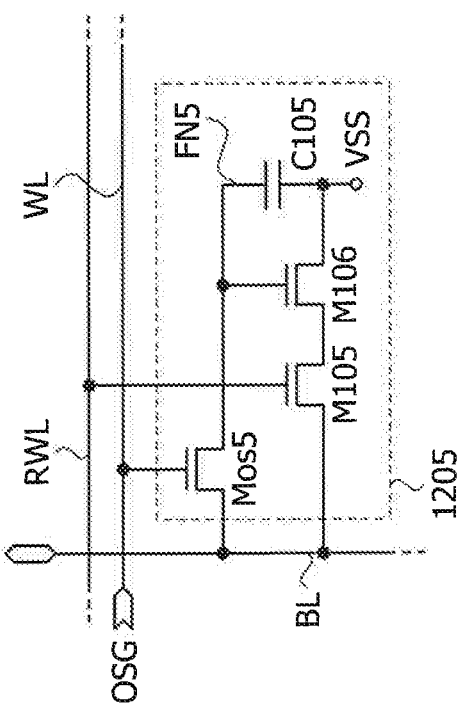

FIG. 23(C) is a circuit diagram illustrating a configuration example of a memory cell. The memory cell 1206 includes a transistor Mos6, a transistor M107, and a transistor M108. One of a source and a drain of the transistor Mos6 is electrically connected to a wiring WBL. The other of the source and the drain of the transistor Mos6 is electrically connected to a gate of the transistor M108. A gate of the transistor Mos6 is electrically connected to a wiring WWL. One of a source and a drain of the transistor M107 is electrically connected to a wiring RBL. The other of the source and the drain of the transistor M107 is electrically connected to one of a source and a drain of the transistor M108. A gate of the transistor M107 is electrically connected to a wiring RWL. The low power supply potential (VSS) is applied to the other of the source and the drain of the transistor M108.

A node FN6 is provided between the other of the source and the drain of the transistor Mos6 and the gate of the transistor M108 and serves as a data retention portion. The transistor Mos6 functions as a switch that connects the node FN6 to the wiring WBL. The transistor M107 functions as a switch that connects the wiring RBL to the one of the source and the drain of the transistor M108. The signal D is input to the wiring WBL as a data write signal. As a signal for selecting a memory cell, the signal OSG is input to the wiring WWL.

Data is written by turning on the transistor Mos6 and connecting the node FN6 to the wiring WBL. For data reading, the transistor M107 is turned on after constant voltage is applied to the wiring RBL in advance. The value of current flowing between the source and the drain of the transistor M108 changes depending on the voltage of the node FN6. The wiring RBL is charged or discharged by the current between the source and the drain of the transistor M108, so that the value of data retained in the memory cell 1206 can be read by detecting the voltage (signal DB) of the wiring RBL.

Figure 23D:
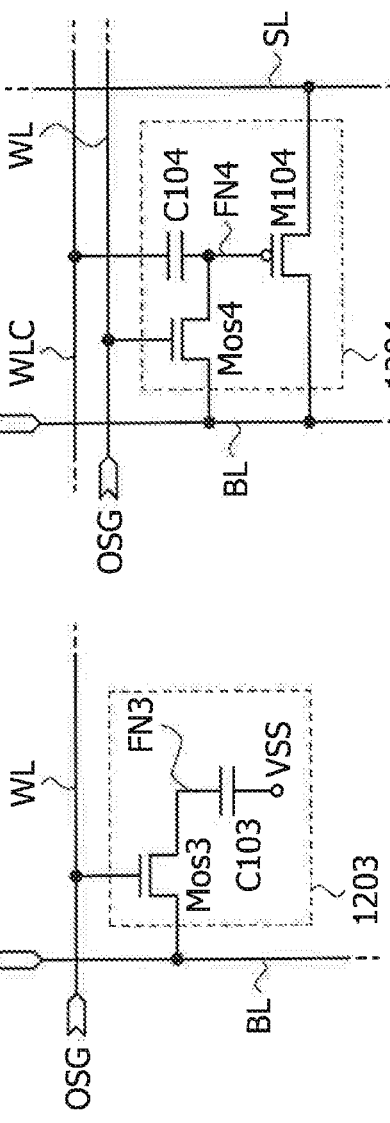

FIG. 23(D) is a circuit diagram illustrating a configuration example of a memory cell. The memory cell 1205 includes a transistor Mos5, a transistor M105, a transistor M106, and a capacitor C105. One of a source and a drain of the transistor Mos5 is electrically connected to the wiring BL. The other of the source and the drain of the transistor Mos5 is electrically connected to a gate of the transistor M106 and one electrode of the capacitor C105. A gate of the transistor Mos5 is electrically connected to the wiring WL. One of a source and a drain of the transistor M105 is electrically connected to the wiring BL. The other of the source and the drain of the transistor M105 is electrically connected to one of a source and a drain of the transistor M106. A gate of the transistor M105 is electrically connected to the wiring RWL. The other of the source and the drain of the transistor M106 is electrically connected to the other electrode of the capacitor C105. The low power supply potential (VSS) is applied to the other of the source and the drain of the transistor M106 and the other electrode of the capacitor C105.

A node FN5 is provided among the other of the source and the drain of the transistor Mos5, the gate of the transistor M106, and the one electrode of the capacitor C105 and serves as a data retention portion. The transistor Mos5 functions as a switch that connects the node FN5 to the wiring BL. The signal OSG is input to the wiring WL as a signal for selecting a memory cell.

Data is written by turning on the transistor Mos5 and connecting the node FN5 to the wiring BL. Data is read by turning on the transistor M105. The value of current flowing between the source and the drain of the transistor M106 changes depending on the voltage of the node FN5. The wiring BL is charged or discharged by the current between the source and the drain of the transistor M106, so that the value of data retained in the memory cell 1205 can be read by detecting the voltage (signal D) of the wiring BL.

Note that the transistors M105 and M106 can be p-channel transistors. A voltage applied to the wiring RWL and a voltage applied to the capacitor C105 may be determined in accordance with the conductivity type of the transistors M105 and M106.

In the configuration examples of the memory cells in FIG. 23(A) to FIG. 23(D), each of the transistor Mos3, the transistor Mos4, the transistor Mos5, and the transistor Mos6 is preferably an OS transistor (preferably a transistor including an oxide semiconductor containing In, Ga, and Zn in a channel formation region). Consequently, a leakage current (off-state current) that flows between a source and a drain in an off-state is extremely low; thus, voltage variation of the node FN3, the node FN4, the node FN5, and the node FN6 can be suppressed. That is, each of the memory cell 1203, the memory cell 1204, the memory cell 1205, and the memory cell 1206 can be operated as a memory circuit that can retain data for a long time without power supply.

The memory cell described in this embodiment and the transistor that includes an oxide semiconductor in a channel formation region and is described as an example in Embodiment 9 are used in the memory device 2600 described in the above embodiment, so that it is possible to provide the memory device 2600 that includes a memory circuit capable of retaining data for a long time without power supply and can have a smaller size, reduced power consumption, a higher speed, or a smaller power supply voltage variation.

N-channel transistors used in the memory cell may each be replaced with the transistor that includes an oxide semiconductor in a channel formation region and is described as an example in Embodiment 9. In addition, by using only a transistor including Si in a channel formation region as the p-channel transistor, the manufacturing cost can be reduced.

Note that this embodiment can be combined with the other embodiments shown in this specification as appropriate.

Embodiment 8

A configuration example of an analog-to-digital converter circuit of one embodiment of the present invention will be described.

Figure 25:
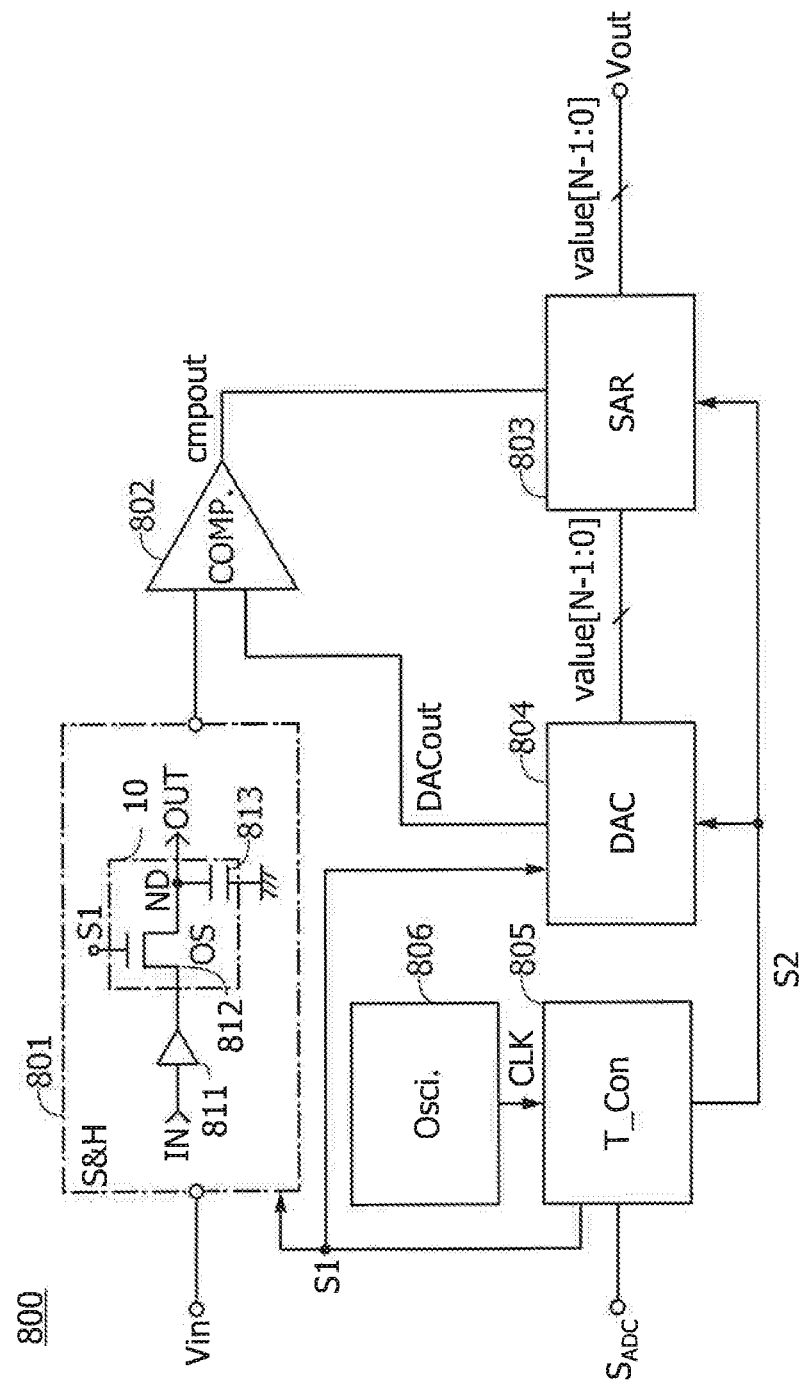
FIG. 25 A block diagram illustrating an example of an analog-to-digital converter circuit.

FIG. 25 illustrates an analog-to-digital converter circuit. An analog-to-digital converter circuit 800 includes a comparator 802, a successive approximation register 803, a digital-to-analog converter circuit 804, a timing controller 805, and an oscillator circuit 806.

The analog-to-digital converter circuit 800 further includes a sample hold circuit 801 (also referred to as a sample-and-hold circuit). The sample-and-hold circuit 801 is a circuit to which a potential of analog data (an analog potential Vin) is input and is capable of holding charge corresponding to the analog potential Vin in accordance with a control signal S1. The control signal S1 is a signal supplied from the timing controller 805.

The sample-and-hold circuit 801 includes, for example, a buffer circuit 811, a transistor 812, and a capacitor 813. An input terminal of the sample-and-hold circuit 801 is connected to one of a source and a drain of the transistor 812. An output terminal of the sample-and-hold circuit 801 is connected to the other of the source and drain of the transistor 812. Note that a node at the other of the source and drain of the transistor 812 is referred to as a node ND for description.

The buffer circuit 811 has a function of amplifying a signal such as analog data input to the sample-and-hold circuit 801 and outputting the amplified signal. Note that although the buffer circuit 811 is provided between the input terminal of the sample-and-hold circuit 801 and the one of the source and the drain of the transistor 812 in FIG. 25, the structure is not limited thereto and the buffer circuit 811 may be connected to the other of the source and the drain of the transistor 812.

The transistor 812 is a transistor having a function of having an extremely low off-state current flowing between the source and drain. For a transistor having such a function, an OS transistor is preferred. An OS transistor will be described in detail in Embodiment 9. Note that in FIG. 25, "OS" is written beside a circuit symbol of an OS transistor to clarify that the transistor is an OS transistor. The one of the source and the drain of the transistor 812 is connected to an input terminal of the sample-and-hold circuit 801. A gate of the transistor 812 is connected to a wiring for supplying the control signal S1. The other of the source and drain of the transistor 812 is connected to the output terminal of the sample-and-hold circuit 801 or the node ND.

The capacitor 813 has a function of holding a charge corresponding to the analog potential Vin when the transistor 812 is turned off. Note that in FIG. 25, the capacitor 813 is connected to the other of the source and drain of the transistor 812, that is, to the node ND; however, the capacitor 813 is not necessarily provided and can be omitted when gate capacitance or the like in an input terminal of the comparator 802 is utilized. Note that a circuit including the transistor 812 and the capacitor 813 and holding the charge corresponding to the analog potential Vin is denoted by a first circuit 10 in the drawing.

The comparator 802 has a function of comparing the level of the analog potential Vin held in the sample-and-hold circuit 801 and that of an analog potential DACout output by the digital-to-analog converter circuit 804, and outputting a signal cmpout in accordance with the comparison result.

The successive approximation register 803 has a function of holding N-bit digital (N is a natural number larger than or equal to 2) in accordance with a change in the analog potential DACout, and outputting the data. The N-bit digital data, that is, the digital data from the 0th bit to the (N−1)-th bit (denoted by value[N−1:0] in FIG. 25), is output to the outside as Vout, and also output to the digital-to-analog converter circuit 804. The successive approximation register 803 includes a logic circuit including registers corresponding to respective bits, and can output digital data in accordance with control by a control signal S2. The control signal S2 is a signal supplied from the timing controller 805.

The digital-to-analog converter circuit 804 has a function of generating the analog potential DACout in accordance with the digital data, and outputting the potential. The digital-to-analog converter circuit 804 may be the conversion type with a capacitor (C-DAC) or the conversion type with a resistor (R-DAC). In particular, a C-DAC including an OS transistor is preferable to hold a digital value. Note that a structure of the C-DAC including an OS transistor is described in a later embodiment with a specific circuit structure.

Figure 26:
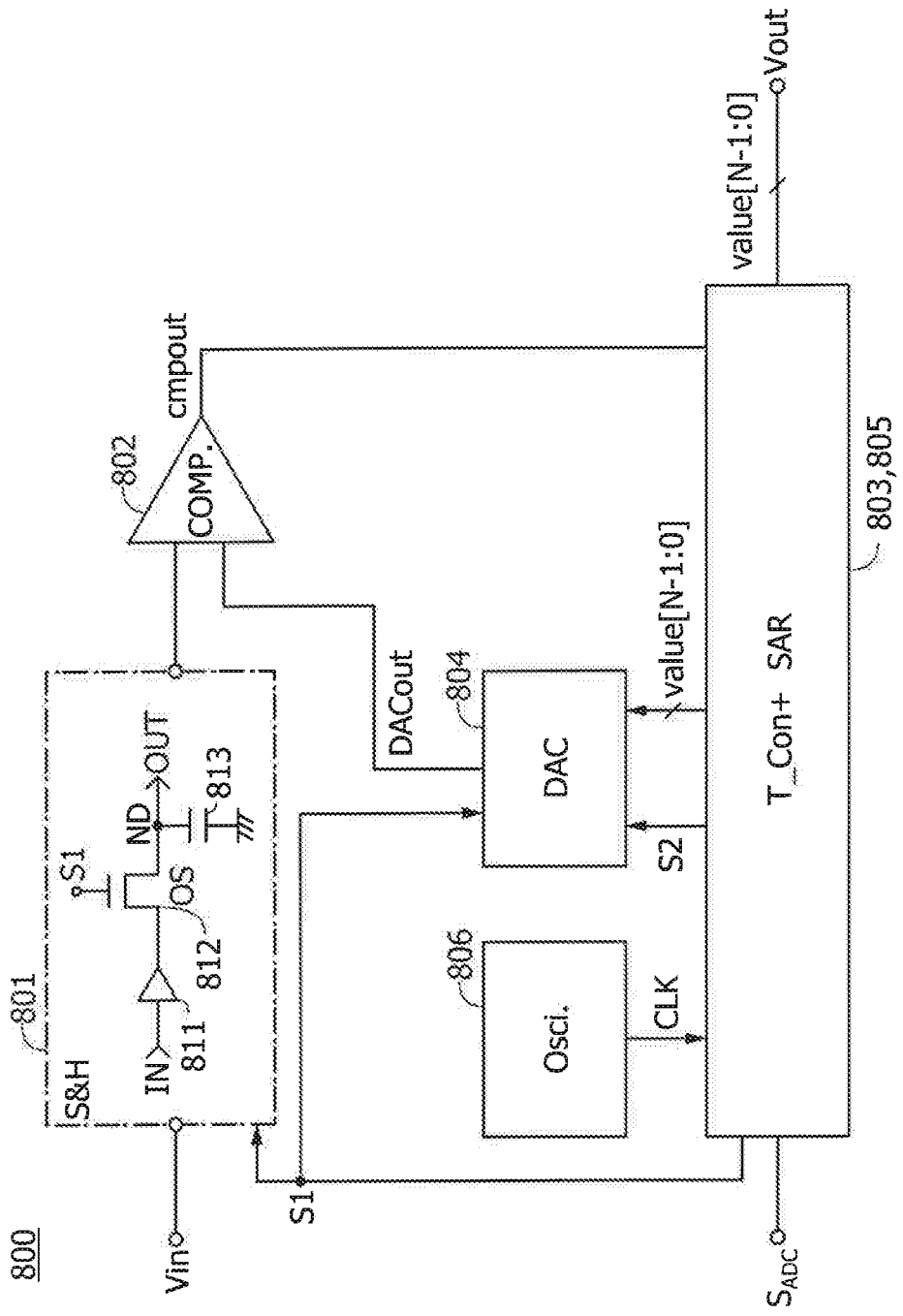
FIG. 26 A block diagram illustrating an example of an analog-to-digital converter circuit.

The timing controller 805 has a function of generating and outputting the control signal S1 and the control signal S2 in synchronization with a clock signal CLK in accordance with a signal $S_{ADC}$. The timing controller 805 includes a logic circuit, and can output the control signal S1 and the control signal S2 in accordance with the clock signal CLK and the signal $S_{ADC}$. The timing controller 805 including the logic circuit can be formed to be integral with the successive approximation register 803 including the logic circuit as shown in FIG. 26. The timing controller is referred to as a control circuit in some cases.

The oscillator circuit 806 has a function of generating and outputting the clock signal CLK. The oscillator circuit 806 may be a clock signal generated by a crystal oscillator or a clock signal generated by a ring oscillator.

In the analog-to-digital converter circuit 800 illustrated in FIG. 25, the analog potential Vin acquired by a sensor circuit or the like is held in the sample-and-hold circuit 801 that includes the transistor 812 whose off-state current is significantly low. In the sample-and-hold circuit 801, by turning off the transistor 812, the analog potential Vin is held at the node ND capable of holding a charge. Thus, supply of electric power to the buffer circuit 811 included in the sample-and-hold circuit 801 or the like is stopped, leading to a reduction in power consumption.

Furthermore, with this structure, power consumption can be reduced without inhibiting the drive voltage or the frequency of the clock signal, so that it is possible to avoid decreasing the performance of the analog-to-digital converter circuit, such as the resolution or sampling rate. In addition, with this structure, the analog data can be held without the use of a flash memory or the like, whereby power consumption can be reduced without the provision of a dedicated high-voltage generation circuit or a dedicated peripheral circuit.

Figure 27:
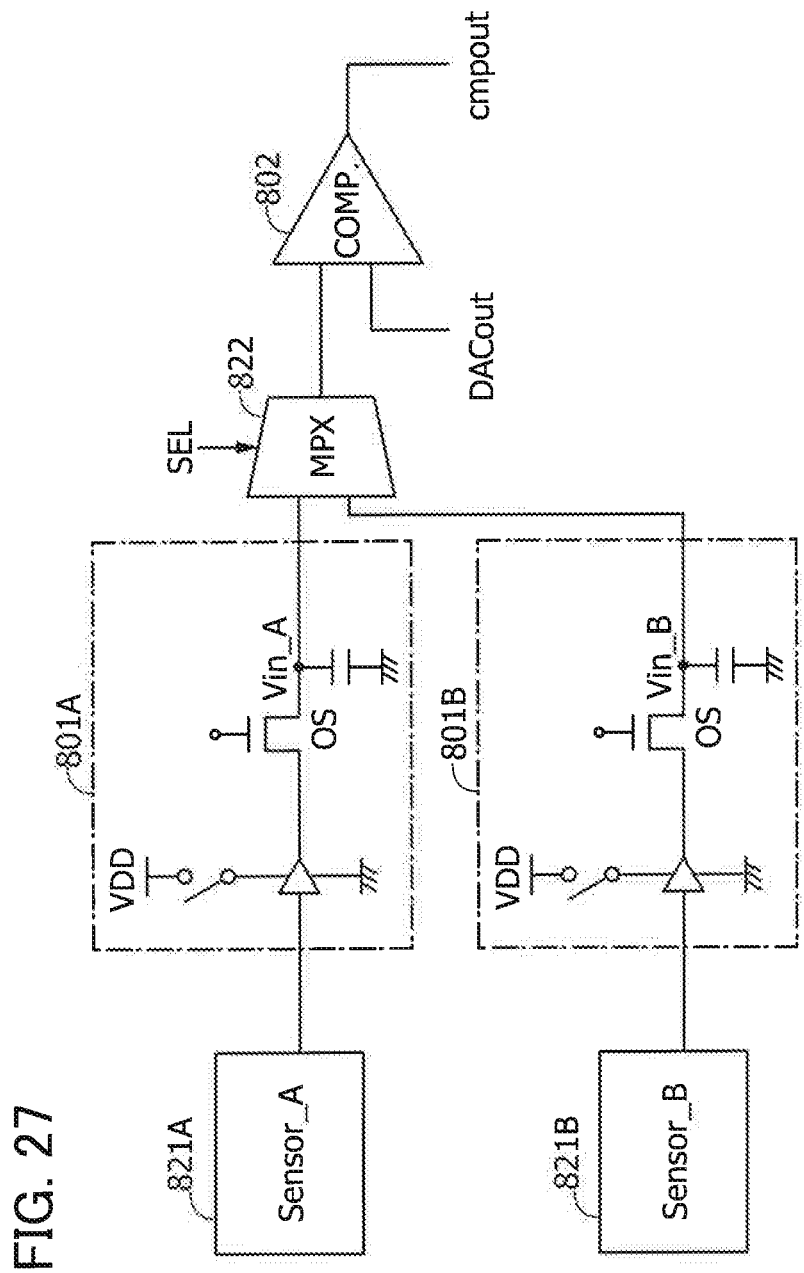
FIG. 27 A block diagram illustrating an example of an analog-to-digital converter circuit.

Note that a plurality of sensor circuits that supply the analog potential Vin to the sample-and-hold circuit 801 may be provided. In that case, when a sensor circuit 821A and a sensor circuit 821B are provided as illustrated in FIG. 27, a sample-and-hold circuit 801A and a sample-and-hold circuit 801B are provided. A selector 822 (also referred to as multiplexer, and abbreviated to MPX in FIG. 27) is provided between each of the sample-and-hold circuit 801A and the sample-and-hold circuit 801B and the comparator 802.

In accordance with a selection signal SEL, the selector 822 has a function of selecting any one of the analog potentials of the sample-and-hold circuit 801A and the sample-and-hold circuit 801B, and outputting the potential to the comparator 802. The sample-and-hold circuit 801A and the sample-and-hold circuit 801B each have a function similar to that of the sample-and-hold circuit 801 described in FIG. 25, so that they can hold the analog potentials Vin_A and Vin_B obtained in the sensor circuit 821A and the sensor circuit 821B, and power supply to the buffer circuit can be stopped. Accordingly, the operation can be performed to reduce power consumption. Furthermore, after once sampling the analog potentials Vin_A and Vin_B in the sample-and-hold circuit 801A and the sample-and-hold circuit 801B, power supply to the sensor circuit 821A and the sensor circuit 821B can be stopped to stop supply of the analog potentials Vin_A and Vin_B from the sensor circuit 821A and the sensor circuit 821B. Accordingly, the power consumption of the sensor circuit 821A and the sensor circuit 821B can be reduced.

Note that the analog potential obtained in the sensor circuit may be constant or always be variable. When sampling a variable analog potential, the sampling may be performed with the use of a correlated double sampling (CDS: Correlated Double Sampling) circuit. The correlated double sampling circuit is used to remove noise by obtaining relative difference between two timings.

Figure 28A:
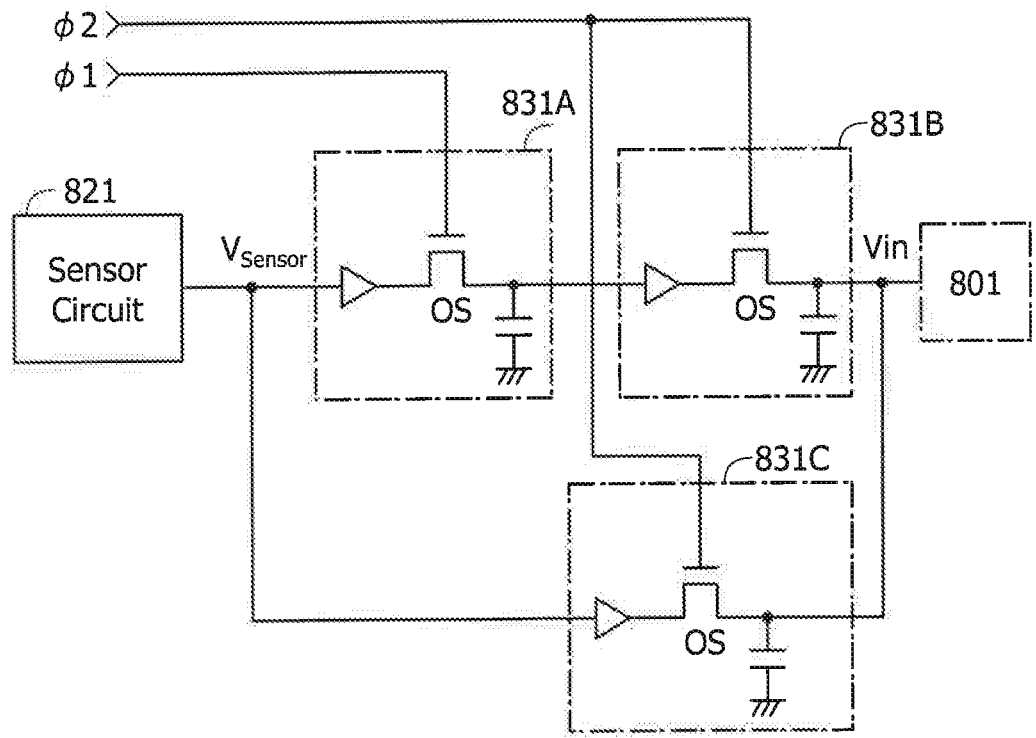
FIG. 28 A block diagram illustrating part of an analog-to-digital converter circuit and a timing chart showing an operation thereof.

FIG. 28(A) shows an example of the correlated double sampling circuit. The correlated double sampling circuit includes sample-and-hold circuits 831A to 831C. For the sample-and-hold circuits 831A to 831C, a circuit similar to the sample-and-hold circuit 801 shown in FIG. 25 can be used. A control signal ϕ1 is supplied to a transistor of the sample-and-hold circuit 831A, and a control signal ϕ2 is supplied to transistors of the sample-and-hold circuit 831B and the sample-and-hold circuit 831C.

The use of OS transistors as transistors that are turned off by the control signal ϕ1 and ϕ2 can reduce changes in the potential sampled for obtaining the difference. Thus, the accuracy of the correlated double sampling circuit can be improved. In addition, in addition, after once sampling a potential, power supply to buffer circuits of the sample-and-hold circuits 831A to 831C can be stopped, whereby power consumption can be reduced.

Figure 28B:
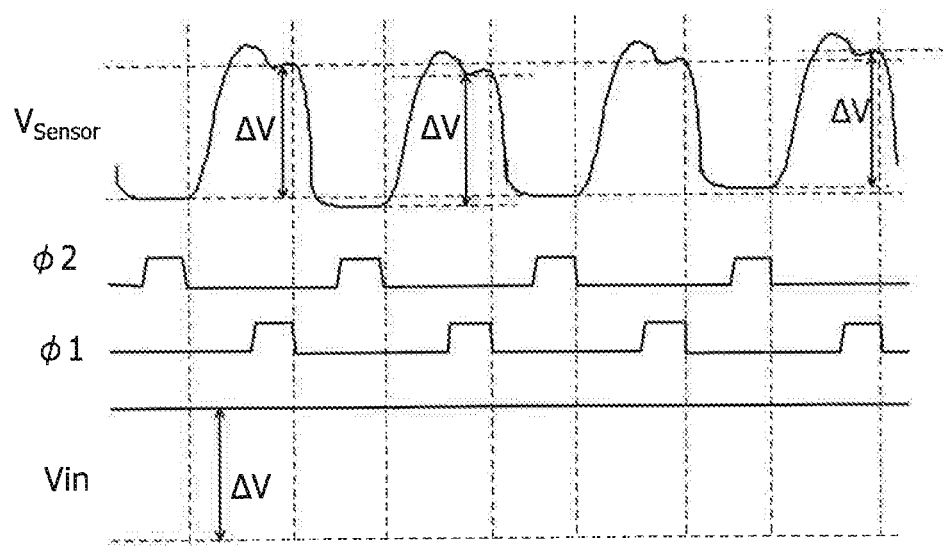

FIG. 28(B) shows a timing chart illustrating an operation example of the correlated double sampling circuit shown in FIG. 28(A). Note that a potential $V_{Sensor}$ is a variable potential obtained in the sensor circuit 821, and the potential Vin is an analog potential transmitted through the correlated double sampling circuit. As shown in FIG. 28(B), even when the potential $V_{Sensor}$ is variable, conducting sampling to obtain the difference in a regular cycle makes it possible to obtain the potential Vin as an analog potential that is constant at a voltage ΔV.

Figure 29A:
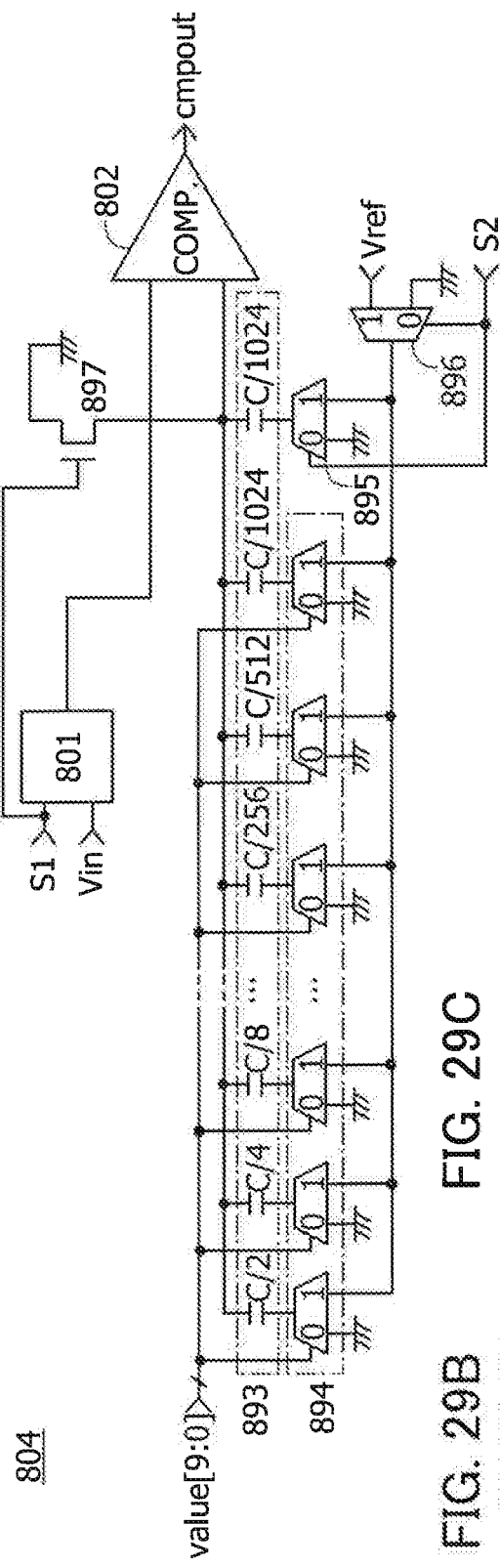
FIG. 29 Block diagrams illustrating parts of an analog-to-digital converter circuit.

FIG. 29(A) shows a circuit configuration example of the digital-to-analog converter circuit 804. Note that FIG. 29(A) shows a 10-bit C-DAC. In FIG. 29(A), the sample-and-hold circuit 801 and the comparator 802 are also shown for description. The digital-to-analog converter circuit 804 shown in FIG. 29(A) includes capacitors 893, selectors 894, 895, and 896, and a transistor 897. The capacitor 893 has capacitance corresponding to the bit number. Examples of the capacitance are written beside the capacitors 893 in FIG. 29(A). Furthermore, the selectors 894 and 895 are provided corresponding to the capacitor 893.

Figure 29C:
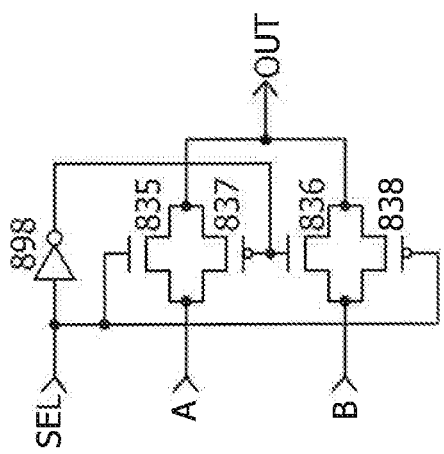
Figure 29B:
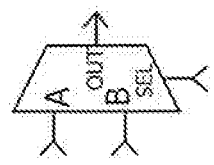

FIG. 29(B) shows a circuit configuration example of the selectors 894, 895, and 896 of FIG. 29(A). Note that the control signal S2 is supplied to terminals SEL of the selectors 895 and 896. Note that a potential selected by the selector 896 is supplied to terminals A of the selectors 894 and 895. Note that a reference potential Vref is supplied to a terminal A of the selector 896. Note that a ground potential is supplied to terminals B of the selectors 894, 895, and 896.

Furthermore, FIG. 29(C) shows a more specific circuit configuration example of the selectors of FIG. 29(B). The selector shown in FIG. 29(C) includes an inverter circuit 898, an n-channel transistor 835, a transistor 836, a p-channel transistor 837, and a transistor 838.

Figure 30:
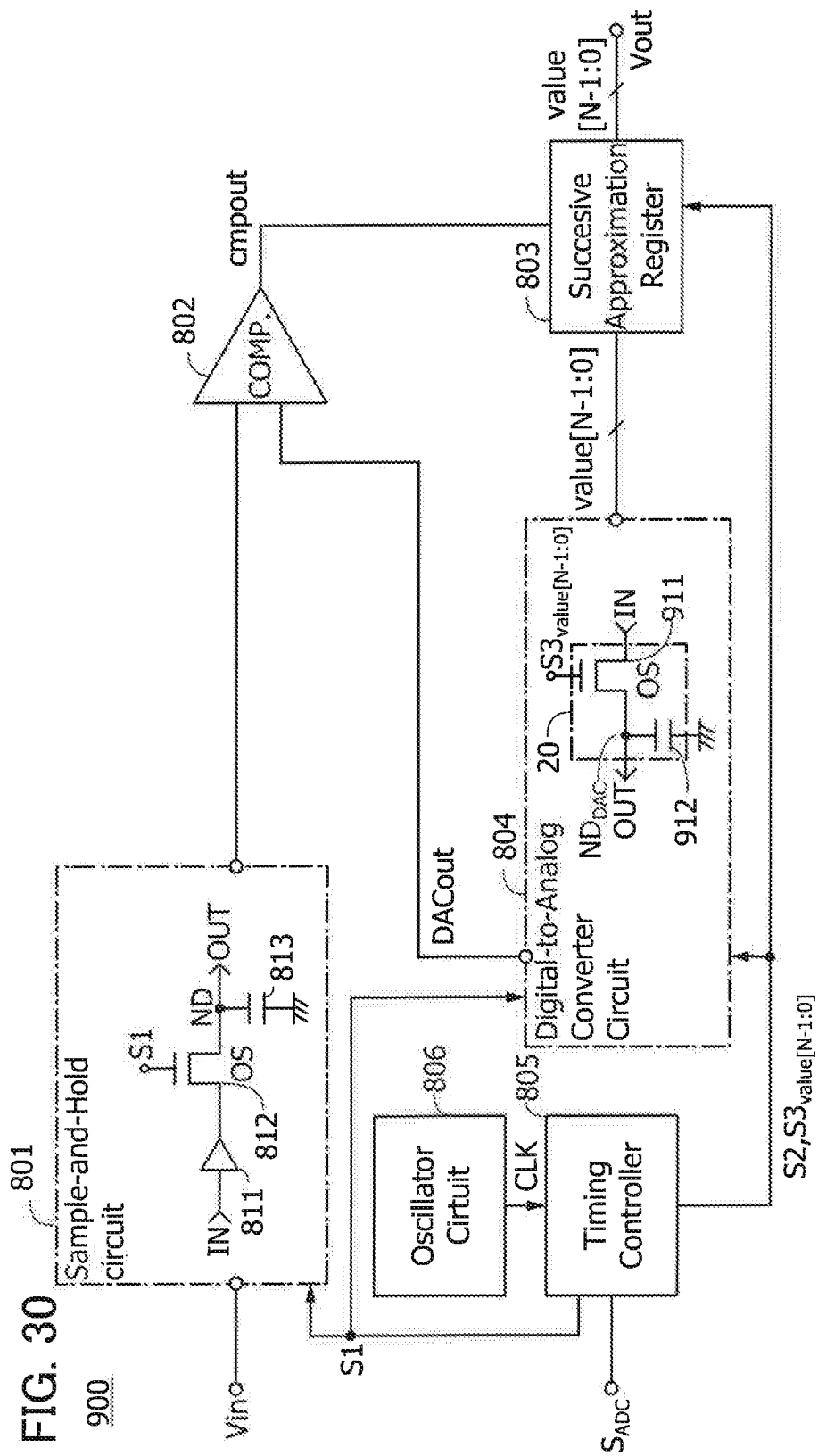
FIG. 30 A block diagram illustrating an example of an analog-to-digital converter circuit.

Next, FIG. 30 illustrates an example of an analog-to-digital converter circuit which is different from that in FIG. 25.

An analog-to-digital converter circuit 900 shown in FIG. 30 includes the sample-and-hold circuit 801, the successive approximation register 803, the digital-to-analog converter circuit 804, the timing controller 805, and the oscillator circuit 806.

The analog-to-digital converter circuit 900 illustrated in FIG. 30 is different from the analog-to-digital converter circuit 800 in FIG. 25 in that a transistor 911 and a capacitor 912 for holding digital data are included in the digital-to-analog converter circuit 804. A gate of the transistor 911 is supplied with a control signal $S3_{value[N-1:0]}$ for controlling the on/off state in accordance with each bit from the timing controller 805. Different points from the analog-to-digital converter circuit 800 in FIG. 25 will be described in detail below, and the description of the same points as the analog-to-digital converter circuit 800 in FIG. 25 is omitted.

When the transistor 911 is turned off, a charge corresponding to the potential of digital data is held in a node $ND_{DAC}$. In this way, the transistor 911 and the capacitor 912 hold the digital data. Like the transistor 812, the transistor 911 is a transistor having a function of having an extremely low off-state current flowing between a source and a drain, and is preferably an OS transistor. Note that a circuit including the transistor 911 and the capacitor 912 and holding charge corresponding to the potential of digital data is denoted by a second circuit 20.

In the case where the digital data is held in the digital-to-analog converter circuit 804, the transistor 911 and the capacitor 912 may be added to the selector 894 of FIG. 29(A) to FIG. 29(C). FIG. 31(A) and FIG. 31(B) show an example of a circuit diagram where the transistor 911 and the capacitor 912 are added to the selector 894. Note that in the example of FIG. 31(A) and FIG. 31(B), as the control signal $S3_{value[N-1:0]}$, a control signal $S3_{value[0]}$ of the 0th bit is supplied to the gate of the transistor 911.

With the structure of FIG. 30, power consumption can be reduced by stopping power supply to the sample-and-hold circuit 801, the comparator 802, the successive approximation register 803, and the digital-to-analog converter circuit 804. Specifically, as shown in FIG. 31, when the analog potential Vin is held in the sample-and-hold circuit 801, power supply to the buffer circuit 811 can be stopped. In addition, at every time digital data of a certain bit is determined in the digital-to-analog converter circuit 804, power supply to the corresponding register in the successive approximation register 803 can be stopped. Furthermore, power supply to the comparator 802 and the digital-to-analog converter circuit 804 can be stopped.

The structure disclosed in this embodiment enables the potential of analog data or digital data to be held with the use of an OS transistor even after power supply is stopped; therefore, power supply to each circuit can be stopped to reduce power consumption. In addition, if power supply to the whole semiconductor device functioning as an analog-to-digital converter circuit is stopped after determination of digital data, power consumption can be reduced until another analog potential Vin is input.

As is the case in the semiconductor device in Embodiment 1, the semiconductor device described in this embodiment functioning as an analog-to-digital converter circuit makes the sample-and-hold circuit 801 including the transistor with an extremely low off-state current hold the analog potential Vin obtained in the sensor or the like. In addition, the determined digital data is held in the digital-to-analog converter circuit. According to one embodiment of the present invention, power supply to each circuit included in the semiconductor device can be stopped to reduce power consumption.

In the semiconductor device of this embodiment, power consumption can be reduced without inhibiting the drive voltage or the frequency of the clock signal, so that it is possible to avoid decreasing the performance of the analog-to-digital converter circuit, such as the resolution or sampling rate. In the semiconductor device of this embodiment, the analog data can be held without the use of a flash memory or the like, whereby power consumption can be reduced without the provision of a dedicated high-voltage generation circuit or a dedicated peripheral circuit.

Note that this embodiment can be combined with the other embodiments shown in this specification as appropriate.

Embodiment 9

In this embodiment, transistors of one embodiment of the disclosed invention will be described.

Transistors according to one embodiment of the present invention each preferably include an nc-OS or a CAAS-OS to be described in Embodiment 11.

Structural Example 1 of Transistor

Figure 32A:
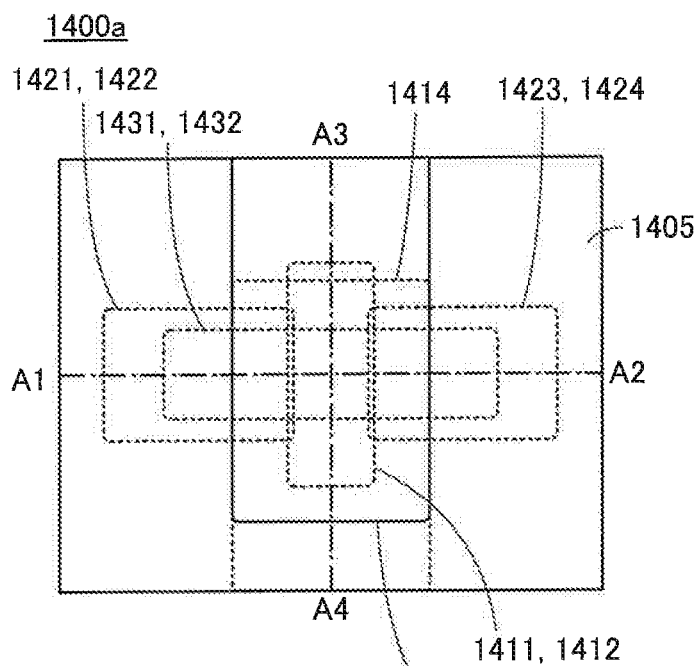
FIG. 32 A top view and cross-sectional views illustrating a structural example of a transistor.
Figure 32B:
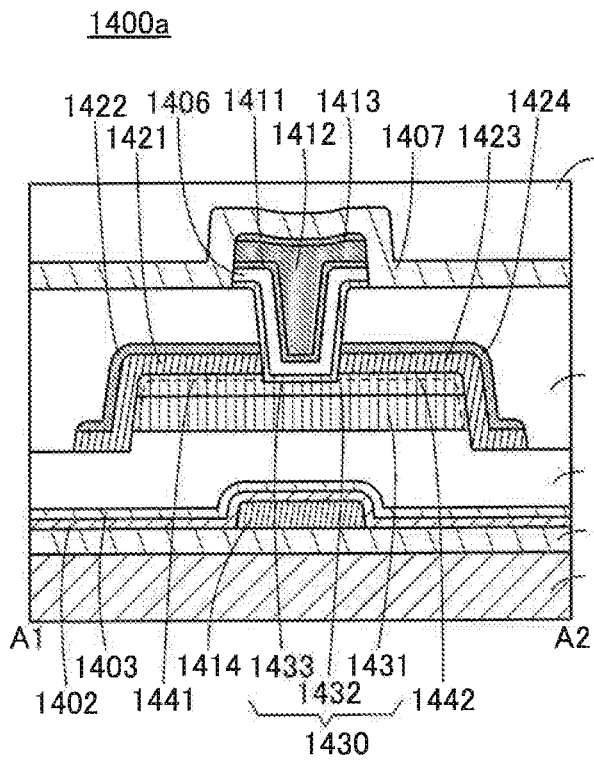
Figure 32C:
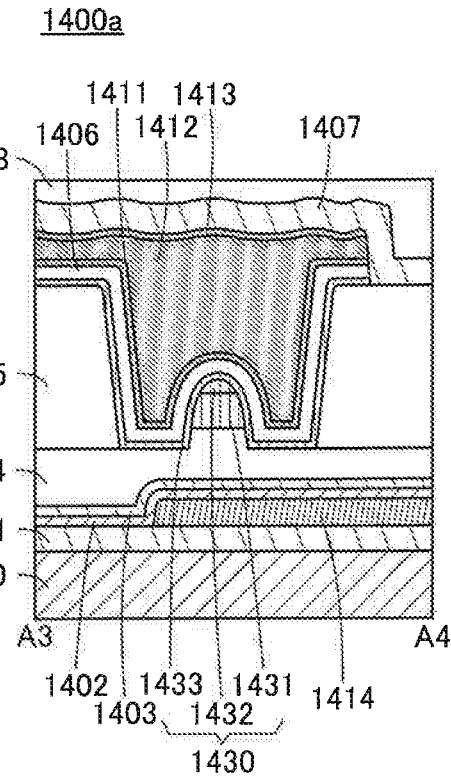

FIG. 32(A) to FIG. 32(C) are a top view and cross-sectional views of a transistor 1400a. FIG. 32(A) is a top view. FIG. 32(B) is a cross-sectional view taken along dashed-dotted line A1-A2 in FIG. 32(A) and FIG. 32(C) is a cross-sectional view taken along dashed-dotted line A3-A4 in FIG. 32(A). Note that for simplification of the drawing, some components are not illustrated in the top view in FIG. 32(A). Note that the dashed-dotted line A1-A2 and the dashed-dotted line A3-A4 are sometimes referred to as a channel length direction of the transistor 1400a and a channel width direction of the transistor 1400a, respectively.

The transistor 1400a includes a substrate 1450, an insulating film 1401 over the substrate 1450, a conductive film 1414 over the insulating film 1401, an insulating film 1402 formed to cover the conductive film 1414, an insulating film 1403 over the insulating film 1402, an insulating film 1404 over the insulating film 1403, a stack in which a metal oxide 1431 and a metal oxide 1432 are formed in this order over the insulating film 1404, a conductive film 1421 in contact with top and side surfaces of the metal oxide 1432, a conductive film 1423 also in contact with the top and side surfaces of the metal oxide 1432, a conductive film 1422 over the conductive film 1421, a conductive film 1424 over the conductive film 1423, an insulating film 1405 over the conductive film 1422 and over the conductive film 1424, a metal oxide 1433 in contact with the metal oxide 1431, the metal oxide 1432, the conductive film 1421 to the conductive film 1424, and the insulating film 1405, an insulating film 1406 over the metal oxide 1433, a conductive film 1411 over the insulating film 1406, a conductive film 1412 over the conductive film 1411, a conductive film 1413 over the conductive film 1412, an insulating film 1407 formed to cover the conductive film 1413, and an insulating film 1408 over the insulating film 1407. Note that the metal oxide 1431, the metal oxide 1432, and the metal oxide 1433 are collectively referred to as a metal oxide 1430.

The metal oxide 1432 is a semiconductor and serves as a channel of the transistor 1400a.

Furthermore, the metal oxide 1431 and the metal oxide 1432 include a region 1441 and a region 1442. The region 1441 is formed in the vicinity of a region where the conductive film 1421 is in contact with the metal oxide 1431 and the metal oxide 1432. The region 1442 is formed in the vicinity of a region where the conductive film 1423 is in contact with the metal oxide 1431 and the metal oxide 1432.

The region 1441 and the region 1442 serve as low-resistance regions. The region 1441 contributes to a decrease in the contact resistance between the conductive film 1421 and the metal oxide 1431 and the metal oxide 1432. The region 1442 also contributes to a decrease in the contact resistance between the conductive film 1423 and the metal oxide 1431 and the metal oxide 1432.

The conductive film 1421 and the conductive film 1422 serve as one of a source electrode and a drain electrode of the transistor 1400a. The conductive film 1423 and the conductive film 1424 serve as the other of the source electrode and drain electrode of the transistor 1400a.

The conductive film 1422 has a function of allowing less oxygen to pass therethrough than the conductive film 1421. It is thus possible to prevent a decrease in the conductivity of the conductive film 1421 due to oxidation.

The conductive film 1424 also has a function of allowing less oxygen to pass therethrough than the conductive film 1423. It is thus possible to prevent a decrease in the conductivity of the conductive film 1423 due to oxidation.

The conductive film 1411 to the conductive film 1413 serve as a first gate electrode of the transistor 1400a.

The conductive film 1411 and the conductive film 1413 have a function of allowing less oxygen to pass therethrough than the conductive film 1412. It is thus possible to prevent a decrease in the conductivity of the conductive film 1412 due to oxidation.

The insulating film 1406 serves as a first gate insulating film of the transistor 1400a.

The conductive film 1414 serves as a second gate electrode of the transistor 1400a.

The potential applied to the conductive film 1411 to the conductive film 1413 may be the same as or different from that applied to the conductive film 1414. Furthermore, the conductive film 1414 may be omitted in some cases.

The insulating film 1401 to the insulating film 1404 serve as a base insulating film of the transistor 1400a. Furthermore, the insulating film 1402 to the insulating film 1404 also serve as a second gate insulating film of the transistor 1400a.

The insulating films 1405 to 1408 serve as a protective insulating film or an interlayer insulating film of the transistor 1400a.

As shown in FIG. 32(C), the side surface of the metal oxide 1432 is surrounded by the conductive film 1411. With this structure, the metal oxide 1432 can be electrically surrounded by an electric field of the conductive film 1411. A structure in which a semiconductor is electrically surrounded by an electric field of a gate electrode is referred to as a surrounded channel (s-channel) structure. With such a structure, a channel is formed in the entire metal oxide 1432 (bulk). In the s-channel structure, a large amount of current can flow between a source and a drain of a transistor, increasing the on-state current of the transistor.

The s-channel structure, because of its high on-state current, is suitable for a semiconductor device such as LSI (Large Scale Integration) which requires a miniaturized transistor. Since a transistor can be miniaturized, a semiconductor device including the transistor can be a semiconductor device having a high integration degree and high density.

In the transistor 1400a, a region serving as a gate electrode is formed so as to fill an opening formed in the insulating film 1405 or the like, that is, in a self-aligned (self align) manner.

As shown in FIG. 32(B), the conductive film 1411 and the conductive film 1422 have a region where they overlap with each other with the insulating film positioned therebetween. The conductive film 1411 and the conductive film 1423 also have a region where they overlap with each other with the insulating film positioned therebetween. These regions serve as the parasitic capacitance caused between the gate electrode and the source electrode or drain electrode and might decrease the operation speed of the transistor 1400a. This parasitic capacitance can be reduced by providing the insulating film 1405 in the transistor 1400a. The insulating film 1405 preferably contains a material with a low relative dielectric constant.

Figure 33A:
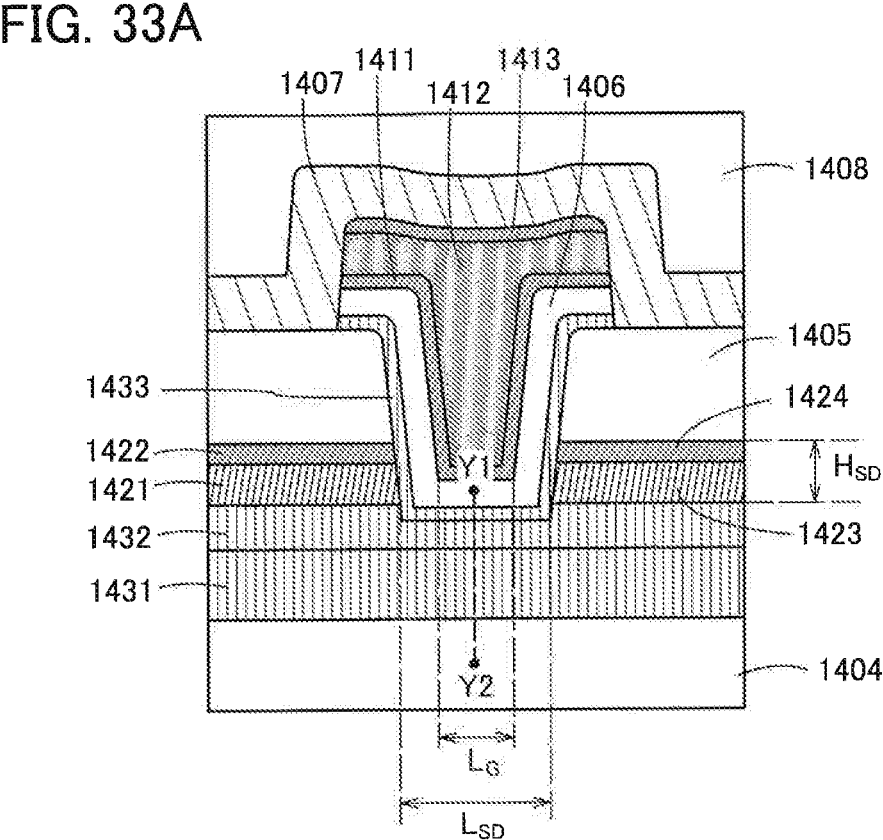
FIG. 33 A cross-sectional view and an energy band diagram showing a structural example of a transistor.

FIG. 33(A) is an enlarged view of the center of the transistor 1400a. In FIG. 33(A), a width $L_G$ denotes the length of the bottom surface of the conductive film 1411, which faces parallel to the top surface of the metal oxide 1432 with the insulating film 1406 and the metal oxide 1433 positioned therebetween. The width $L_G$ is the line width of the gate electrode. Furthermore, in FIG. 33(A), a width $L_{SD}$ indicates the length between the conductive film 1421 and the conductive film 1423. The width $L_{SD}$ is the length between the source electrode and the drain electrode.

The width $L_{SD}$ is generally determined by the minimum feature size. As shown in FIG. 33(A), the width $L_G$ is narrower than the width $L_{SD}$. This means that in the transistor 1400a, the line width of the gate electrode can be made narrower than the minimum feature size. Specifically, the width $L_G$ can be greater than or equal to 5 nm and less than or equal to 60 nm, preferably greater than or equal to 5 nm and less than or equal to 30 nm.

In FIG. 33(A), a height $H_{SD}$ denotes the total thickness of the conductive film 1421 and the conductive film 1422, or the total thickness of the conductive film 1423 and the conductive film 1424.

The thickness of the insulating film 1406 is preferably less than or equal to the height $H_{SD}$, in which case the electric field of the gate electrode can be applied to the entire channel formation region. The thickness of the insulating film 1406 is less than or equal to 30 nm, preferably less than or equal to 10 nm.

The parasitic capacitance between the conductive film 1422 and the conductive film 1411 and the parasitic capacitance between the conductive film 1424 and the conductive film 1411 are inversely proportional to the thickness of the insulating film 1405. For example, the thickness of the insulating film 1405 is preferably three times or more, and further preferably five times or more the thickness of the insulating film 1406, in which case the parasitic capacitance is negligibly small. As a result, the transistor 1400a can operate at high frequencies.

Components of the transistor 1400a will be described below.

<<Metal Oxide Layer>>

First, a metal oxide that can be used as the metal oxide 1431 to the metal oxide 1433 will be described.

The transistor 1400a preferably has a low current (off-state current) flowing between a source and a drain in the non-conduction state. Examples of the transistor with a low off-state current include a transistor including an oxide semiconductor in a channel formation region.

The metal oxide 1432 is an oxide semiconductor containing indium (In), for example. The metal oxide 1432 can have high carrier mobility (electron mobility) by containing indium, for example. Furthermore, the metal oxide 1432 preferably contains an element M. The element M is preferably aluminum (Al), gallium (Ga), yttrium (Y), tin (Sn), or the like. Other elements which can be used as the element M are boron (B), silicon (Si), titanium (Ti), iron (Fe), nickel (Ni), germanium (Ge), zirconium (Zr), molybdenum (Mo), lanthanum (La), cerium (Ce), neodymium (Nd), hafnium (Hf), tantalum (Ta), tungsten (W), magnesium (Mg), and the like. Note that two or more of the above elements may be used in combination as the element M. The element M is an element having a high bonding energy with oxygen, for example. The element M is an element whose bonding energy with oxygen is higher than that of indium, for example. The element M is an element having a function of increasing the energy gap of the metal oxide, for example. Furthermore, the metal oxide 1432 preferably contains zinc (Zn). When containing zinc, the metal oxide is easily crystallized in some cases.

Note that the metal oxide 1432 is not limited to the oxide semiconductor containing indium. The metal oxide 1432 may be, for example, an oxide semiconductor which does not contain indium and contains zinc, an oxide semiconductor which does not contain indium and contains gallium, or an oxide semiconductor which does not contain indium and contains tin, e.g., a zinc tin oxide or a gallium tin oxide.

For the metal oxide 1432, an oxide semiconductor with a wide energy gap is used, for example. For example, the energy gap of the metal oxide 1432 is greater than or equal to 2.5 eV and less than or equal to 4.2 eV, preferably greater than or equal to 2.8 eV and less than or equal to 3.8 eV, further preferably greater than or equal to 3 eV and less than or equal to 3.5 eV.

The metal oxide 1432 is preferably a CAAC-OS film which is described later.

For example, the metal oxide 1431 and the metal oxide 1433 are metal oxides including one or more, or two or more elements other than oxygen included in the metal oxide 1432. Since the metal oxide 1431 and the metal oxide 1433 each include one or more, or two or more elements other than oxygen included in the metal oxide 1432, an interface state is less likely to be formed at the interface between the metal oxide 1431 and the metal oxide 1432 and the interface between the metal oxide 1432 and the metal oxide 1433.

Note that in the case of using an In-M-Zn oxide as the metal oxide 1431, when a summation of In and M is assumed to be 100 atomic %, the proportions of In and M are preferably set to be lower than 50 atomic % and higher than 50 atomic %, respectively, further preferably lower than 25 atomic % and higher than 75 atomic %, respectively. When the metal oxide 1431 is formed by a sputtering method, a sputtering target with the above composition is preferably used. For example, In:M:Zn=1:3:2, In:M:Zn=1:3:4, and the like are preferable.

Furthermore, in the case of using an In-M-Zn oxide as the metal oxide 1432, when the summation of In and M is assumed to be 100 atomic %, the proportions of In and M are preferably set to be higher than 25 atomic % and lower than 75 atomic %, respectively, further preferably higher than 34 atomic % and lower than 66 atomic %, respectively. When the metal oxide 1432 is formed by a sputtering method, a sputtering target with the above composition is preferably used. For example, In:M:Zn=1:1:1, In:M:Zn=1:1:1.2, In:M:Zn=2:1:3, In:M:Zn=3:1:2, and In:M:Zn=4:2:4.1 are preferable. In particular, when a sputtering target with an atomic ratio of In:M:Zn=4:2:4.1 is used, the atomic ratio of In to Ga to Zn in the metal oxide 1432 may be approximately 4:2:3.

Furthermore, in the case of using an In-M-Zn oxide as the metal oxide 1433, when the total proportion of In and M is assumed to be 100 atomic %, the proportions of In and M are preferably set to be lower than 50 atomic % and higher than 50 atomic %, respectively, more preferably lower than 25 atomic % and higher than 75 atomic %, respectively. For example, In:M:Zn=1:3:2, In:M:Zn=1:3:4, and the like are preferable. In addition, the metal oxide 1433 may be a metal oxide that is the same type as that of the metal oxide 1431.

Furthermore, the metal oxide 1431 or the metal oxide 1433 does not necessarily contain indium in some cases. For example, the metal oxide 1431 or the metal oxide 1433 may be gallium oxide.

Figure 33B:
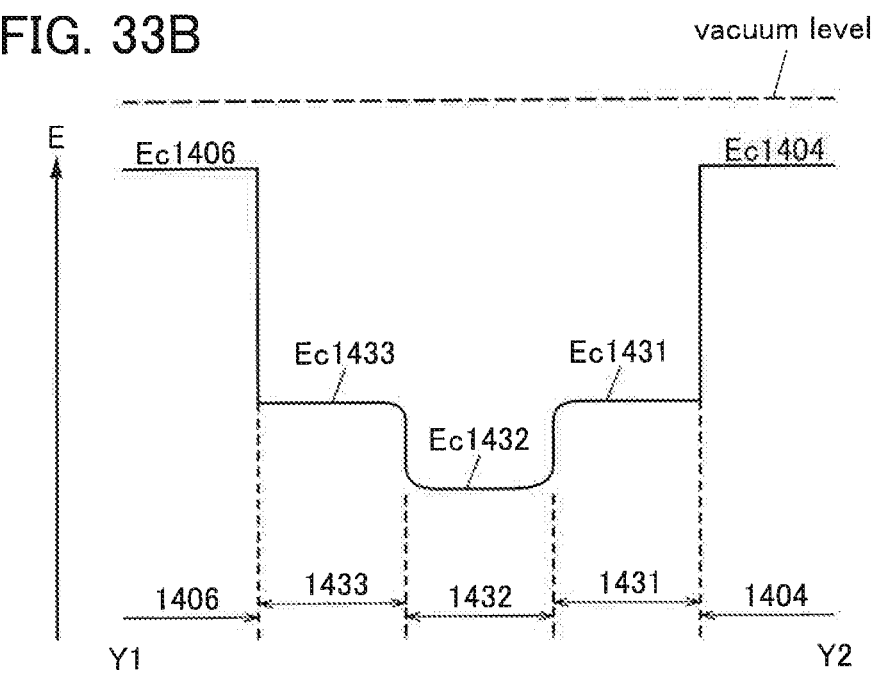

The function and effect of the metal oxide 1430, which includes a stack of the metal oxide 1431 to the metal oxide 1433, are described with reference to the energy band diagram of FIG. 33(B). FIG. 33(B) shows an energy band structure of a portion taken along dashed line Y1-Y2 in FIG. 33(A). Furthermore, FIG. 33(B) shows the energy band structure of a channel formation region of the transistor 1400a and the vicinity thereof.

In FIG. 33(B), Ec1404, Ec1431, Ec1432, Ec1433, and Ec1406 indicate the energy at the bottom of the conduction band of the insulating film 1404, the metal oxide 1431, the metal oxide 1432, the metal oxide 1433, and the insulating film 1406, respectively.

Here, a difference in energy between the vacuum level and the bottom of the conduction band (the difference is also referred to as "electron affinity") corresponds to a value obtained by subtracting an energy gap from a difference in energy between the vacuum level and the top of the valence band (the difference is also referred to as an ionization potential). Note that the energy gap can be measured using a spectroscopic ellipsometer. The energy difference between the vacuum level and the top of the valence band can be measured using an ultraviolet photoelectron spectroscopy (UPS: Ultraviolet Photoelectron Spectroscopy) device.

Since the insulating film 1404 and the insulating film 1406 are insulators, Ec1406 and Ec1404 are closer to the vacuum level (i.e., have a lower electron affinity) than Ec1431, Ec1432, and Ec1433.

The metal oxide 1432 is a metal oxide having higher electron affinity than those of the metal oxide 1431 and the metal oxide 1433. For example, as the metal oxide 1432, a metal oxide having an electron affinity higher than those of the metal oxide 1431 and the metal oxide 1433 by greater than or equal to 0.07 eV and less than or equal to 1.3 eV, preferably greater than or equal to 0.1 eV and less than or equal to 0.7 eV, more preferably greater than or equal to 0.15 eV and less than or equal to 0.4 eV is used.

Note that an indium gallium oxide has a small electron affinity and a high oxygen-blocking property. Therefore, the metal oxide 1433 preferably includes an indium gallium oxide. The gallium atomic ratio [Ga/(In+Ga)] is, for example, higher than or equal to 70%, preferably higher than or equal to 80%, more preferably higher than or equal to 90%.

At this time, when gate voltage is applied, a channel is formed in the metal oxide 1432 having the highest electron affinity among the metal oxide 1431, the metal oxide 1432, and the metal oxide 1433.

At this time, electrons move mainly in the metal oxide 1432, not in the metal oxide 1431 and the metal oxide 1433. Hence, the on-state current of the transistor hardly varies even when the interface state density, which inhibits electron movement, is high at the interface between the metal oxide 1431 and the insulating film 1404 or at the interface between the metal oxide 1433 and the insulating film 1406. The metal oxides 1431 and 1433 function as an insulating film.

In some cases, there is a mixed region of the metal oxide 1431 and the metal oxide 1432 between the metal oxide 1431 and the metal oxide 1432. Furthermore, in some cases, there is a mixed region of the metal oxide 1432 and the metal oxide 1433 between the metal oxide 1432 and the metal oxide 1433. The mixed region has a low interface state density. For that reason, a stack of the metal oxide 1431, the metal oxide 1432, and the metal oxide 1433 has a band structure where energy at each interface and in the vicinity of the interface is changed continuously (continuous junction).

As described above, the interface between the metal oxide 1431 and the metal oxide 1432 or the interface between the metal oxide 1432 and the metal oxide 1433 has a low interface state density. Hence, electron movement in the metal oxide 1432 is less likely to be inhibited and the on-state current of the transistor can be increased.

Electron movement in the transistor is inhibited, for example, in the case where physical unevenness in a channel formation region is large. To increase the on-state current of the transistor, for example, root mean square (RMS: Root Mean Square) roughness with a measurement area of 1 μm×1 μm of a top surface or a bottom surface of the metal oxide 1432 (a formation surface; here, the top surface of the metal oxide 1431) is less than 1 nm, preferably less than 0.6 nm, more preferably less than 0.5 nm, still more preferably less than 0.4 nm. The average surface roughness (also referred to as Ra) with the measurement area of 1 μm×1 μm is less than 1 nm, preferably less than 0.6 nm, more preferably less than 0.5 nm, still more preferably less than 0.4 nm. The maximum difference in height (also referred to as P-V) with the measurement area of 1 μm×1 μm is less than 10 nm, preferably less than 9 nm, more preferably less than 8 nm, still more preferably less than 7 nm. RMS roughness, Ra, and P-V can be measured using a scanning probe microscope SPA-500 manufactured by SII Nano Technology Inc.

The electron movement is also inhibited, for example, in the case where the density of defect states is high in a region where a channel is formed. For example, in the case where the metal oxide 1432 contains oxygen vacancies (also denoted by $V_O$), donor levels are formed by entry of hydrogen into sites of oxygen vacancies in some cases. A state in which hydrogen enters sites of oxygen vacancies is denoted by $V_O H$ in the following description in some cases. $V_O H$ is a factor of decreasing the on-state current of the transistor because $V_O H$ scatters electrons. Note that sites of oxygen vacancies become more stable by entry of oxygen than by entry of hydrogen. Thus, by decreasing oxygen vacancies in the metal oxide 1432, the on-state current of the transistor can be increased in some cases.

For example, at a certain depth in the metal oxide 1432 or in a certain region of the metal oxide 1432, the concentration of hydrogen measured by secondary ion mass spectrometry (SIMS: Secondary Ion Mass Spectrometry) is set to be higher than or equal to $1\times10^{16}$ atoms/cm$^3$ and lower than or equal to $2\times10^{20}$ atoms/cm$^3$, preferably higher than or equal to $1\times10^{16}$ atoms/cm$^3$ and lower than or equal to $5\times10^{19}$ atoms/cm$^3$, more preferably higher than or equal to $1\times10^{16}$ atoms/cm$^3$ and lower than or equal to $1\times10^{19}$ atoms/cm$^3$, still more preferably higher than or equal to $1\times10^{16}$ atoms/cm$^3$ and lower than or equal to $5\times10^{18}$ atoms/cm$^3$.

To decrease oxygen vacancies in the metal oxide 1432, for example, there is a method in which excess oxygen contained in the insulating film 1404 is moved to the metal oxide 1432 through the metal oxide 1431. In that case, the metal oxide 1431 is preferably a layer having an oxygen-transmitting property (a layer through which oxygen passes or is transmitted).

Note that in the case where the transistor has an s-channel structure, a channel is formed in the entire metal oxide 1432. Therefore, as the metal oxide 1432 has larger thickness, a channel region becomes larger. In other words, the thicker the metal oxide 1432 is, the larger the on-state current of the transistor is.

Moreover, the thickness of the metal oxide 1433 is preferably as small as possible to increase the on-state current of the transistor. For example, the metal oxide 1433 has a region with a thickness of less than 10 nm, preferably less than or equal to 5 nm, more preferably less than or equal to 3 nm. Meanwhile, the metal oxide 1433 has a function of blocking entry of elements other than oxygen (such as hydrogen and silicon) included in the adjacent insulator into the metal oxide 1432 where a channel is formed. Thus, the metal oxide 1433 preferably has a certain thickness. For example, the metal oxide 1433 may have a region with a thickness of greater than or equal to 0.3 nm, preferably greater than or equal to 1 nm, more preferably greater than or equal to 2 nm. Furthermore, the metal oxide 1433 preferably has an oxygen blocking property to inhibit outward diffusion of oxygen released from the insulating film 1404 and the like.

Furthermore, to improve reliability, preferably, the thickness of the metal oxide 1431 is large and the thickness of the metal oxide 1433 is small. For example, the metal oxide 1431 has a region with a thickness of greater than or equal to 10 nm, preferably greater than or equal to 20 nm, more preferably greater than or equal to 40 nm, still more preferably greater than or equal to 60 nm. An increase in the thickness of the metal oxide 1431 can increase the distance from the interface between the adjacent insulator and the metal oxide 1431 to the metal oxide 1432 where a channel is formed. Note that the metal oxide 1431 has a region with a thickness of, for example, less than or equal to 200 nm, preferably less than or equal to 120 nm, more preferably less than or equal to 80 nm, otherwise the productivity of the semiconductor device might be decreased.

For example, a region in which the concentration of silicon measured by SIMS is higher than or equal to $1\times10^{16}$ atoms/cm$^3$ and lower than $1\times10^{19}$ atoms/cm$^3$ is provided between the metal oxide 1432 and the metal oxide 1431. The concentration of silicon is preferably higher than or equal to $1\times10^{16}$ atoms/cm$^3$ and lower than $5\times10^{18}$ atoms/cm$^3$, more preferably higher than or equal to $1\times10^{16}$ atoms/cm$^3$ and lower than $2\times10^{18}$ atoms/cm$^3$. Furthermore, a region in which the concentration of silicon measured by SIMS is higher than or equal to $1\times10^{16}$ atoms/cm$^3$ and lower than $1\times10^{19}$ atoms/cm$^3$ is provided between the metal oxide 1432 and the metal oxide 1433. The concentration of silicon is preferably higher than or equal to $1\times10^{16}$ atoms/cm$^3$ and lower than $5\times10^{18}$ atoms/cm$^3$, more preferably higher than or equal to $1\times10^{16}$ atoms/cm$^3$ and lower than $2\times10^{18}$ atoms/cm$^3$.

Furthermore, it is preferable to reduce the concentration of hydrogen in the metal oxide 1431 and the metal oxide 1433 in order to reduce the concentration of hydrogen in the metal oxide 1432. The metal oxide 1431 and the metal oxide 1433 each have a region in which the concentration of hydrogen measured by SIMS is higher than or equal to $1\times10^{16}$ atoms/cm$^3$ and lower than or equal to $2\times10^{20}$ atoms/cm$^3$. The concentration of hydrogen is preferably higher than or equal to $1\times10^{16}$ atoms/cm$^3$ and lower than or equal to $5\times10^{19}$ atoms/cm$^3$, more preferably higher than or equal to $1\times10^{16}$ atoms/cm$^3$ and lower than or equal to $1\times10^{19}$ atoms/cm$^3$, still more preferably higher than or equal to $1\times10^{16}$ atoms/cm$^3$ and lower than or equal to $5\times10^{18}$ atoms/cm$^3$. It is also preferable to reduce the concentration of nitrogen in the metal oxide 1431 and the metal oxide 1433 in order to reduce the concentration of nitrogen in the metal oxide 1432. The metal oxide 1431 and the metal oxide 1433 each have a region in which the concentration of nitrogen measured by SIMS is higher than or equal to $1\times10^{16}$ atoms/cm$^3$ and lower than $5\times10^{19}$ atoms/cm$^3$. The concentration of nitrogen is preferably higher than or equal to $1\times10^{16}$ atoms/cm$^3$ and lower than or equal to $5\times10^{18}$ atoms/cm$^3$, further preferably higher than or equal to $1\times10^{16}$ atoms/cm$^3$ and lower than or equal to $1\times10^{18}$ atoms/cm$^3$, still further preferably higher than or equal to $1\times10^{16}$ atoms/cm$^3$ and lower than or equal to $5\times10^{17}$ atoms/cm$^3$.

The metal oxide 1431 to the metal oxide 1433 may be formed by a sputtering method, a CVD (Chemical Vapor Deposition) method, an MBE (Molecular Beam Epitaxy) method, a PLD (Pulsed Laser Deposition) method, an ALD (Atomic Layer Deposition) method, or the like.

After the metal oxide 1431 and the metal oxide 1432 are formed, first heat treatment is preferably performed. The first heat treatment can be performed at a temperature higher than or equal to 250° C. and lower than or equal to 650° C., preferably higher than or equal to 450° C. and lower than or equal to 600° C., further preferably higher than or equal to 520° C. and lower than or equal to 570° C. The first heat treatment is performed in an inert gas atmosphere or an atmosphere containing an oxidizing gas at 10 ppm or more, 1% or more, or 10% or more. The first heat treatment may be performed under a reduced pressure. Alternatively, the first heat treatment may be performed in such a manner that heat treatment is performed in an inert gas atmosphere, and then another heat treatment is performed in an atmosphere containing an oxidizing gas at 10 ppm or more, 1% or more, or 10% or more in order to compensate for desorbed oxygen. The first heat treatment can increase the crystallinity of the metal oxide 1431 and the metal oxide 1432 and can remove impurities such as hydrogen and water.

The above-described three-layer structure is an example. For example, a two-layer structure without one of the metal oxide 1431 and the metal oxide 1433 may be employed. Alternatively, for example, any one of semiconductors illustrated as the metal oxide 1431, the metal oxide 1432, and the metal oxide 1433 may be additionally provided over or under the metal oxide 1431 or over or under the metal oxide 1433, i.e., a four-layer structure may be employed. Further alternatively, an n-layer structure (n is an integer number of 5 or more) in which any one of semiconductors illustrated as the metal oxide 1431, the metal oxide 1432, and the metal oxide 1433 is additionally provided at two or more of the following positions may be employed: over the metal oxide 1431, under the metal oxide 1431, over the metal oxide 1433, and under the metal oxide 1433.

<<<Substrate>>>

<<As the substrate 1450, for example, an insulator substrate, a semiconductor substrate, or a conductor substrate may be used. As the insulator substrate, a glass substrate, a quartz substrate, a sapphire substrate, a stabilized zirconia substrate (an yttria-stabilized zirconia substrate or the like), or a resin substrate is used, for example. Examples of the semiconductor substrate include a single element semiconductor substrate of silicon, germanium, or the like, and a compound semiconductor substrate of silicon carbide, silicon germanium, gallium arsenide, indium phosphide, zinc oxide, or gallium oxide. A semiconductor substrate in which an insulator region is provided in the above-described semiconductor substrate, e.g., an SOI (Silicon On Insulator) substrate or the like can also be used. As the conductor substrate, a graphite substrate, a metal substrate, an alloy substrate, a conductive resin substrate, or the like is used. A substrate including a metal nitride, a substrate including a metal oxide, or the like can also be used. An insulator substrate provided with a conductor or a semiconductor, a semiconductor substrate provided with a conductor or an insulator, a conductor substrate provided with a semiconductor or an insulator, or the like can also be used. Alternatively, any of these substrates over which an element is provided may be used. Examples of the element provided over the substrate include a capacitor, a resistor, a switching element, a light-emitting element, a memory element, and the like.

Furthermore, a flexible substrate may be used as the substrate 1450. Note that as a method for providing a transistor over a flexible substrate, there is a method in which a transistor is formed over a non-flexible substrate, and then the transistor is separated and transferred to the substrate 1450 which is a flexible substrate. In that case, a separation layer is preferably provided between the non-flexible substrate and the transistor. Note that as the substrate 1450, a sheet, a film, or foil containing a fiber may be used. The substrate 1450 may have elasticity. The substrate 1450 may have a property of returning to its original shape when bending or pulling is stopped. Alternatively, the substrate 1450 may have a property of not returning to its original shape. The thickness of the substrate 1450 is, for example, greater than or equal to 5 μm and less than or equal to 700 μm, preferably greater than or equal to 10 μm and less than or equal to 500 μm, more preferably greater than or equal to 15 μm and less than or equal to 300 μm. When the substrate 1450 has a small thickness, the weight of the semiconductor device can be reduced. Furthermore, when the substrate 1450 has a small thickness, even in the case of using glass or the like, the substrate 1450 may have elasticity or a property of returning to its original shape when bending or pulling is stopped. Therefore, an impact applied to the semiconductor device over the substrate 1450, which is caused by dropping or the like, can be reduced. That is, a durable semiconductor device can be provided.

For the substrate 1450 that is the flexible substrate, metal, an alloy, a resin, glass, or fiber thereof can be used, for example. The substrate 1450 that is the flexible substrate preferably has a lower coefficient of linear expansion because deformation due to an environment can be suppressed. The substrate 1450 that is the flexible substrate is preferably formed using, for example, a material whose coefficient of linear expansion is lower than or equal to $1 \times 10^{-3}$/K, lower than or equal to $5 \times 10^{-5}$/K, or lower than or equal to $1 \times 10^{-5}$/K. Examples of the resin include polyester, polyolefin, polyamide (nylon, aramid, or the like), polyimide, polycarbonate, acrylic, and polytetrafluoroethylene (PTFE). In particular, aramid is preferably used as the material of the substrate 1450 that is the flexible substrate because of its low coefficient of linear expansion.

<<Base Insulating Film>>

The insulating film 1401 has a function of electrically isolating the substrate 1450 from the conductive film 1414.

The insulating film 1401 or the insulating film 1402 is formed using an insulating film having a single-layer structure or a layered structure. Examples of the material of an insulating film include aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide.

Furthermore, the insulating film 1402 may be formed using silicon oxide with high step coverage which is formed by reacting TEOS (Tetra-Ethyl-Ortho-Silicate), silane, or the like with oxygen, nitrous oxide, or the like.

Furthermore, after the insulating film 1402 is formed, the insulating film 1402 may be subjected to planarization treatment using a CMP method or the like to improve the planarity of the top surface thereof.

The insulating film 1404 preferably contains an oxide. In particular, the insulating film 1404 preferably contains an oxide material from which part of oxygen is released by heating. The insulating film 1404 preferably contains an oxide containing oxygen more than that in the stoichiometric composition. Part of oxygen is released by heating from an oxide film containing oxygen in excess of the stoichiometric composition. Oxygen released from the insulating film 1404 is supplied to the metal oxide 1430, so that oxygen vacancies in the metal oxide 1430 can be reduced. Consequently, changes in the electrical characteristics of the transistor can be reduced and the reliability of the transistor can be improved.

The oxide film containing oxygen more than that in the stoichiometric composition is an oxide film of which the amount of released oxygen converted into oxygen atoms is greater than or equal to $1.0 \times 10^{18}$ atoms/cm$^3$, preferably greater than or equal to $3.0 \times 10^{20}$ atoms/cm$^3$ in TDS (Thermal Desorption Spectroscopy) analysis. Note that the temperature of the film surface in the TDS analysis is preferably higher than or equal to 100° C. and lower than or equal to 700° C., or higher than or equal to 100° C. and lower than or equal to 500° C.

The insulating film 1404 preferably contains an oxide that can supply oxygen to the metal oxide 1430. For example, a material containing silicon oxide or silicon oxynitride is preferably used.

Alternatively, a metal oxide such as aluminum oxide, aluminum oxynitride, gallium oxide, gallium oxynitride, yttrium oxide, yttrium oxynitride, hafnium oxide, or hafnium oxynitride may be used for the insulating film 1404.

To make the insulating film 1404 contain excess oxygen, the insulating film 1404 is formed in an oxygen atmosphere, for example. Alternatively, a region containing excess oxygen may be formed by introducing oxygen into the insulating film 1404 that has been formed. Both the methods may be combined.

For example, oxygen (at least including any of oxygen radicals, oxygen atoms, and oxygen ions) is introduced into the insulating film 1404 that has been formed, so that a region containing excess oxygen is formed. Oxygen can be introduced by an ion implantation method, an ion doping method, a plasma immersion ion implantation method, plasma treatment, or the like.

A gas containing oxygen can be used for oxygen introducing treatment. As the gas containing oxygen, oxygen, nitrous oxide, nitrogen dioxide, carbon dioxide, carbon monoxide, and the like can be used. Furthermore, a rare gas may be included in the gas containing oxygen for the oxygen introduction treatment. Alternatively, hydrogen or the like may be included. For example, a mixed gas of carbon dioxide, hydrogen, and argon may be used.

Furthermore, after the insulating film 1404 is formed, the insulating film 1404 may be subjected to planarization treatment using a CMP method or the like to improve the planarity of the top surface thereof.

The insulating film 1403 has a passivation function of preventing oxygen contained in the insulating film 1404 from decreasing by bonding to metal contained in the conductive film 1414.

The insulating film 1403 has a function of blocking oxygen, hydrogen, water, alkali metal, alkaline earth metal, and the like. Providing the insulating film 1403 can prevent outward diffusion of oxygen from the metal oxide 1430 and entry of hydrogen, water, or the like into the metal oxide 1430 from the outside.

The insulating film 1403 can be, for example, a nitride insulating film. The nitride insulating film is formed using silicon nitride, silicon nitride oxide, aluminum nitride, aluminum nitride oxide, or the like. Note that instead of the nitride insulating film, an oxide insulating film having a blocking effect against oxygen, hydrogen, water, and the like, may be provided. As the oxide insulating film, aluminum oxide, aluminum oxynitride, gallium oxide, gallium oxynitride, yttrium oxide, yttrium oxynitride, hafnium oxide, and hafnium oxynitride can be given.

The threshold voltage of the transistor 1400a can be controlled by injecting electrons into a charge trap layer. The charge trap layer is preferably provided in the insulating film 1402 or the insulating film 1403. For example, when the insulating film 1403 is formed using hafnium oxide, aluminum oxide, tantalum oxide, aluminum silicate, or the like, the insulating film 1403 can function as a charge trap layer.

<<Gate Electrode>>

The conductive film 1411 to the conductive film 1414 each preferably have a single-layer structure or a layered structure of a conductive film containing a low-resistance material selected from copper (Cu), tungsten (W), molybdenum (Mo), gold (Au), aluminum (Al), manganese (Mn), titanium (Ti), tantalum (Ta), nickel (Ni), chromium (Cr), lead (Pb), tin (Sn), iron (Fe), cobalt (Co), ruthenium (Ru), platinum (Pt), iridium (Ir), and strontium (Sr), an alloy of such a low-resistance material, or a compound containing such a material as its main component. It is particularly preferable to use a high-melting-point material that has both heat resistance and conductivity, such as tungsten or molybdenum. In addition, the conductive film is preferably formed using a low-resistance conductive material such as aluminum or copper. The conductive film is preferably formed using a Cu—Mn alloy, since in that case, manganese oxide formed at the interface with an insulator containing oxygen has a function of preventing Cu diffusion.

<<Source Electrode and Drain Electrode>>

The conductive film 1421 to the conductive film 1424 each preferably have a single-layer structure or a layered structure of a conductive film containing a low-resistance material selected from copper (Cu), tungsten (W), molybdenum (Mo), gold (Au), aluminum (Al), manganese (Mn), titanium (Ti), tantalum (Ta), nickel (Ni), chromium (Cr), lead (Pb), tin (Sn), iron (Fe), cobalt (Co), ruthenium (Ru), platinum (Pt), iridium (Ir), and strontium (Sr), an alloy of such a low-resistance material, or a compound containing such a material as its main component. It is particularly preferable to use a high-melting-point material that has both heat resistance and conductivity, such as tungsten or molybdenum. In addition, the conductive film is preferably formed using a low-resistance conductive material such as aluminum or copper. Furthermore, the conductive film is preferably formed using a Cu—Mn alloy, since in that case, manganese oxide formed at the interface with an insulator containing oxygen has a function of preventing Cu diffusion.

Furthermore, the conductive film 1421 to the conductive film 1424 are preferably formed using a conductive oxide including noble metal, such as iridium oxide, ruthenium oxide, or strontium ruthenate. Such a conductive oxide hardly takes oxygen from an oxide semiconductor even when it is in contact with the oxide semiconductor and hardly generates oxygen vacancies in the oxide semiconductor.

<<Low-Resistance Region>>

The region 1441 and the region 1442 are formed when, for example, the conductive film 1421 and the conductive film 1423 take oxygen from the metal oxide 1431 and the metal oxide 1432. Oxygen is more likely to be extracted at higher heating temperatures. Oxygen vacancies are formed in the region 1441 and the region 1442 through several heating steps in the manufacturing process of the transistor. In addition, hydrogen enters sites of the oxygen vacancies by heating, increasing the carrier concentration in the region 1441 and the region 1442. As a result, the resistance of the region 1441 and the region 1442 is reduced.

<<Gate Insulating Film>>

The insulating film 1406 preferably contains an insulator with a high relative dielectric constant. For example, the insulating film 1406 preferably contains gallium oxide, hafnium oxide, an oxide containing aluminum and hafnium, oxynitride containing aluminum and hafnium, an oxide containing silicon and hafnium, or oxynitride containing silicon and hafnium.

Furthermore, the insulating film 1406 preferably has a layered structure containing silicon oxide or silicon oxynitride and an insulator with a high relative dielectric constant. Because silicon oxide and silicon oxynitride have thermal stability, combination of silicon oxide or silicon oxynitride with an insulator with a high relative dielectric constant allows the layered structure to be thermally stable and have a high relative dielectric constant. For example, when aluminum oxide, gallium oxide, or hafnium oxide is closer to the metal oxide 1433, entry of silicon included in silicon oxide or silicon oxynitride into the metal oxide 1432 can be suppressed.

When silicon oxide or silicon oxynitride is closer to the metal oxide 1433, for example, trap centers might be formed at the interface between aluminum oxide, gallium oxide, or hafnium oxide and silicon oxide or silicon oxynitride. The trap centers can shift the threshold voltage of the transistor in the positive direction by trapping electrons in some cases.

<<Interlayer Insulating Film and Protective Insulating Film>>

The insulating film 1405 preferably contains an insulator with a low relative dielectric constant. For example, the insulating film 1405 preferably contains silicon oxide, silicon oxynitride, silicon nitride oxide, silicon nitride, or a resin. Alternatively, the insulating film 1405 preferably has a layered structure containing silicon oxide or silicon oxynitride and a resin. Because silicon oxide and silicon oxynitride have thermal stability, combination of silicon oxide or silicon oxynitride with a resin allows the layered structure to be thermally stable and have a low relative dielectric constant. Examples of the resin include polyester, polyolefin, polyamide (nylon, aramid, or the like), polyimide, polycarbonate, and acrylic.

The insulating film 1407 has a function of blocking oxygen, hydrogen, water, alkali metal, alkaline earth metal, and the like. Providing the insulating film 1407 can prevent outward diffusion of oxygen from the metal oxide 1430 and entry of hydrogen, water, or the like into the metal oxide 1430 from the outside.

The insulating film 1407 can be, for example, a nitride insulating film. The nitride insulating film is formed using silicon nitride, silicon nitride oxide, aluminum nitride, aluminum nitride oxide, or the like. Note that instead of the nitride insulating film, an oxide insulating film having a blocking effect against oxygen, hydrogen, water, and the like, may be provided. As the oxide insulating film, aluminum oxide, aluminum oxynitride, gallium oxide, gallium oxynitride, yttrium oxide, yttrium oxynitride, hafnium oxide, and hafnium oxynitride can be given.

An aluminum oxide film is preferably used as the insulating film 1407 because it is highly effective in preventing transmission of both oxygen and impurities such as hydrogen and moisture.

When the insulating film 1407 is formed by a method using plasma containing oxygen, e.g., by a sputtering method or a CVD method, oxygen can be added to side and top surfaces of the insulating film 1405 and the insulating film 1406. Furthermore, it is preferable to perform second heat treatment at any time after the formation of the insulating film 1407. Through the second heat treatment, oxygen added to the insulating film 1405 and the insulating film 1406 is diffused in the insulating films to reach the metal oxide 1430, whereby oxygen vacancies in the metal oxide 1430 can be reduced.

Figure 34A:
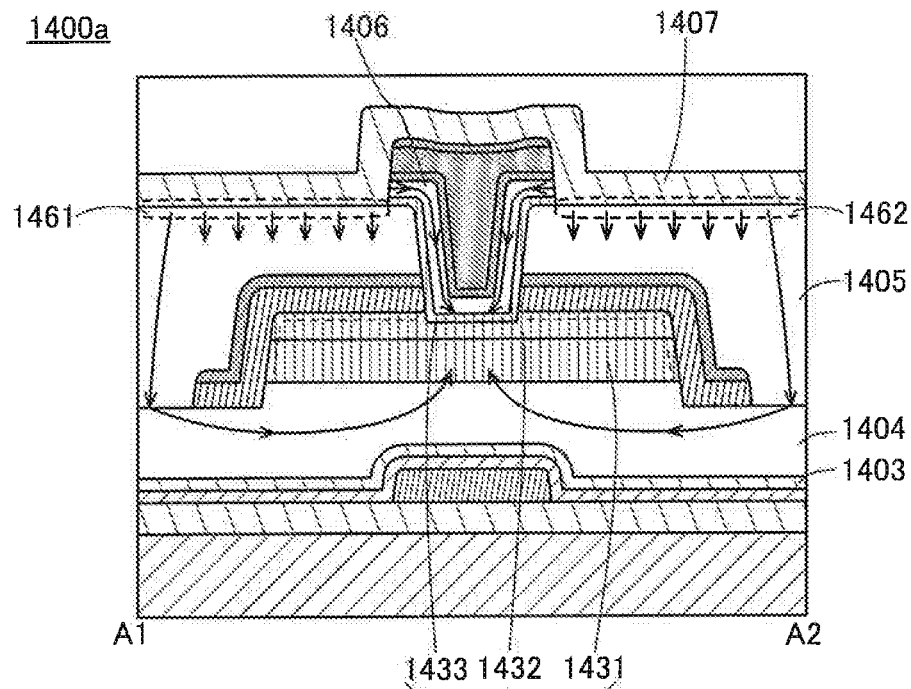
FIG. 34 Cross-sectional views illustrating oxygen diffusion paths.
Figure 34B:
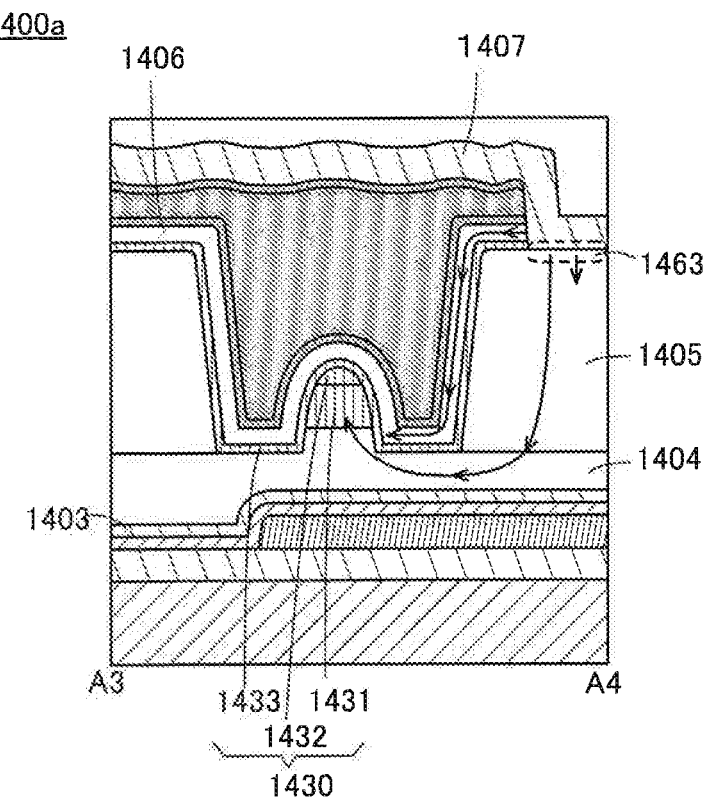

In schematic views of FIG. 34(A) and FIG. 34(B), oxygen added to the insulating film 1405 and the insulating film 1406 in the formation of the insulating film 1407 is diffused in the insulating films through the second heat treatment and reaches the metal oxide 1430. In FIG. 34(A), oxygen diffusion in the cross-sectional view of FIG. 32(B) is indicated by arrows. Similarly, in FIG. 34(B), oxygen diffusion in the cross-sectional view of FIG. 32(C) is indicated by arrows.

As shown in FIG. 34(A) and FIG. 34(B), oxygen added to the side surface of the insulating film 1406 is diffused in the insulating film 1406 and reaches the metal oxide 1430. In addition, a region 1461, a region 1462, and a region 1463 each containing excess oxygen are sometimes formed in the vicinity of the interface between the insulating film 1407 and the insulating film 1405. Oxygen contained in the regions 1461 to 1463 reaches the metal oxide 1430 through the insulating film 1405 and the insulating film 1404. In the case where the insulating film 1405 includes silicon oxide and the insulating film 1407 includes aluminum oxide, a mixed layer of silicon, aluminum, and oxygen is formed in the regions 1461 to 1463 in some cases.

The insulating film 1407 has a function of blocking oxygen and prevents oxygen from being diffused over the insulating film 1407. Similarly, the insulating film 1403 also has a function of blocking oxygen and prevents oxygen from being diffused under the insulating film 1403.

Note that the second heat treatment may be performed at a temperature that allows oxygen added to the insulating film 1405 and the insulating film 1406 to be diffused to the metal oxide 1430. For example, the description of the first heat treatment may be referred to for the second heat treatment. Alternatively, the temperature of the second heat treatment is preferably lower than that of the first heat treatment. The difference between the temperature of the first heat treatment and that of the second heat treatment is higher than or equal to 20° C. and lower than or equal to 150° C., preferably higher than or equal to 40° C. and lower than or equal to 100° C. Accordingly, superfluous release of oxygen from the insulating film 1404 can be inhibited. Note that when heating at the time of formation of the layers doubles as the second heat treatment, the second heat treatment is not necessarily performed in some cases.

As described above, oxygen can be supplied to the metal oxide 1430 from above and below through the formation of the insulating film 1407 and the second heat treatment.

Alternatively, oxygen can be added to the insulating film 1405 and the insulating film 1406 by forming a film containing indium oxide, e.g., an In-M-Zn oxide, as the insulating film 1407.

The insulating film 1408 can be formed using an insulator including one or more kinds of materials selected from aluminum oxide, aluminum nitride oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide. Alternatively, for the insulating film 1408, a resin such as a polyimide resin, a polyamide resin, an acrylic resin, a siloxane resin, an epoxy resin, or a phenol resin can be used. Alternatively, the insulating film 1408 may be a stack including any of the above materials.

Structural Example 2 of Transistor

The conductive film 1414, the insulating film 1402, and the insulating film 1403 can be omitted from the transistor 1400a shown in FIG. 32. An example of such a structure is shown in FIG. 35.

FIG. 35(A) to FIG. 35(C) are a top view and cross-sectional views of a transistor 1400b. FIG. 35(A) is a top view. FIG. 35(B) is a cross-sectional view taken along dashed-dotted line A1-A2 in FIG. 35(A) and FIG. 35(C) is a cross-sectional view taken along dashed-dotted line A3-A4 in FIG. 35(A). Note that for simplification of the drawing, some components are not illustrated in the top view of FIG. 35(A). Note that the dashed-dotted line A1-A2 and the dashed-dotted line A3-A4 are sometimes referred to as a channel length direction of the transistor 1400b and a channel width direction of the transistor 1400b, respectively.

Structural Example 3 of Transistor

In the transistor 1400a shown in FIG. 32, parts of the conductive film 1421 and the conductive film 1423 that overlap with the gate electrode (the conductive film 1411 to the conductive film 1413) can be reduced in thickness. An example of such a structure is shown in FIG. 36.

Figure 36A:
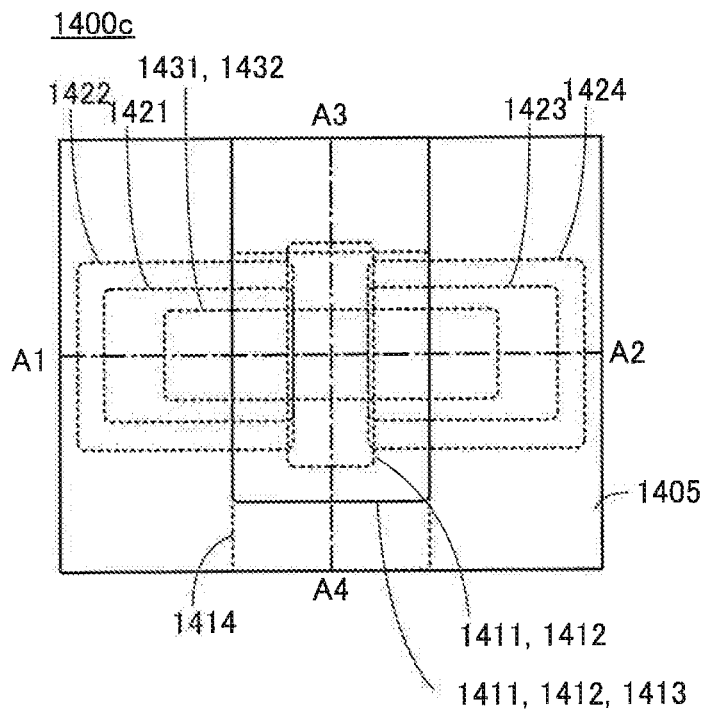
FIG. 36 A top view and cross-sectional views illustrating a structural example of a transistor.
Figure 36B:
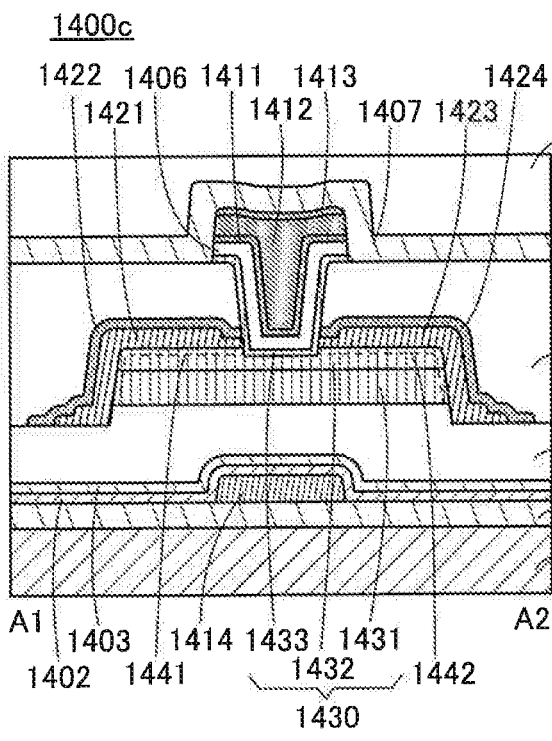
Figure 36C:
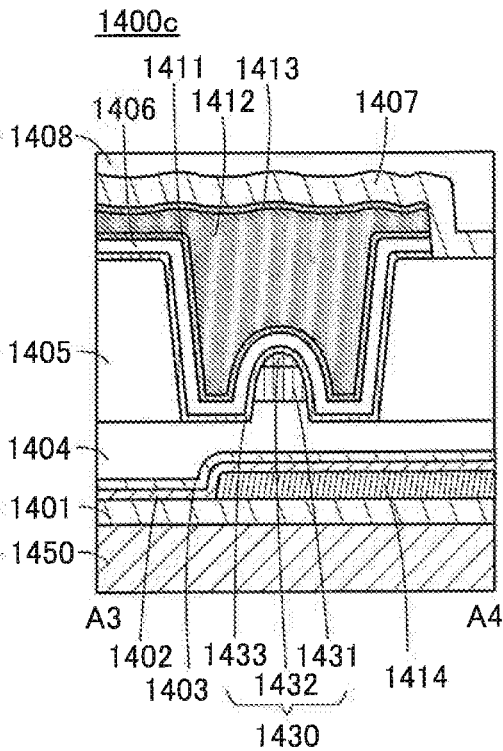

FIG. 36(A) to FIG. 36(C) are a top view and cross-sectional views of a transistor 1400c. FIG. 36(A) is a top view. FIG. 36(B) is a cross-sectional view taken along dashed-dotted line A1-A2 in FIG. 36(A) and FIG. 36(C) is a cross-sectional view taken along dashed-dotted line A3-A4 in FIG. 36(A). Note that for simplification of the drawing, some components in the top view in FIG. 36(A) are not illustrated. Note that the dashed-dotted line A1-A2 and the dashed-dotted line A3-A4 are sometimes referred to as a channel length direction of the transistor 1400c and a channel width direction of the transistor 1400c, respectively.

In the transistor 1400c shown in FIG. 36(B), part of the conductive film 1421 that overlaps with the gate electrode is reduced in thickness, and the conductive film 1422 covers the conductive film 1421. Part of the conductive film 1423 that overlaps with the gate electrode is also reduced in thickness, and the conductive film 1424 covers the conductive film 1423.

The transistor 1400c, which has the structure shown in FIG. 36(B), can have an increased distance between the gate electrode and the source electrode or between the gate electrode and the drain electrode. This results in a reduction in the parasitic capacitance formed between the gate electrode and the source and drain electrodes. As a result, the transistor can operate at high-speed.

Structural Example 4 of Transistor

In the transistor 1400c shown in FIG. 36, the width of the metal oxides 1431 and 1432 can be increased in the A3-A4 direction. An example of such a structure is shown in FIG. 37.

Figure 37A:
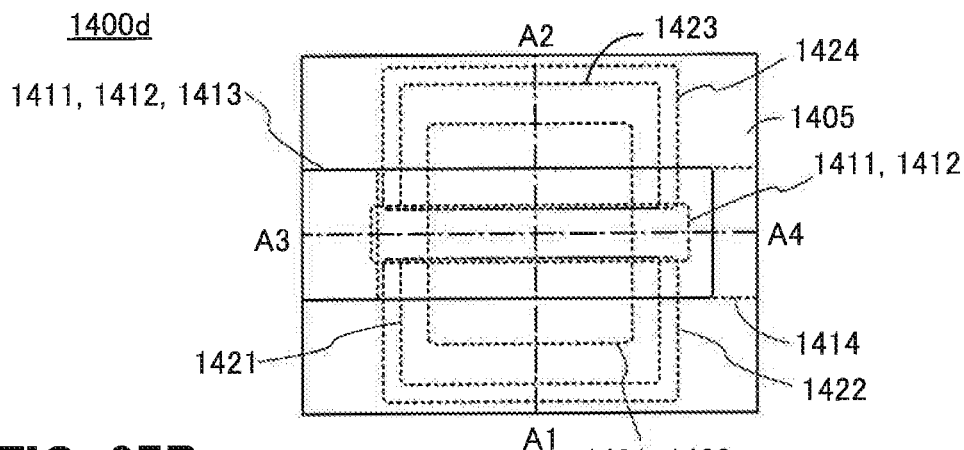
FIG. 37 A top view and cross-sectional views illustrating a structural example of a transistor.
Figure 37B:
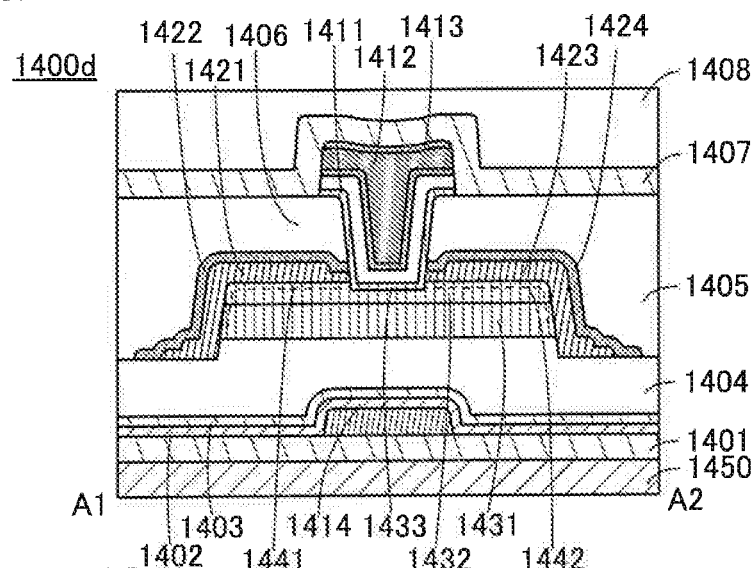
Figure 37C:
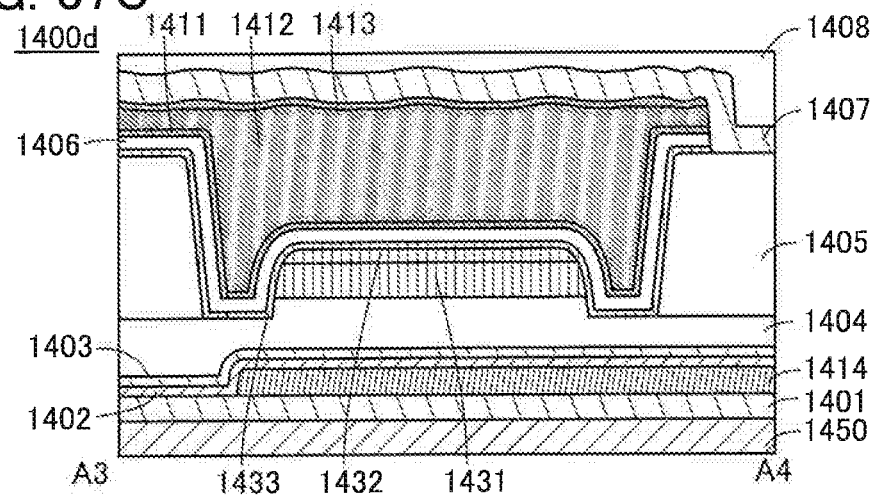

FIG. 37(A) to FIG. 37(C) are a top view and cross-sectional views of a transistor 1400d. FIG. 37(A) is a top view. FIG. 37(B) is a cross-sectional view taken along dashed-dotted line A1-A2 in FIG. 37(A) and FIG. 37(C) is a cross-sectional view taken along dashed-dotted line A3-A4 in FIG. 37(A). Note that for simplification of the drawing, some components are not illustrated in the top view in FIG. 37(A). Note that the dashed-dotted line A1-A2 and the dashed-dotted line A3-A4 are sometimes referred to as a channel length direction of the transistor 1400d and a channel width direction of the transistor 1400d, respectively.

The transistor 1400d, which has the structure shown in FIG. 37, can have an increased on-state current.

Structural Example 5 of Transistor

In the transistor 1400c shown in FIG. 36, a plurality of regions (hereinafter referred to as fins) including the metal oxide 1431 and the metal oxide 1432 may be provided in the A3-A4 direction. An example of this case is shown in FIG. 38.

Figure 38A:
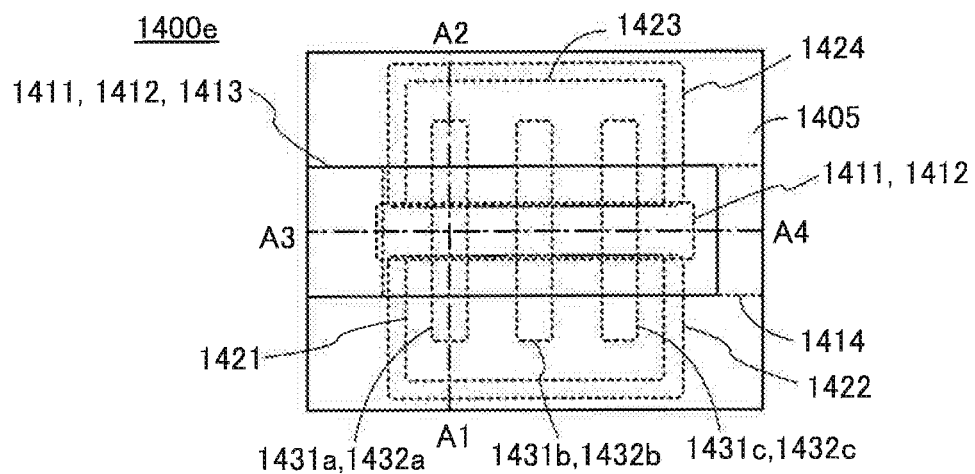
FIG. 38 A top view and cross-sectional views illustrating a structural example of a transistor.
Figure 38B:
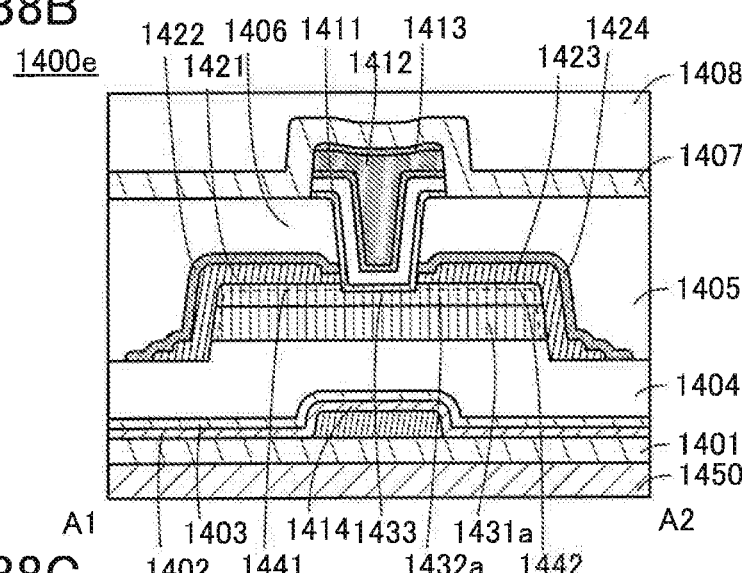
Figure 38C:
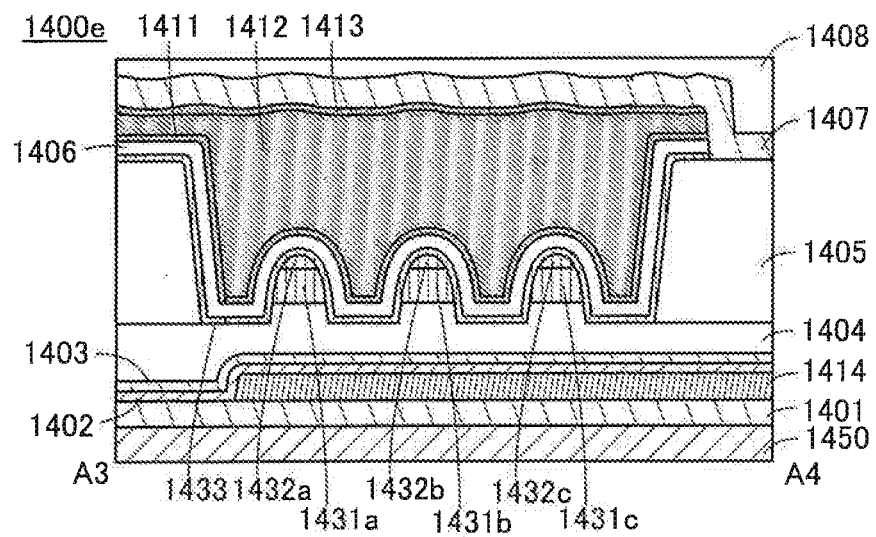

FIG. 38(A) to FIG. 38(C) are a top view and cross-sectional views of a transistor 1400e. FIG. 38(A) is a top view. FIG. 38(B) is a cross-sectional view taken along dashed-dotted line A1-A2 in FIG. 38(A) and FIG. 38(C) is a cross-sectional view taken along dashed-dotted line A3-A4 in FIG. 38(A). Note that for simplification of the drawing, some components are not illustrated in the top view in FIG. 38(A). Note that the dashed-dotted line A1-A2 and the dashed-dotted line A3-A4 are sometimes referred to as a channel length direction of the transistor 1400e and a channel width direction of the transistor 1400e, respectively.

The transistor 1400e includes a first fin consisting of a metal oxide 1431a and a metal oxide 1432a, a second fin consisting of a metal oxide 1431b and a metal oxide 1432b, and a third fin consisting of a metal oxide 1431c and a metal oxide 1432c.

In the transistor 1400e, the metal oxide 1432a to the metal oxide 1432c where a channel is formed are surrounded by the gate electrode. Hence, a gate electric field can be applied to the entire channel, so that the transistor can have a high on-state current.

Structural Example 6 of Transistor

Figure 39A:
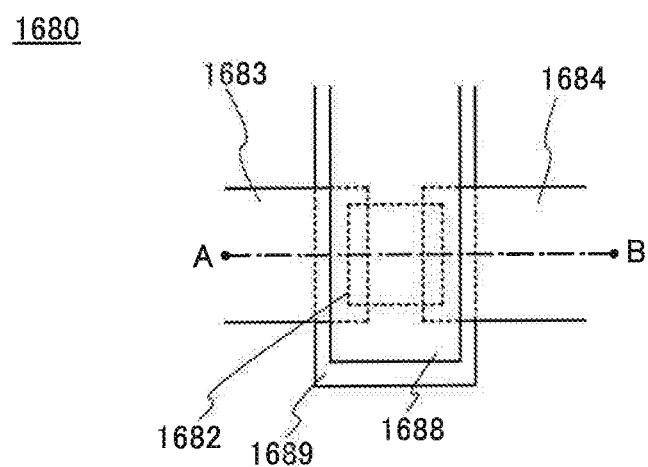
FIG. 39 A top view and a cross-sectional view illustrating a structural example of a transistor.
Figure 39B:
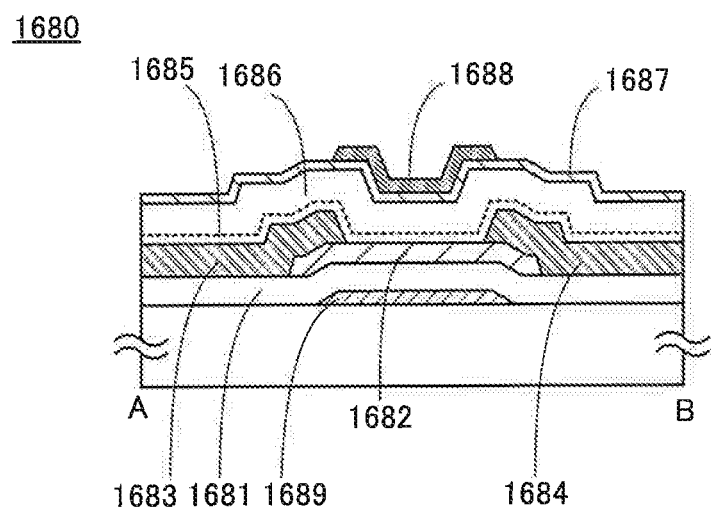

FIG. 39(A) and FIG. 39(B) are a top view and a cross-sectional view of a transistor 1680. FIG. 39(A) is a top view, and FIG. 39(B) is a cross-sectional view taken along dashed-dotted line A-B in FIG. 39(A). Note that for simplification of the drawing, some components are increased or reduced in size, or omitted in FIG. 39(A) and FIG. 39(B). Furthermore, the dashed-dotted line A-B direction may be referred to as a channel length direction.

The transistor 1680 shown in FIG. 39(B) includes a conductive film 1689 serving as a first gate, a conductive film 1688 serving as a second gate, a semiconductor 1682, a conductive film 1683 and a conductive film 1684 serving as a source and a drain, an insulating film 1681, an insulating film 1685, an insulating film 1686, and an insulating film 1687.

The conductive film 1689 is on an insulating surface. The conductive film 1689 overlaps with the semiconductor 1682 with the insulating film 1681 provided therebetween. Furthermore, the conductive film 1688 overlaps with the semiconductor 1682 with the insulating film 1685, the insulating film 1686, and the insulating film 1687 provided therebetween. Furthermore, the conductive film 1683 and the conductive film 1684 are connected to the semiconductor 1682.

The description of the conductive film 1411 to the conductive film 1414 in FIG. 32 can be referred to for the details of the conductive film 1689 and the conductive film 1688.

The conductive film 1689 and the conductive film 1688 may be supplied with different potentials, or may be supplied with the same potential at the same time. Owing to the conductive film 1688 serving as the second gate electrode in the transistor 1680, threshold voltage can be stable. Note that the conductive film 1688 may be omitted in some cases.

The description of the metal oxide 1432 in FIG. 32 can be referred to for the details of the semiconductor 1682. Furthermore, the semiconductor 1682 may be a single layer or a stack including a plurality of semiconductor layers.

The description of the conductive films 1421 to 1424 in FIG. 32 can be referred to for the details of the conductive film 1683 and the conductive film 1684.

The description of the insulating film 1406 in FIG. 32 can be referred to for the details of the insulating film 1681.

Note that the insulating film 1685 to the insulating film 1687 are sequentially stacked over the semiconductor 1682, the conductive film 1683, and the conductive film 1684 in FIG. 39(B); however, an insulating film provided over the semiconductor 1682, the conductive film 1683, and the conductive film 1684 may be a single layer or a stack including a plurality of insulating films.

In the case of using an oxide semiconductor as the semiconductor 1682, the insulating film 1686 preferably contains oxygen at a proportion higher than or equal to that in the stoichiometric composition and has a function of supplying part of oxygen to the semiconductor 1682 by heating. Note that in the case where the semiconductor 1682 is damaged at the time of formation of the insulating film 1686 when the insulating film 1686 is directly formed on the semiconductor 1682, the insulating film 1685 is preferably provided between the semiconductor 1682 and the insulating film 1686, as shown in FIG. 39(B). The insulating film 1685 preferably allows oxygen to pass therethrough, and causes little damage to the semiconductor 1682 when the insulating film 1685 is formed compared with the case of the insulating film 1686. Note that if the insulating film 1686 can be formed directly on the semiconductor 1682 while damage to the semiconductor 1682 is reduced, the insulating film 1685 is not necessarily provided.

For the insulating film 1685 and the insulating film 1686, a material containing silicon oxide or silicon oxynitride is preferably used, for example. Alternatively, a metal oxide such as aluminum oxide, aluminum oxynitride, gallium oxide, gallium oxynitride, yttrium oxide, yttrium oxynitride, hafnium oxide, or hafnium oxynitride can be used.

The insulating film 1687 preferably has an effect of blocking diffusion of oxygen, hydrogen, and water. Alternatively, the insulating film 1687 preferably has an effect of blocking diffusion of hydrogen and water.

As an insulating film has higher density and becomes denser or has a fewer dangling bonds and becomes more chemically stable, the insulating film has a higher blocking effect. An insulating film that has an effect of blocking diffusion of oxygen, hydrogen, and water can be formed using, for example, aluminum oxide, aluminum oxynitride, gallium oxide, gallium oxynitride, yttrium oxide, yttrium oxynitride, hafnium oxide, or hafnium oxynitride. An insulating film that has an effect of blocking diffusion of hydrogen and water can be formed using, for example, silicon nitride or silicon nitride oxide.

In the case where the insulating film 1687 has an effect of blocking diffusion of water, hydrogen, and the like, impurities such as water and hydrogen that exist in a resin in a panel or exist outside the panel can be prevented from entering the semiconductor 1682. In the case where an oxide semiconductor is used as the semiconductor 1682, part of water or hydrogen that enters the oxide semiconductor serves as an electron donor (donor). Thus, the use of the insulating film 1687 having the blocking effect can prevent a shift in the threshold voltage of the transistor 1680 due to generation of donors.

In addition, in the case where an oxide semiconductor is used as the semiconductor 1682, the insulating film 1687 has an effect of blocking diffusion of oxygen, so that diffusion of oxygen from the oxide semiconductor to the outside can be prevented. Accordingly, oxygen vacancies in the oxide semiconductor that serve as donors are reduced, so that a shift in the threshold voltage of the transistor 1680 due to generation of donors can be prevented.

Note that this embodiment can be combined with the other embodiments shown in this specification as appropriate.

Embodiment 10

In this embodiment, structural examples of a device that can be applied to the memory cell 1201 and the memory cell 1203 to the memory cell 1208 (hereinafter collectively referred to as the memory cell 1200[$i,j$]) described in the above embodiments will be described with reference to FIG. 40 to FIG. 43.

Chip Structural Example 1

FIG. 40(A) and FIG. 40(B) are cross-sectional views showing an example in which the memory cell 1200[$i,j$] is formed in one chip. FIG. 40(A) illustrates a cross section in a channel length direction of the transistor included in the memory cell 1200[$i,j$]. FIG. 40(A) illustrates a cross section in a channel width direction of the transistor included in the memory cell 1200[$i,j$].

The memory cell 1200[$i,j$] illustrated in FIG. 40(A) and FIG. 40(B) includes layers L1, L2, L3, L4, L5, L6, L7, L8, L9, L10, L11, and L12 in order from the bottom.

The layer L1 includes a substrate 1700, a transistor Tr0 formed using the substrate 1700, an element isolation layer 1701, and a plurality of conductors such as a conductor 1710 and a conductor 1711.

The layer L2 includes a plurality of wirings such as a wiring 1730 and a wiring 1731.

The layer L3 includes a plurality of conductors such as a conductor 1712 and a conductor 1713 and a plurality of wirings (not illustrated).

The layer L4 includes an insulator 1706, a transistor Tr1, an insulator 1702, an insulator 1703, and a plurality of conductors such as a conductor 1714 and a conductor 1715.

The layer L5 includes a plurality of wirings such as a wiring 1732 and a wiring 1733.

The layer L6 includes a plurality of conductors such as a conductor 1716.

The layer L7 includes a transistor Tr2, an insulator 1704, an insulator 1705, and a plurality of conductors such as a conductor 1717.

The layer L8 includes a plurality of wirings such as a wiring 1734 and a wiring 1735.

The layer L9 includes a plurality of conductors such as a conductor 1718 and a plurality of wirings (not illustrated).

The layer L10 includes a plurality of wirings such as a wiring 1736.

The layer L11 includes a capacitor C1 and a plurality of conductors such as a conductor 1719. Furthermore, the capacitor C1 includes a first electrode 1751, a second electrode 1752, and an insulator 1753.

The layer L12 includes a plurality of wirings such as a wiring 1737.

The OS transistor described in Embodiment 9 is preferably used as the transistor Tr1 and the transistor Tr2. In FIG. 40(A) and FIG. 40(B), the transistor 1400$c$ illustrated in FIG. 36(A) and FIG. 36(B) is used as the transistor Tr1 and the transistor Tr2.

The transistor Tr0 is preferably formed using a semiconductor material different from that for the transistor Tr1 and the transistor Tr2. In FIG. 40(A) and FIG. 40(B), a Si transistor is used as the transistor Tr0.

As the substrate 1700, a single crystal semiconductor substrate or a polycrystalline semiconductor substrate of silicon or silicon carbide, a compound semiconductor substrate of silicon germanium, an SOI substrate, or the like can be used.

For example, a glass substrate, a quartz substrate, a plastic substrate, a metal substrate, a flexible substrate, an attachment film, paper including a fibrous material, or a base film may be used as the substrate 1700. Alternatively, a semiconductor element may be formed using one substrate, and then transferred to another substrate. In FIG. 40(A) and FIG. 40(B), as an example, a single crystal silicon wafer is used as the substrate 1700.

Figure 42A:
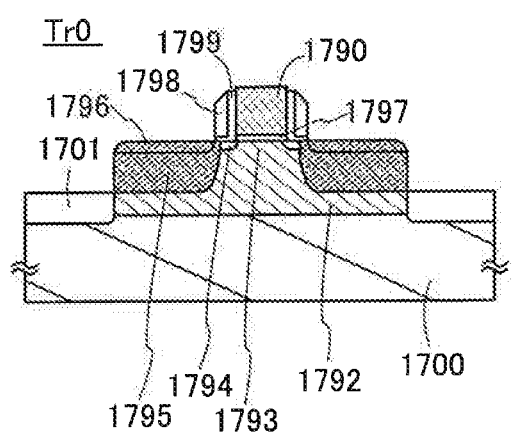
FIG. 42 Cross-sectional views illustrating a structural example of a transistor.
Figure 42B:
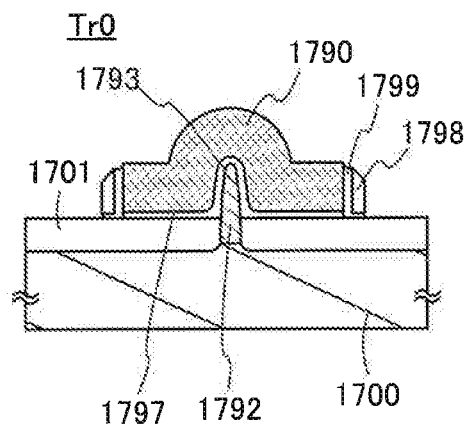

The transistor Tr0 is described in detail with reference to FIG. 42(A) and FIG. 42(B). FIG. 42(A) is a cross-sectional view of the transistor Tr0 in the channel length direction, and FIG. 42(B) is a cross-sectional view of the transistor Tr0 in the channel width direction. The transistor Tr0 includes a channel formation region 1793 formed in a well 1792, low-concentration impurity regions 1794 and high-concentration impurity regions 1795 (also collectively referred to as an impurity region simply), conductive regions 1796 provided in contact with the impurity region, a gate insulating film 1797 provided over the channel formation region 1793, a gate electrode 1790 provided over the gate insulating film 1797, and a sidewall insulating layer 1798 and a sidewall insulating layer 1799 provided on side surfaces of the gate electrode 1790. Note that the conductive regions 1796 can be formed using metal silicide or the like.

In the transistor Tr0 in FIG. 42(B), the channel formation region 1793 has a projecting portion, and the gate insulating film 1797 and the gate electrode 1790 are provided along side and top surfaces of the channel formation region 1793. The transistor with such a shape is referred to as a FIN-type transistor. Although the projecting portion is formed by processing part of the semiconductor substrate in this embodiment, a semiconductor layer with a projecting portion may be formed by processing an SOI substrate.

Figure 43A:
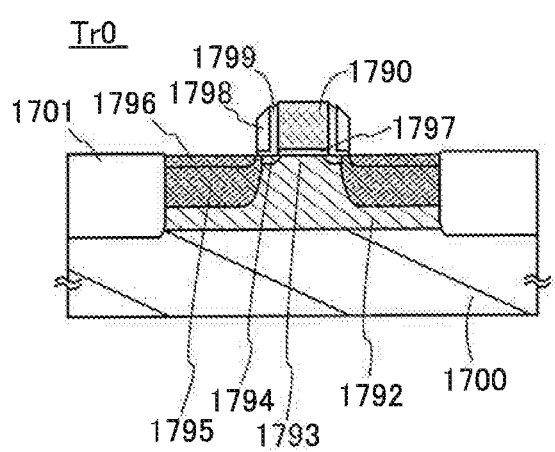
FIG. 43 Cross-sectional views illustrating a structural example of a transistor.
Figure 43B:
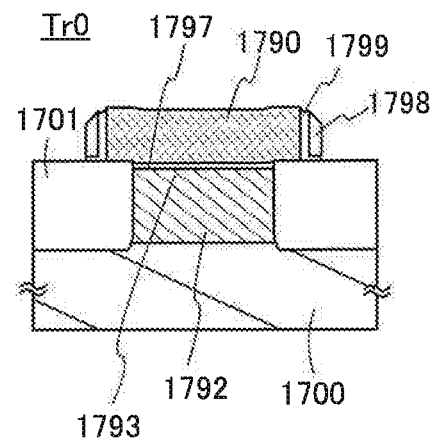

Note that the transistor Tr0 is not limited to the FIN-type transistor, and may be a planar-type transistor illustrated in FIG. 43(A) and FIG. 43(B). FIG. 43(A) is a cross-sectional view of the transistor Tr0 in the channel length direction, and FIG. 43(B) is a cross-sectional view of the transistor Tr0 in the channel width direction. The reference numerals in FIG. 43 are the same as those shown in FIG. 42.

In FIG. 40(A) and FIG. 40(B), the insulator 1702 to the insulator 1706 preferably have a blocking effect against hydrogen, water, and the like. Water, hydrogen, and the like are factors that generate carriers in an oxide semiconductor; thus, providing such a blocking layer against hydrogen, water, and the like can improve the reliability of the transistor Tr1 and the transistor Tr2. Examples of insulators having a blocking effect against hydrogen, water, and the like include aluminum oxide, aluminum oxynitride, gallium oxide, gallium oxynitride, yttrium oxide, yttrium oxynitride, hafnium oxide, hafnium oxynitride, and yttria-stabilized zirconia (YSZ).

The wiring 1730 to the wiring 1737 and the conductor 1710 to the conductor 1719 each preferably have a single-layer structure or a layered structure of a conductive film containing a low-resistance material selected from copper (Cu), tungsten (W), molybdenum (Mo), gold (Au), aluminum (Al), manganese (Mn), titanium (Ti), tantalum (Ta), nickel (Ni), chromium (Cr), lead (Pb), tin (Sn), iron (Fe), and cobalt (Co), an alloy of such a low-resistance material, or a compound containing such a material as its main component. It is particularly preferable to use a high-melting-point material which has both heat resistance and conductivity, such as tungsten or molybdenum. In addition, the conductive film is preferably formed using a low-resistance conductive material such as aluminum or copper. The conductive film is more preferably formed using a Cu—Mn alloy, in which case manganese oxide formed at the interface with an insulator containing oxygen has a function of preventing Cu diffusion.

In FIG. 40, regions without reference numerals and hatch patterns represent regions formed of an insulator. As the insulator, an insulator containing at least one of aluminum oxide, aluminum nitride oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, tantalum oxide, and the like can be used. Alternatively, in the regions, an organic resin such as a polyimide resin, a polyamide resin, an acrylic resin, a siloxane resin, an epoxy resin, or a phenol resin can be used. Note that in this specification, an oxynitride refers to a compound that contains more oxygen than nitrogen, and a nitride oxide refers to a compound that contains more nitrogen than oxygen.

In the case where an OS transistor is used as the transistor Mos1 to the transistor Mos6 described in Embodiment 5 and Embodiment 7, the transistor Mos1 to the transistor Mos6 are preferably formed in the layer L4 or the layer L7.

In the case where a Si transistor is used as the transistor M101, the transistor M102, and the transistor M104 to the transistor M108 described in Embodiment 5 and Embodiment 7, the transistor M101, the transistor M102, and the transistor M104 to the transistor M108 are preferably formed in the layer L1.

In the case where an OS transistor is used as the transistor M101, the transistor M102, and the transistor M104 to the transistor M108 described in Embodiment 5 and Embodiment 7, the transistor M101, the transistor M102, and the transistor M104 to the transistor M108 are preferably formed in the layer L4 or the layer L7.

The capacitor C101 to the capacitor C105 shown in Embodiment 5 and Embodiment 7 are preferably formed in the layer L11.

In the case where a driver circuit around the memory cell 1200[$i,j$] is formed using an OS transistor, the OS transistor may be formed in the layer L4 or the layer L7.

In the case where a driver circuit around the memory cell 1200[$i,j$] is formed using a Si transistor, the Si transistor may be formed in the layer L1.

With the structure illustrated in FIG. 40, the area occupied by the memory cell 1200[$i,j$] can be reduced, leading to a higher level of integration of the memory cells.

Note that in the case where the memory cell 1201 described in Embodiment 5 and the memory cell 1203 to the memory cell 1206 described in Embodiment 7 have the structure of FIG. 40(A) and FIG. 40(B), the numbers of the transistors (Tr0, Tr1, and Tr2) and the capacitors (C1) are sometimes different from those shown in FIG. 40(A) and FIG. 40(B). In that case, the structure of FIG. 40(A) and FIG. 40(B) can be changed as appropriate; for example, the numbers of the layer L4, the layer L7, and the layer L11 are increased or decreased, or an element is additionally provided in a layer.

Furthermore, although the transistor Tr1 and the transistor Tr2 included in the memory cell 1200[$i,j$] in FIG. 40 each have a back gate, the transistor Tr1 and the transistor Tr2 do not necessarily each have a back gate. For example, as in the memory cell 1201 and the memory cell 1203 to the memory cell 1206 in FIG. 23 described in the above embodiments, a back gate is not necessarily provided.

Chip Structural Example 2

All the OS transistors in the memory cell 1200[$i,j$] may be formed in the same layer. An example of such a structure is illustrated in FIG. 41(A) and FIG. 41(B). Like FIG. 40, FIG. 41(A) illustrates a cross section in a channel length direction of the transistors included in the memory cell 1200[$i,j$], and FIG. 41(B) illustrates a cross section in a channel width direction of the transistors included in the memory cell 1200[$i,j$].

The cross-sectional views of FIG. 41(A) and FIG. 41(B) are different from those of FIG. 40(A) and FIG. 40(B) in that the layer L6 to the layer L8 are omitted and the layer L9 is formed on the layer L5. For the other details in FIG. 41(A) and FIG. 41(B), the description of FIG. 40(A) and FIG. 40(B) is referred to.

In the case where an OS transistor is used as the transistor Mos1 to the transistor Mos6 described in Embodiment 5 and Embodiment 7, the transistor Mos1 to the transistor Mos6 are preferably formed in the layer L4.

In the case where a Si transistor is used as the transistor M101, the transistor M102, and the transistor M104 to the transistor M108 described in Embodiment 5 and Embodiment 7, the transistor M101, the transistor M102, and the transistor M104 to the transistor M108 are preferably formed in the layer L1.

In the case where an OS transistor is used as the transistor M101, the transistor M102, and the transistor M104 to the transistor M108 described in Embodiment 5 and Embodiment 7, the transistor M101, the transistor M102, and the transistor M104 to the transistor M108 are preferably formed in the layer L4.

The capacitor C101 to the capacitor C105 shown in Embodiment 5 and Embodiment 7 are preferably formed in the layer L11.

In the case where a driver circuit around the memory cell 1200[$i,j$] is formed using an OS transistor, the OS transistor may be formed in the layer L4.

In the case where a driver circuit around the memory cell 1200[$i,j$] is formed using a Si transistor, the Si transistor may be formed in the layer L1.

With the structure illustrated in FIG. 41(A) and FIG. 41(B), the manufacturing process of the memory cell 1200[$i,j$] can be simplified.

Note that in the case where the memory cell 1201 described in Embodiment 5 and the memory cell 1203 to the memory cell 1206 described in Embodiment 7 have the structure of FIG. 41(A) and FIG. 41(B), the numbers of the transistors (Tr0, Tr1, and Tr2) and the capacitors (C1) are sometimes different from those shown in FIG. 41(A) and FIG. 41(B). In that case, the structure of FIG. 41(A) and FIG. 41(B) can be changed as appropriate; for example, the numbers of the layer L4 and the layer L11 are increased or decreased, or an element is additionally provided in a layer.

Furthermore, although the transistor Tr1 included in the memory cell 1200[i,j] in FIG. 41 has a back gate, the transistor Tr1 does not necessarily have a back gate. For example, as in the memory cell 1201 and the memory cell 1203 to the memory cell 1206 in FIG. 23 described in the above embodiments, a back gate is not necessarily provided.

Note that this embodiment can be combined with the other embodiments shown in this specification as appropriate.

Embodiment 11

In this embodiment, the structure of an oxide semiconductor will be described.

<Structure of Oxide Semiconductor>

An oxide semiconductor is classified into a single crystal oxide semiconductor and a non-single-crystal oxide semiconductor. Examples of a non-single-crystal oxide semiconductor include a CAAC-OS (c-axis-aligned crystalline oxide semiconductor), a polycrystalline oxide semiconductor, an nc-OS (nanocrystalline oxide semiconductor), an amorphous-like oxide semiconductor (a-like OS: amorphous-like oxide semiconductor), and an amorphous oxide semiconductor.

From another perspective, an oxide semiconductor is classified into an amorphous oxide semiconductor and a crystalline oxide semiconductor. Examples of a crystalline oxide semiconductor include a single crystal oxide semiconductor, a CAAC-OS, a polycrystalline oxide semiconductor, and an nc-OS.

An amorphous structure is generally thought to be isotropic and have no non-uniform structure, to be metastable and have no fixed atomic arrangement, to have a flexible bond angle, and to have a short-range order but have no long-range order, for example.

This means that a stable oxide semiconductor cannot be regarded as a completely amorphous oxide semiconductor. Moreover, an oxide semiconductor that is not isotropic (e.g., an oxide semiconductor that has a periodic structure in a microscopic region) cannot be regarded as a completely amorphous oxide semiconductor. In contrast, an a-like OS, which is not isotropic, has an unstable structure that contains a void. Because of its instability, an a-like OS is close to an amorphous oxide semiconductor in terms of physical properties.

<CAAC-OS>

First, a CAAC-OS is described.

A CAAC-OS is one of oxide semiconductors having a plurality of c-axis aligned crystal parts (also referred to as pellets).

Figure 44A:
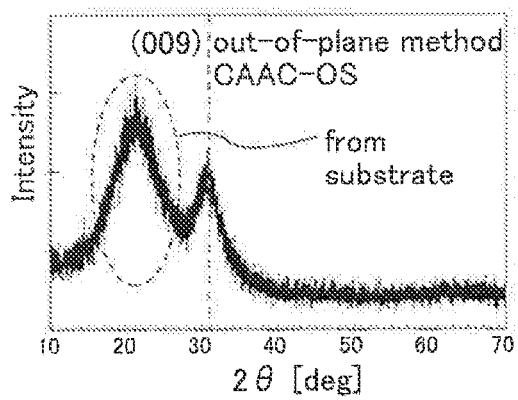
FIG. 44 Diagrams showing structural analysis of a CAAC-OS and a single crystal oxide semiconductor by XRD and diagrams showing selected-area electron diffraction patterns of a CAAC-OS.

Analysis of a CAAC-OS by X-ray diffraction (XRD: X-Ray Diffraction) is described. For example, when the structure of a CAAC-OS including an InGaZnO$_4$ crystal that is classified into the space group R-3m is analyzed by an out-of-plane method, a peak appears at a diffraction angle (2θ) of around 31° as shown in FIG. 44(A). This peak is derived from the (009) plane of the InGaZnO$_4$ crystal, which indicates that crystals in the CAAC-OS have c-axis alignment, and that the c-axes are aligned in a direction substantially perpendicular to a surface over which the CAAC-OS film is formed (also referred to as a formation surface) or the top surface of the CAAC-OS film. Note that a peak sometimes appears at a 2θ of around 36° in addition to the peak at a 2θ of around 31°. The peak at a 2θ of around 36° is derived from a crystal structure classified into the space group Fd-3m. Therefore, it is preferred that the CAAC-OS do not show the peak at a 2θ of around 36°.

Figure 44B:
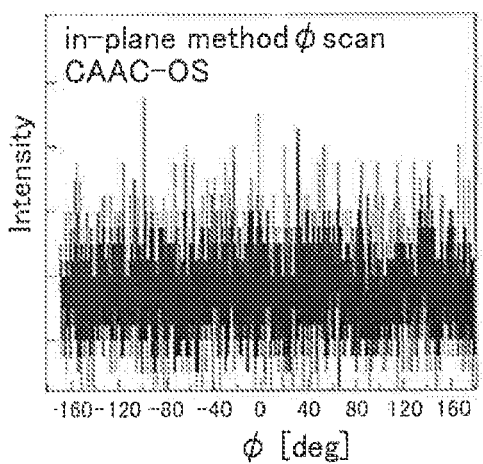
Figure 44C:
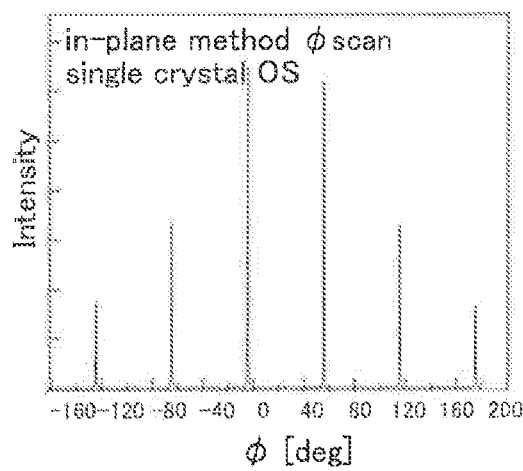

On the other hand, in structural analysis of the CAAC-OS by an in-plane method in which an X-ray is incident on the CAAC-OS in a direction parallel to the formation surface, a peak appears when 2θ is around 56°. This peak is derived from the (110) plane of the InGaZnO$_4$ crystal. When analysis (φ scan) is performed with 2θ fixed at around 56° and with the sample rotated using a normal vector of the sample surface as an axis (φ axis), as shown in FIG. 44(B), a peak is not clearly observed. In contrast, in the case of a single crystal oxide semiconductor of InGaZnO$_4$, when φ scan is performed with 2θ fixed at around 56°, as shown in FIG. 44(C), six peaks which are derived from crystal planes equivalent to the (110) plane are observed. Accordingly, the structural analysis using XRD shows that the directions of a-axes and b-axes are irregularly oriented in the CAAC-OS.

Figure 44D:
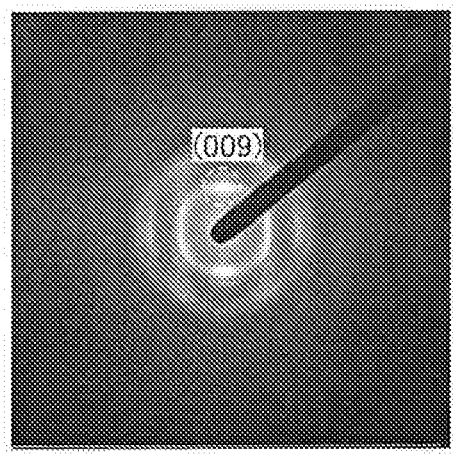
Figure 44E:
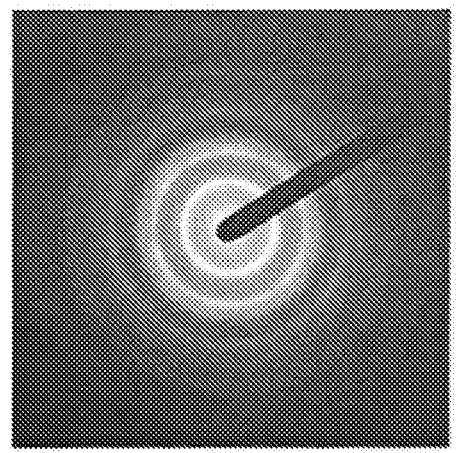

Next, a CAAC-OS analyzed by electron diffraction is described. For example, when an electron beam with a probe diameter of 300 nm is incident on a CAAC-OS including an InGaZnO$_4$ crystal in a direction parallel to the formation surface of the CAAC-OS, a diffraction pattern (also referred to as a selected-area electron diffraction pattern) shown in FIG. 44(D) can be obtained. In this diffraction pattern, spots derived from the (009) plane of an InGaZnO$_4$ crystal are included. Thus, the electron diffraction also indicates that pellets included in the CAAC-OS have c-axis alignment and that the c-axes are aligned in a direction substantially perpendicular to the formation surface or the top surface of the CAAC-OS. Meanwhile, FIG. 44(E) shows a diffraction pattern obtained in such a manner that an electron beam with a probe diameter of 300 nm is incident on the same sample in a direction perpendicular to the sample surface. As shown in FIG. 44(E), a ring-like diffraction pattern is observed. Thus, the electron diffraction also indicates that the a-axes and b-axes of the pellets included in the CAAC-OS do not have regular alignment. The first ring in FIG. 44(E) is considered to be derived from the (010) plane, the (100) plane, and the like of the InGaZnO$_4$ crystal. The second ring in FIG. 44(E) is considered to be derived from the (110) plane and the like.

In a combined analysis image (also referred to as a high-resolution TEM image) of a bright-field image and a diffraction pattern of a CAAC-OS, which is obtained using a transmission electron microscope (TEM: Transmission Electron Microscope), a plurality of pellets can be observed. However, even in the high-resolution TEM image, a boundary between pellets, that is, a grain boundary is not clearly observed in some cases. Thus, in the CAAC-OS, a reduction in electron mobility due to the grain boundary is less likely to occur.

Figure 45A:
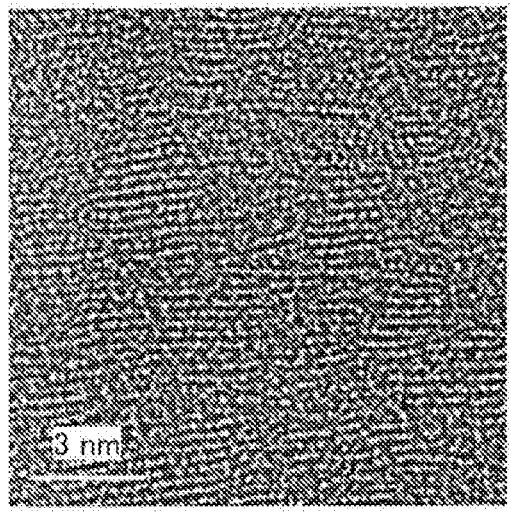
FIG. 45 A cross-sectional TEM image and plan-view TEM images of a CAAC-OS and images obtained through analysis thereof.

FIG. 45(A) shows a high-resolution TEM image of a cross section of the CAAC-OS which is observed from a direction substantially parallel to the sample surface. The high-resolution TEM image is obtained with a spherical aberration corrector (Spherical Aberration Corrector) function. The high-resolution TEM image obtained with a spherical aberration corrector function is particularly referred to as a Cs-corrected high-resolution TEM image. The Cs-corrected high-resolution TEM image can be observed with, for example, an atomic resolution analytical electron microscope JEM-ARM200F manufactured by JEOL Ltd.

FIG. 45(A) shows pellets in which metal atoms are arranged in a layered manner. FIG. 45(A) shows that the size of a pellet is greater than or equal to 1 nm or greater than or equal to 3 nm. Therefore, the pellet can also be referred to as a nanocrystal (nc). Furthermore, the CAAC-OS can also be referred to as an oxide semiconductor including CANC (C-Axis Aligned nanocrystals). A pellet reflects unevenness of a formation surface or a top surface of the CAAC-OS film, and is parallel to the formation surface or the top surface of the CAAC-OS.

Figure 45B:
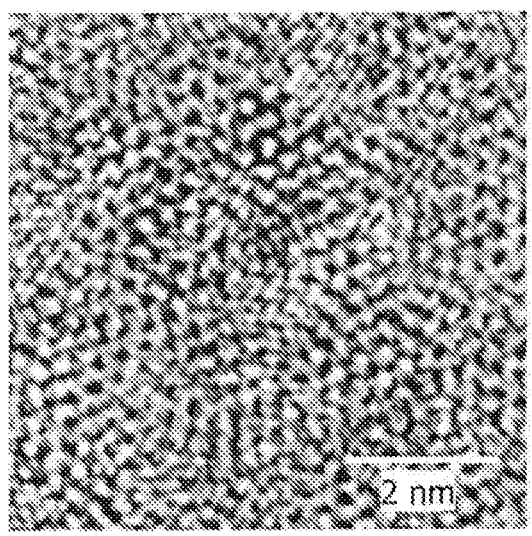
Figure 45C:
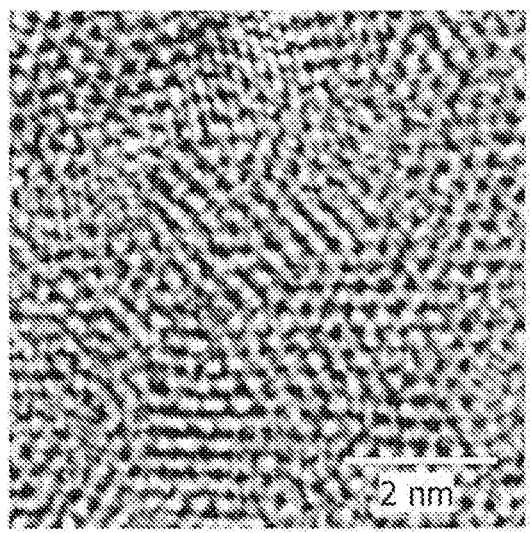
Figure 45D:
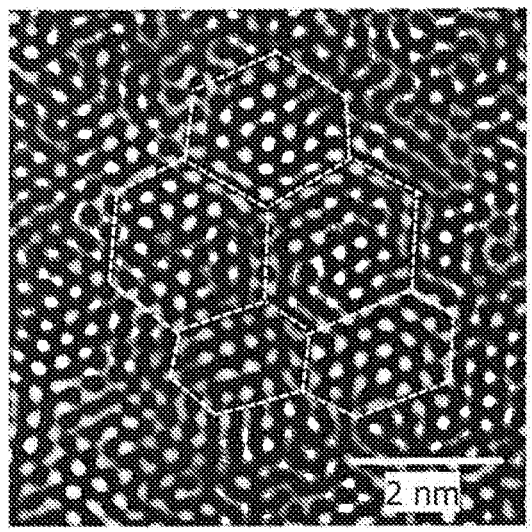
Figure 45E:
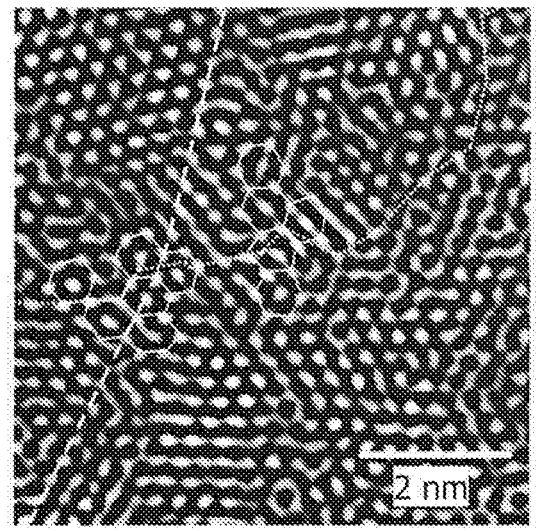

FIG. 45(B) and FIG. 45(C) show Cs-corrected high-resolution TEM images of a plane of the CAAC-OS observed from a direction substantially perpendicular to the sample surface. FIG. 45(D) and FIG. 45(E) are images obtained through image processing of FIG. 45(B) and FIG. 45(C). The method of image processing is as follows. The image in FIG. 45(B) is subjected to fast Fourier transform (FFT: Fast Fourier Transform), so that an FFT image is obtained. Then, mask processing is performed such that a range of from 2.8 $nm^{-1}$ to 5.0 $nm^{-1}$ from the origin in the obtained FFT image remains. After the mask processing, the FFT image is processed by inverse fast Fourier transform (IFFT: Inverse Fast Fourier Transform) to obtain a processed image. The image obtained in this manner is called an FFT filtering image. The FFT filtering image is a Cs-corrected high-resolution TEM image from which a periodic component is extracted, and shows a lattice arrangement.

In FIG. 45(D), a portion where a lattice arrangement is broken is denoted with a dashed line. A region surrounded by a dashed line is one pellet. The portion denoted with the dashed line is a junction of pellets. The dashed line draws a hexagon, which means that the pellet has a hexagonal shape. Note that the shape of the pellet is not always a regular hexagon but is a non-regular hexagon in many cases.

In FIG. 45(E), a dotted line denotes a portion between a region where a lattice arrangement is well aligned and another region where a lattice arrangement is well aligned, and a dashed line denotes the direction of the lattice arrangement. A clear grain boundary cannot be observed even in the vicinity of the dotted line. When a lattice point in the vicinity of the dotted line is regarded as a center and surrounding lattice points are joined, a distorted hexagon, pentagon, and/or heptagon can be formed, for example. That is, a lattice arrangement is distorted so that formation of a grain boundary is inhibited. This is probably because the CAAC-OS can tolerate distortion owing to a low density of the atomic arrangement in an a-b plane direction, an interatomic bond distance changed by substitution of a metal element, and the like.

As described above, the CAAC-OS has c-axis alignment, its pellets (nanocrystals) are connected in an a-b plane direction, and the crystal structure has distortion. For this reason, the CAAC-OS can also be referred to as an oxide semiconductor including a CAA crystal (c-axis-aligned a-b-plane-anchored crystal).

The CAAC-OS is an oxide semiconductor with high crystallinity. Entry of impurities, formation of defects, or the like might decrease the crystallinity of an oxide semiconductor. This means that the CAAC-OS is an oxide semiconductor having small amounts of impurities and defects (e.g., oxygen vacancies).

Note that the impurity means an element other than the main components of the oxide semiconductor, such as hydrogen, carbon, silicon, or a transition metal element. For example, an element, e.g., silicon, having higher strength of bonding to oxygen than a metal element included in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity.

<nc-OS>

Next, an nc-OS is described.

Analysis of an nc-OS by XRD is described. When the structure of an nc-OS is analyzed by an out-of-plane method, a peak indicating orientation does not appear. That is, a crystal of an nc-OS does not have orientation.

Figure 46A:
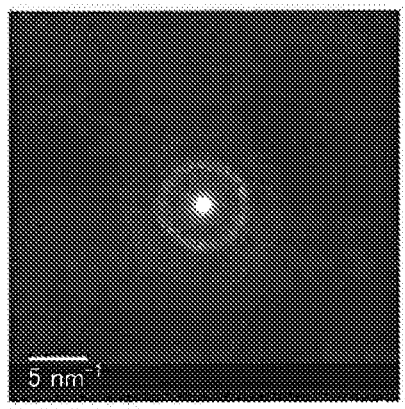
FIG. 46 Diagrams showing electron diffraction patterns of an nc-OS and a cross-sectional TEM image of an nc-OS.
Figure 46B:
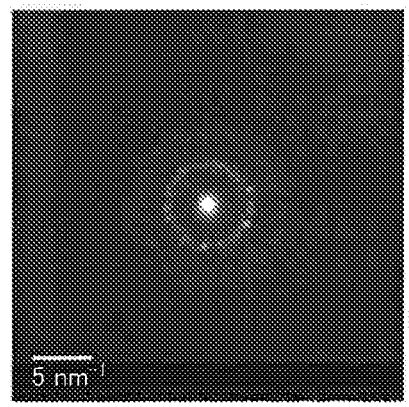

For example, when an electron beam with a probe diameter of 50 nm is incident on a 34-nm-thick region of thinned nc-OS including an $InGaZnO_4$ crystal in a direction parallel to the formation surface, a ring-shaped diffraction pattern (a nanobeam electron diffraction pattern) shown in FIG. 46(A) is observed. FIG. 46(B) shows a diffraction pattern (nanobeam electron diffraction pattern) obtained when an electron beam with a probe diameter of 1 nm is incident on the same sample. As shown in FIG. 46(B), a plurality of spots are observed in a ring-like region. In other words, ordering in an nc-OS is not observed with an electron beam with a probe diameter of 50 nm but is observed with an electron beam with a probe diameter of 1 nm.

Figure 46C:
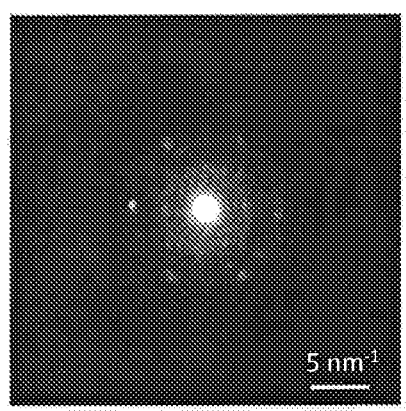

Furthermore, an electron diffraction pattern in which spots are arranged in an approximately regular hexagonal shape is observed in some cases as shown in FIG. 46(C) when an electron beam having a probe diameter of 1 nm is incident on a region with a thickness of less than 10 nm. This means that an nc-OS has a well-ordered region, i.e., a crystal, in the range of less than 10 nm in thickness. Note that an electron diffraction pattern having regularity is not observed in some regions because crystals are aligned in various directions.

Figure 46D:
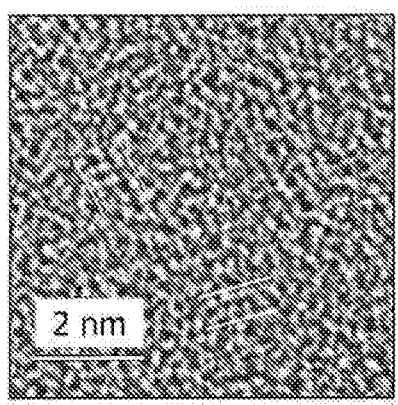

FIG. 46(D) shows a Cs-corrected high-resolution TEM image of a cross section of an nc-OS observed from the direction substantially parallel to the formation surface. An nc-OS has a region in which a crystal part is observed and a region in which a crystal part is not clearly observed in a high-resolution TEM image. In most cases, the size of a crystal part included in the nc-OS is greater than or equal to 1 nm and less than or equal to 10 nm, or greater than or equal to 1 nm and less than or equal to 3 nm. Note that an oxide semiconductor including a crystal part whose size is greater than 10 nm and less than or equal to 100 nm is sometimes referred to as a microcrystalline oxide semiconductor. In a high-resolution TEM image of the nc-OS, for example, a grain boundary is not clearly observed in some cases. Note that there is a possibility that the origin of the nanocrystal is the same as that of a pellet in a CAAC-OS. Therefore, a crystal part of the nc-OS may be referred to as a pellet in the following description.

As described above, in the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different pellets in the nc-OS. Thus, the orientation of the whole film is not observed. Accordingly, the nc-OS cannot be distinguished from an a-like OS or an amorphous oxide semiconductor, depending on an analysis method.

Since there is no regularity of crystal orientation between the pellets (nanocrystals), the nc-OS can also be referred to as an oxide semiconductor including RANC (Random Aligned nanocrystals) or an oxide semiconductor including NANC (Non-Aligned nanocrystals).

Thus, the nc-OS is an oxide semiconductor that has high regularity as compared to an amorphous oxide semiconductor. Therefore, the nc-OS is likely to have a lower density of defect states than an a-like OS and an amorphous oxide semiconductor. Note that there is no regularity of crystal orientation between different pellets in the nc-OS. Therefore, the nc-OS has a higher density of defect states than the CAAC-OS.

<a-like OS>

An a-like OS is an oxide semiconductor having a structure between those of the nc-OS and the amorphous oxide semiconductor.

Figure 47A:
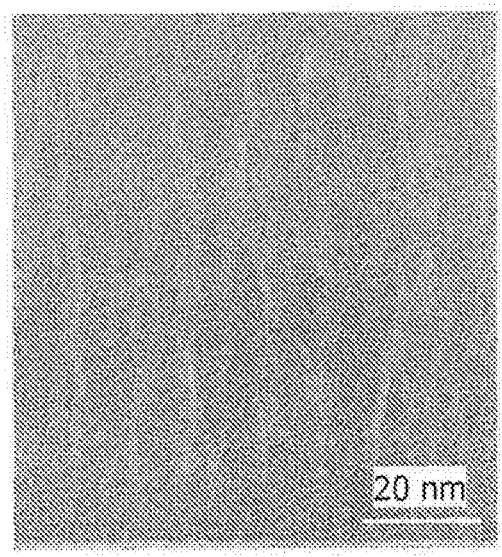
FIG. 47 Cross-sectional TEM images of an a-like OS.
Figure 47B:
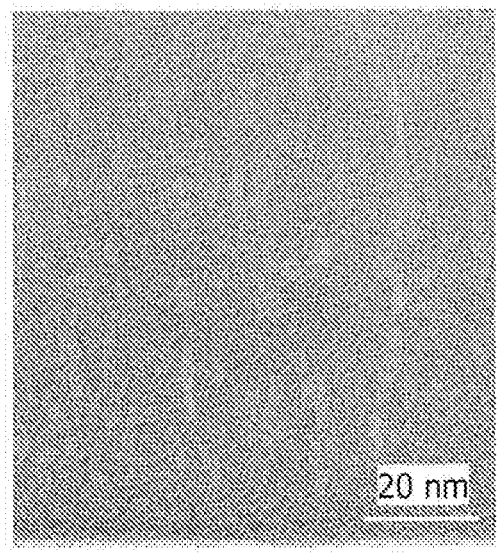

FIG. 47 shows high-resolution cross-sectional TEM images of an a-like OS. FIG. 47(A) is the high-resolution cross-sectional TEM image of the a-like OS at the start of electron irradiation. FIG. 47(B) is the high-resolution cross-sectional TEM image of a-like OS after the electron ($e^-$) irradiation at $4.3 \times 10^8$ $e^-/nm^2$. FIG. 47(A) and FIG. 47(B) show that striped bright regions extending vertically are observed in the a-like OS from the start of the electron irradiation. It can also be found that the shape of the bright region changes after the electron irradiation. Note that the bright region is presumably a void or a low-density region.

The a-like OS has an unstable structure because it contains a void. To verify that an a-like OS has an unstable structure as compared with a CAAC-OS and an nc-OS, a change in structure caused by electron irradiation is described below.

An a-like OS, an nc-OS, and a CAAC-OS are prepared as samples. Each of the samples is an In—Ga—Zn oxide.

First, a high-resolution cross-sectional TEM image of each sample is obtained. The high-resolution cross-sectional TEM images show that all the sample have crystal parts.

Note that it is known that a unit cell of the $InGaZnO_4$ crystal has a structure in which nine layers including three In—O layers and six Ga—Zn—O layers are layered in the c-axis direction. Accordingly, the distance between the adjacent layers is equivalent to the lattice spacing on the (009) plane (also referred to as d value). The value is calculated to be 0.29 nm from crystal structural analysis. Accordingly, a portion where the spacing between lattice fringes is greater than or equal to 0.28 nm and less than or equal to 0.30 nm is regarded as a crystal part of $InGaZnO_4$. Each of lattice fringes corresponds to the a-b plane of the $InGaZnO_4$ crystal.

Figure 48:
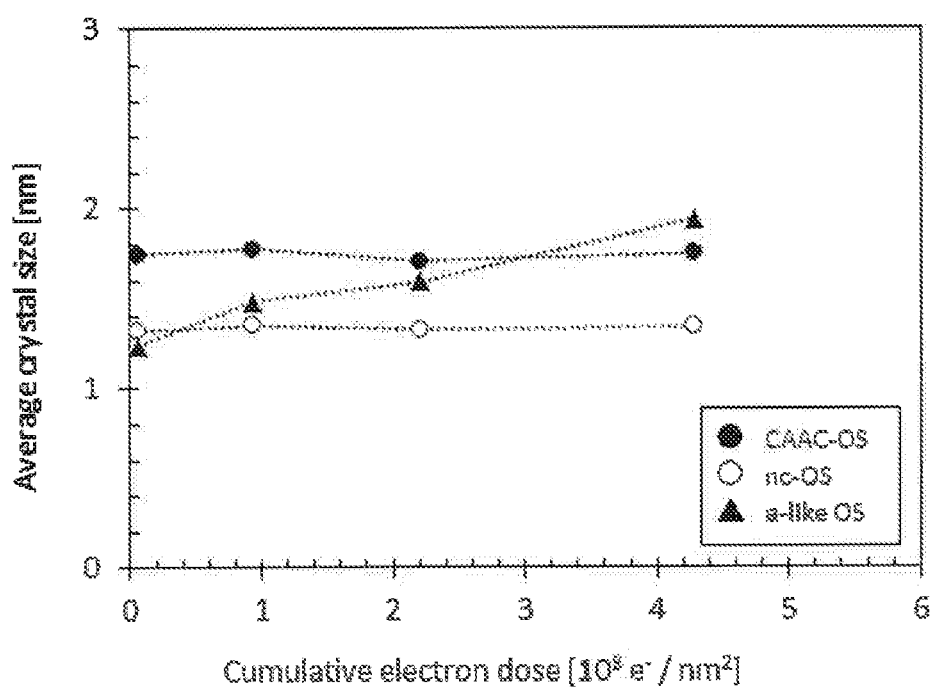
FIG. 48 A diagram showing a change of crystal parts of an In—Ga—Zn oxide owing to electron irradiation.

FIG. 48 shows change in the average size of crystal parts (at 22 points to 30 points) in each sample. Note that the crystal part size corresponds to the length of a lattice fringe. FIG. 48 indicates that the crystal part size in the a-like OS increases with an increase in the cumulative electron dose in obtaining TEM images, for example. As shown in FIG. 48, a crystal part of approximately 1.2 nm (also referred to as an initial nucleus) at the start of TEM observation grows to a size of approximately 1.9 nm at a cumulative electron ($e^-$) dose of $4.2 \times 10^8$ $e^-/nm^2$. In contrast, the crystal part size in the nc-OS and the CAAC-OS shows little change from the start of electron irradiation to a cumulative electron dose of $4.2 \times 10^8$ $e^-/nm^2$. As shown in FIG. 48, the average crystal sizes in an nc-OS and a CAAC-OS are approximately 1.3 nm and approximately 1.8 nm, respectively, regardless of the cumulative electron dose. For the electron beam irradiation and TEM observation, a Hitachi H-9000NAR transmission electron microscope was used. The conditions of electron beam irradiation were as follows: the accelerating voltage was 300 kV; the current density was $6.7 \times 10^5$ $e^-/(nm^2 \cdot s)$; and the diameter of the irradiation region was 230 nm.

In this manner, growth of the crystal part in the a-like OS is sometimes induced by electron irradiation. In contrast, in the nc-OS and the CAAC-OS, growth of the crystal part is hardly induced by electron irradiation. Therefore, the a-like OS has an unstable structure as compared with the nc-OS and the CAAC-OS.

The a-like OS has a lower density than the nc-OS and the CAAC-OS because it contains a void. Specifically, the density of the a-like OS is higher than or equal to 78.6% and lower than 92.3% of the density of the single crystal oxide semiconductor having the same composition. The density of each of the nc-OS and the CAAC-OS is higher than or equal to 92.3% and lower than 100% of the density of the single crystal oxide semiconductor having the same composition. Note that it is difficult to deposit an oxide semiconductor having a density of lower than 78% of the density of the single crystal oxide semiconductor.

For example, in the case of an oxide semiconductor having an atomic ratio of In:Ga:Zn=1:1:1, the density of single crystal $InGaZnO_4$ with a rhombohedral crystal structure is 6.357 $g/cm^3$. Accordingly, in the case of the oxide semiconductor having an atomic ratio of In:Ga:Zn=1:1:1, the density of the a-like OS is higher than or equal to 5.0 $g/cm^3$ and lower than 5.9 $g/cm^3$. For example, in the case of the oxide semiconductor having an atomic ratio of In:Ga:Zn=1:1:1, the density of each of the nc-OS and the CAAC-OS is higher than or equal to 5.9 $g/cm^3$ and lower than 6.3 $g/cm^3$.

Note that single crystals with the same composition do not exist in some cases. In that case, single crystal oxide semiconductors with different compositions are combined at an adequate ratio, which makes it possible to calculate density equivalent to that of a single crystal oxide semiconductor with the desired composition. The density of a single crystal oxide semiconductor having the desired composition can be calculated using a weighted average according to the combination ratio of the single crystal oxide semiconductors with different compositions. Note that it is preferable to use as few kinds of single crystal oxide semiconductors as possible to calculate the density.

As described above, oxide semiconductors have various structures and various properties. Note that an oxide semiconductor may be a stacked layer including two or more of an amorphous oxide semiconductor, an a-like OS, an nc-OS, and a CAAC-OS, for example.

<Carrier Density of Oxide Semiconductor>

Next, the carrier density of an oxide semiconductor will be described below.

Examples of a factor affecting the carrier density of an oxide semiconductor include oxygen vacancy ($V_O$) and impurities in the oxide semiconductor.

As the amount of oxygen vacancy in the oxide semiconductor increases, the density of defect states increases when hydrogen is bonded to the oxygen vacancy (this state is also referred to as $V_OH$). The density of defect states also increases with an increase in the amount of impurity in the oxide semiconductor. Hence, the carrier density of an oxide semiconductor can be controlled by controlling the density of defect states in the oxide semiconductor.

A transistor using the oxide semiconductor in a channel region will be described below.

The carrier density of the oxide semiconductor is preferably reduced in order to inhibit the negative shift of the threshold voltage of the transistor or reduce the off-state current of the transistor. In order to reduce the carrier density of the oxide semiconductor, the impurity concentration in the oxide semiconductor is reduced so that the density of defect states can be reduced. In this specification and the like, a state with a low impurity concentration and a low density of defect states is referred to as a highly purified intrinsic or substantially highly purified intrinsic state. The carrier density of a highly purified intrinsic oxide semiconductor is lower than $8 \times 10^{15}$ cm$^{-3}$, preferably lower than $1 \times 10^{11}$ cm$^{-3}$, further preferably lower than $1 \times 10^{10}$ cm$^{-3}$ and is higher than or equal to $1 \times 10^{-9}$ cm$^{-3}$.

In contrast, the carrier density of the oxide semiconductor is preferably increased in order to improve the on-state current of the transistor or improve the field-effect mobility of the transistor. In order to increase the carrier density of the oxide semiconductor, the impurity concentration or the density of defect states in the oxide semiconductor is slightly increased. Alternatively, the bandgap of the oxide semiconductor is preferably narrowed. For example, an oxide semiconductor that has a slightly high impurity concentration or a slightly high density of defect states in the range where a favorable on/off ratio is obtained in the $I_d$-$V_g$ characteristics of the transistor can be regarded as substantially intrinsic. Furthermore, an oxide semiconductor that has a high electron affinity and thus has a narrow bandgap so as to increase the density of thermally excited electrons (carriers) can be regarded as substantially intrinsic. Note that a transistor using an oxide semiconductor with higher electron affinity has lower threshold voltage.

The aforementioned oxide semiconductor with an increased carrier density has somewhat n-type conductivity; thus, the oxide semiconductor with an increased carrier density can be referred to as a "Slightly-n" oxide semiconductor.

The carrier density of a substantially intrinsic oxide semiconductor is preferably higher than or equal to $1 \times 10^5$ cm$^{-3}$ and lower than $1 \times 10^{18}$ cm$^{-3}$, further preferably higher than or equal to $1 \times 10^7$ cm$^{-3}$ and lower than or equal to $1 \times 10^{17}$ cm$^{-3}$, still further preferably higher than or equal to $1 \times 10^9$ cm$^{-3}$ and lower than or equal to $5 \times 10^{16}$ cm$^{-3}$, yet further preferably higher than or equal to $1 \times 10^{10}$ cm$^{-3}$ and lower than or equal to $1 \times 10^{16}$ cm$^{-3}$, and yet still preferably higher than or equal to $1 \times 10^{11}$ cm$^{-3}$ and lower than or equal to $1 \times 10^{15}$ cm$^{-3}$.

Note that this embodiment can be combined with the other embodiments shown in this specification as appropriate.

Embodiment 12

In this embodiment, examples in which the semiconductor devices (the transistors, the memory cells, and the like) described in the above embodiments are used in electronic components (RFICs, memory devices, and the like) and in electronic devices including the electronic components will be described with reference to FIG. 49.

Figure 49A:
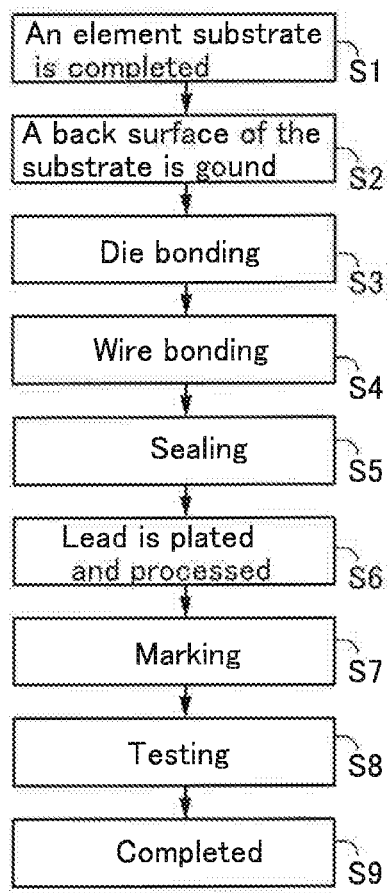
FIG. 49 A flow chart showing an example of manufacturing a semiconductor device and a perspective view illustrating an example of a semiconductor device.

FIG. 49(A) shows an example where the semiconductor device described in the above embodiment is used as an electronic component. Note that the electronic component is also referred to as a semiconductor package or an IC package. This electronic component has various standards and names corresponding to the direction of terminals or the shape of terminals; hence, one example of the electronic component is described in this embodiment.

A semiconductor device including the transistors described in Embodiment 1 and Embodiment 2 is completed through an assembly process (post-process) of integrating detachable components on a printed circuit board.

The post-process can be completed through the steps in FIG. 49(A). Specifically, after an element substrate obtained in the pre-process is completed (Step S1), a back surface of the substrate is ground (Step S2). The substrate is thinned in this step to reduce substrate warpage or the like caused in the pre-process and to reduce the size of the component.

After the back surface of the substrate is ground, a dicing step is performed to divide the substrate into a plurality of chips. Then, the divided chips are separately picked up, placed on a lead frame, and bonded thereto in a die bonding step (Step S3). In the die bonding step, the chip is bonded to the lead frame by an appropriate method depending on products, for example, bonding with a resin or bonding with a tape. Note that in the die bonding step, a chip may be placed on and bonded to an interposer.

Note that in this embodiment, when an element is formed on a surface of a substrate, the other surface is referred to as a back surface (a surface on which the element is not formed).

Next, wire bonding for electrically connecting a lead of the lead frame and an electrode on the chip through a metal wire is performed (Step S4). As the metal wire, a silver wire or a gold wire can be used. Furthermore, ball bonding or wedge bonding can be used as the wire bonding.

The wire-bonded chip is subjected to a molding step of sealing the chip with an epoxy resin or the like (Step S5). Through the molding step, the inside of the electronic component is filled with a resin, whereby damage to a mounted circuit portion and wire caused by external mechanical force can be reduced and deterioration of characteristics due to moisture or dust can be reduced.

Subsequently, the lead of the lead frame is plated. Then, the lead is cut and processed (Step S6). This plating process prevents rust of the lead and facilitates soldering at the time of mounting the chip on a printed circuit board in a later step.

Next, printing (marking) is performed on a surface of the package (Step S7). After a final testing step (Step S8), the electronic component is completed (Step S9).

The above electronic component can include the semiconductor device described in the above embodiment. Thus, a highly reliable electronic component can be obtained.

Figure 49B:
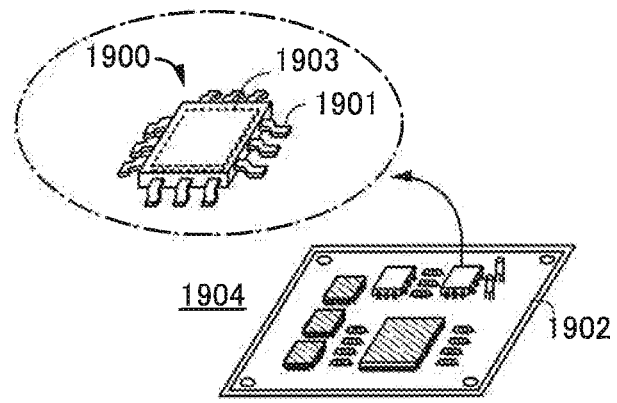

Furthermore, FIG. 49(B) is a schematic perspective diagram illustrating the completed electronic component. FIG. 49(B) is the schematic perspective diagram illustrating a QFP (Quad Flat Package) as an example of the electronic component. An electronic component 1900 in FIG. 49(B) includes a lead 1901 and a circuit portion 1903. The electronic component 1900 in FIG. 49(B) is mounted on a printed circuit board 1902, for example. A plurality of the electronic components 1900 which are combined and electrically connected to each other over the printed circuit board 1902 can be mounted on the electronic device. A completed circuit board 1904 is provided in an electronic device or the like.

Note that this embodiment can be combined with the other embodiments shown in this specification as appropriate.

Notes about the Description in the Specification and the Like

Additional notes are provided below as to the above embodiments and the description of the structures in the above embodiments.

Notes about One Embodiment of the Present Invention Described in the Embodiments The structure described in each embodiment can be used as appropriate in combination with any of the structures described in the other embodiments to make another embodiment of the present invention. In addition, in the case where a plurality of structural examples are given in one embodiment, any of the structural examples can be combined as appropriate.

Note that a content (or may be part of the content) described in one embodiment may be applied to, combined with, or replaced by at least one of a different content (or may be part of the different content) described in the embodiment and a content (or may be part of the content) described in one or a plurality of different embodiments.

Note that in each embodiment, a content described in the embodiment is a content described with reference to a variety of diagrams or a content described with a text described in this specification.

Note that by combining a diagram (or may be part of the diagram) illustrated in one embodiment with at least one of another part of the diagram, a different diagram (or may be part of the different diagram) illustrated in the embodiment, and a diagram (or may be part of the diagram) illustrated in one or a plurality of different embodiments, much more diagrams can be formed.

<Notes on Ordinal Numbers>

In this specification and the like, ordinal numbers such as "first", "second", and "third" are used in order to avoid confusion among components. Thus, the terms do not limit the number. In addition, the terms do not limit order of components. In the present specification and the like, a "first" component in one embodiment can be referred to as a "second" component in other embodiments or claims. Alternatively, in the present specification and the like, for example, a "first" component in one embodiment can be omitted in other embodiments or claims.

Notes on the Description for Drawings

Embodiments are described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the description of the following embodiments. Note that in the structures of the invention in the embodiments, the same portions or portions having similar functions are denoted by the same reference numerals in different drawings, and the description of such portions is not repeated.

In this specification and the like, terms for describing arrangement, such as "over" and "under", are used for convenience to indicate a positional relation between components with reference to drawings. The positional relation between components is changed as appropriate in accordance with the direction in which each component is described. Therefore, terms for describing arrangement are not limited to the terms used in the description in the specification, and can be appropriately reworded depending on situations.

Note that the term "over" or "under" does not necessarily mean that a component is placed directly above or directly below and directly in contact with another component. For example, the expression "electrode B over insulating layer A" does not necessarily mean that the electrode B is above and in direct contact with the insulating layer A and can mean the case where another component is provided between the insulating layer A and the electrode B.

In this specification and the like, components are classified on the basis of the functions, and shown as blocks independent of one another in block diagrams. However, in an actual circuit or the like, it may be difficult to separate components on the basis of the functions, so that one circuit may be associated with a plurality of functions and several circuits may be associated with one function. Therefore, the segmentation of a block in the block diagrams is not limited by any of the components described in the specification, and can be differently determined as appropriate depending on situations.

In the drawings, the size, the layer thickness, or the region has arbitrary magnitude for convenience for the description. Therefore, embodiments of the present invention are not limited to such a scale. Note that the drawings are schematically illustrated for clarity, and shapes or values are not limited to those illustrated in the drawings. For example, the following can be included: variation in signal, voltage, or current due to noise or variation in signal, voltage, or current due to difference in timing.

In the drawings, numbers or characters other than reference numerals are given in some cases for easy understanding. Specifically, numbers and characters on a credit card, numbers written on buttons of a numerical keypad, and a number of a display portion of a segment type liquid crystal are given. To distinguish reference numerals from these numbers and characters written with design, the reference numerals are denoted by leading lines or denoted by underlines, and the fonts of the reference numerals are Arial. Note that the drawings sometimes are not limited thereto when not including numbers and characters written with design.

In a top view (also referred to as a plan view or a layout chart), a perspective view, and the like, some components are not illustrated for clarity of the drawing in some cases.

In the drawings, the same components, components having similar functions, components formed of the same material, or components formed at the same time are denoted by the same reference numerals in some cases, and the description thereof is not repeated in some cases.

Notes about the Description that can be Rephrased or Reworded

In this specification or the like, in description of connections of a transistor, one of a source and a drain is described as "one of a source and a drain" (or a first electrode or a first terminal), and the other of the source and the drain is described as "the other of the source and the drain" (or a second electrode or a second terminal). This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In addition, in this specification and the like, the term such as an "electrode" or a "wiring" does not limit the function of a component. For example, an "electrode" is used as part of a "wiring" in some cases, and vice versa. Furthermore, the term "electrode" or "wiring" can also mean a combination of a plurality of "electrodes" and "wirings" formed in an integrated manner.

Furthermore, in this specification and the like, the terms "voltage" and "potential" are interchangeable in appropriate cases. The term "voltage" refers to a potential difference between a given potential and a reference potential. When the reference potential is a ground potential, the term "voltage" can be replaced with the term "potential". The ground potential does not necessarily mean 0 V. Note that a potential is relative, and a potential supplied to wirings or the like may be changed depending on a reference potential.

Note that in this specification and the like, the terms "film" and "layer" can be interchanged with each other depending on the case or circumstances. For example, the term "conductive layer" can be changed into the term "conductive film" in some cases. Moreover, the term "insulating film" can be changed into the term "insulating layer" in some cases, or can be replaced with a word not including the term "film" or "layer". For example, the term "conductive layer" or "conductive film" can be changed into the term "conductor" in some cases. Furthermore, for example, the term "insulating layer" or "insulating film" can be changed into the term "insulator" in some cases.

In this specification and the like, the term "wiring", "signal line", "power supply line", and the like can be interchanged depending on the case or circumstances. For example, the term "wiring" can be changed into the term such as "signal line" in some cases. For example, the term "wiring" can be changed into the term such as "power supply line" in some cases. The term such as "signal line" or "power supply line" can be changed into the term "wiring" in some cases. The term such as "power supply line" can be changed into the term such as "signal line" in some cases. The term such as "signal line" can be changed into the term such as "power supply line" in some cases.

Notes on Definitions of Terms

The following are definitions of the terms mentioned in the above embodiments.
<<Semiconductor>>

In this specification, a "semiconductor" has characteristics of an "insulator" in some cases when the conductivity is sufficiently low, for example. Furthermore, it is difficult to strictly distinguish a "semiconductor" and an "insulator" from each other in some cases because a border between the "semiconductor" and the "insulator" is not clear. Accordingly, a "semiconductor" in this specification can be called an "insulator" in some cases. Similarly, an "insulator" in this specification can be called a "semiconductor" in some cases.

Note that a "semiconductor" has characteristics of a "conductor" in some cases when the conductivity is sufficiently high, for example. Furthermore, it is difficult to strictly distinguish a "semiconductor" and a "conductor" from each other in some cases because a border between the "semiconductor" and the "conductor" is not clear. Accordingly, a "semiconductor" in this specification can be called a "conductor" in some cases. Similarly, a "conductor" in this specification can be called a "semiconductor" in some cases.

Note that an impurity in a semiconductor refers to, for example, elements other than the main components of a semiconductor layer. For example, an element with a concentration of lower than 0.1 atomic % is an impurity. When an impurity is contained, DOS (Density of State) may be formed in a semiconductor, the carrier mobility may be decreased, or the crystallinity may be decreased, for example. In the case where the semiconductor is an oxide semiconductor, examples of an impurity which changes the characteristics of the semiconductor include Group 1 elements, Group 2 elements, Group 13 elements, Group 14 elements, Group 15 elements, and transition metals other than the main components; specific examples are hydrogen (also included in water), lithium, sodium, silicon, boron, phosphorus, carbon, and nitrogen. In the case of an oxide semiconductor, oxygen vacancy may be formed by entry of impurities such as hydrogen. Furthermore, in the case where the semiconductor is a silicon layer, examples of an impurity which changes the characteristics of the semiconductor include oxygen, Group 1 elements except hydrogen, Group 2 elements, Group 13 elements, and Group 15 elements.
<<Transistor>>

In this specification, a transistor is an element having at least three terminals of a gate, a drain, and a source. The transistor has a channel formation region between a drain (a drain terminal, a drain region, or a drain electrode) and a source (a source terminal, a source region, or a source electrode), and current can flow through the drain, the channel formation region, and the source. Note that in this specification and the like, a channel formation region refers to a region through which current mainly flows.

Furthermore, the functions of a source and a drain might be switched when transistors having different polarities are employed or a direction of current flow is changed in circuit operation, for example. Therefore, the terms "source" and "drain" can be switched in this specification and the like.
<<Switch>>

In this specification and the like, a switch is an element that is brought into a conduction state or a non-conduction state (is turned on or off) to determine whether to have a current flow therethrough or not. Alternatively, the switch is an element having a function of selecting and changing a current path.

For example, an electrical switch, a mechanical switch, or the like can be used as a switch. That is, any element can be used as a switch as long as it can control current, without limitation to a certain element.

For example, a transistor (e.g., a bipolar transistor or a MOS transistor), a diode (e.g., a PN diode, a PIN diode, a Schottky diode, an MIM (Metal Insulator Metal) diode, an MIS (Metal Insulator Semiconductor) diode, or a diode-connected transistor), or a logic circuit in which such elements are combined can be used as an electrical switch.

Note that when a transistor is used as a switch, an "on state" of the transistor refers to a state in which a source electrode and a drain electrode of the transistor are electrically short-circuited. Furthermore, an "off state" of the transistor refers to a state in which the source electrode and drain electrode of the transistor are electrically disconnected. Note that if the transistor operates just as a switch, there is no particular limitation on the polarity (conductivity type) of the transistor.

An example of a mechanical switch is a switch formed using a MEMS (micro electro mechanical system) technology, such as a digital micromirror device (DMD). Such a switch includes an electrode which can be moved mechanically, and operates by controlling conduction and non-conduction in accordance with movement of the electrode.
<<Channel Length>>

In this specification and the like, the channel length refers to, for example, a distance between a source (source region or source electrode) and a drain (drain region or drain electrode) in a region where a semiconductor (or a portion where a current flows in the semiconductor when a transistor is on) and a gate electrode overlap with each other or a region where a channel is formed in a top view of the transistor.

Note that in one transistor, channel lengths in all regions do not necessarily have the same value. In other words, the channel length of one transistor is not fixed to one value in some cases. Therefore, in this specification, the channel length is any one of values, the maximum value, the minimum value, or the average value in a region where a channel is formed.

<<Channel Width>>

In this specification and the like, a channel width refers to, for example, the length of a portion where a source and a drain face each other in a region where a semiconductor (or a portion where a current flows in a semiconductor when a transistor is on) and a gate electrode overlap with each other, or a region where a channel is formed in a top view of the transistor.

Note that in one transistor, channel widths in all regions do not necessarily have the same value. In other words, a channel width of one transistor is not fixed to one value in some cases. Therefore, in this specification, a channel width is any one of values, the maximum value, the minimum value, or the average value in a region where a channel is formed.

Note that depending on transistor structures, a channel width in a region where a channel is formed actually (hereinafter referred to as an effective channel width) is different from a channel width shown in a top view of a transistor (hereinafter referred to as an apparent channel width) in some cases. For example, in a transistor having a three-dimensional structure, an effective channel width is greater than an apparent channel width shown in a top view of the transistor, and its influence cannot be ignored in some cases. For example, in a miniaturized transistor having a three-dimensional structure, the proportion of a channel region formed in a side surface of a semiconductor is high in some cases. In that case, an effective channel width obtained when a channel is actually formed is greater than an apparent channel width shown in the top view.

Meanwhile, in a transistor having a three-dimensional structure, an effective channel width is difficult to measure in some cases. For example, to estimate an effective channel width from a design value, it is necessary to assume that the shape of a semiconductor is known as an assumption condition. Therefore, in the case where the shape of a semiconductor is not known accurately, it is difficult to measure an effective channel width accurately.

Therefore, in this specification, in a top view of a transistor, an apparent channel width that is a length of a portion where a source and a drain face each other in a region where a semiconductor and a gate electrode overlap with each other is referred to as a "surrounded channel width (SCW: Surrounded Channel Width)" in some cases. Furthermore, in this specification, in the case where the term "channel width" is simply used, it may denote a surrounded channel width or an apparent channel width. Alternatively, in this specification, in the case where the term "channel width" is simply used, it may denote an effective channel width in some cases. Note that the values of a channel length, a channel width, an effective channel width, an apparent channel width, a surrounded channel width, and the like can be determined by obtaining and analyzing a cross-sectional TEM image and the like.

Note that in the case where field-effect mobility, a current value per channel width, and the like of a transistor are obtained by calculation, a surrounded channel width may be used for the calculation. In that case, a value different from one in the case where an effective channel width is used for the calculation is obtained in some cases.

<<Connection>>

Note that in this specification and the like, when it is described that X and Y are connected, the case where X and Y are electrically connected, the case where X and Y are functionally connected, and the case where X and Y are directly connected are included therein. Accordingly, another element may be interposed between elements having a connection relation shown in drawings and texts, without limiting to a predetermined connection relation, for example, the connection relation shown in the drawings and the texts.

Here, X, Y, and the like each denote an object (e.g., a device, an element, a circuit, a wiring, an electrode, a terminal, a conductive film, or a layer).

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. Note that a switch has a function of being controlled to be on or off. That is, a switch is conducting or not conducting (is turned on or off) to determine whether current flows therethrough or not. Alternatively, the switch has a function of selecting and changing a current path.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up converter or a step-down converter) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. Note that for example, in the case where a signal output from X is transmitted to Y even when another circuit is interposed between X and Y, X and Y are functionally connected.

Note that when it is explicitly described that X and Y are electrically connected, the case where X and Y are electrically connected (i.e., the case where X and Y are connected with another element or another circuit provided therebetween), the case where X and Y are functionally connected (i.e., the case where X and Y are functionally connected with another circuit provided therebetween), and the case where X and Y are directly connected (i.e., the case where X and Y are connected without another element or another circuit provided therebetween) are included therein. That is, when it is explicitly described that X and Y are electrically connected, the description is the same as the case where it is explicitly only described that X and Y are connected.

Note that, for example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit structure is defined by an expression similar to the above examples, a source (or a first terminal or the like) and a drain (or a second terminal or the like) of a transistor can be distinguished from each other to specify the technical scope. Note that these expressions are examples and there is no limitation on the expressions. Here, X, Y, Z1, and Z2 each denote an object (e.g., a device, an element, a circuit, a wiring, an electrode, a terminal, a conductive film, and a layer).

Note that even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

<<Parallel and Perpendicular>>

In this specification, the term "parallel" indicates that the angle formed between two straight lines is greater than or equal to −10° and less than or equal to 10°, and accordingly also includes the case where the angle is greater than or equal to −5° and less than or equal to 5°. The term "substantially parallel" indicates that the angle formed between two straight lines is greater than or equal to −30° and less than or equal to 30°. The term "perpendicular" indicates that the angle formed between two straight lines is greater than or equal to 80° and less than or equal to 100°, and accordingly also includes the case where the angle is greater than or equal to 85° and less than or equal to 95°. The term "substantially perpendicular" indicates that the angle formed between two straight lines is greater than or equal to 60° and less than or equal to 120°.

<<Trigonal and Rhombohedral>>

In this specification, trigonal and rhombohedral crystal systems are included in a hexagonal crystal system.

EXPLANATION OF REFERENCE

BL wiring
BLB wiring
BRL wiring
BGL wiring
C1 capacitor
C101 capacitor
C102 capacitor
C103 capacitor
C104 capacitor
C105 capacitor
INV101 inverter
INV102 inverter
JT1 connection terminal
JT2 connection terminal
JT3 connection terminal
JT4 connection terminal
JT5 connection terminal
JT6 connection terminal
JT7 connection terminal
M101 transistor
M102 transistor
M104 transistor
M105 transistor
M106 transistor
M107 transistor
M108 transistor
Mos1 transistor
Mos2 transistor
Mos3 transistor
Mos4 transistor
Mos5 transistor
Mos6 transistor
RBL wiring
RWL wiring
SL wiring
Tr0 transistor
Tr1 transistor
Tr2 transistor
WBL wiring
WL wiring
WLC wiring
WWL wiring
10 first circuit
20 second circuit
100 semiconductor device
101 antenna
102 rectification circuit
103 detector circuit
104 modulation circuit
105 power supply circuit
106 control circuit
106a control circuit
106b control circuit
106c control circuit
106d control circuit
106e control circuit
106f control circuit
106g control circuit
106h control circuit
106i control circuit
107 analog-to-digital converter circuit
108 fingerprint sensor
109 memory device
109a volatile memory
109b nonvolatile memory
110 semiconductor device
111 input/output terminal
112 internal circuit
113 wiring
114 wiring
115 transmission/reception circuit
130 semiconductor device
140 semiconductor device
150 semiconductor device
157 OS analog-to-digital converter circuit
159 OS memory device
160 semiconductor device
170 semiconductor device
180 semiconductor device
190 battery
200 CPU
201 power management unit
202 sensor controller 203 memory controller
204 modulation circuit controller
205 bus
206 display controller
207 operation key controller
211 OS-CPU
300 semiconductor device
301 printed portion
302 hand
302a finger
303 hand
308a wireless signal
308b wireless signal
310 semiconductor device
330 semiconductor device
400 contactless card reader
401 reading portion
402 display portion
403 wiring
410 contact card reader
411 wiring
412 display portion
413 wiring
414 internal terminal
415 control device
416 card port
420 contact card reader
421 input button portion
422 wiring
430 vein reading device
431 wiring
432 display portion
433 vein reading portion
434 wiring
435 wiring
436 control device
440 electronic device
450 electronic device
470 electronic device
480 electronic device
481 transmission/reception device
500 semiconductor device
501 housing
502 belt
503 display portion
504 operation key
505 fingerprint sensor
510 semiconductor device
800 analog-to-digital converter circuit
801 sample-and-hold circuit
801A sample-and-hold circuit
801B sample-and-hold circuit
802 comparator
803 successive approximation register
804 digital-to-analog converter circuit
805 timing controller
806 oscillator circuit
811 buffer circuit
812 transistor
813 capacitor
821 sensor circuit
821A sensor circuit
821B sensor circuit
822 selector
831A sample-and-hold circuit
831B sample-and-hold circuit
831C sample-and-hold circuit
835 transistor
836 transistor
837 transistor
838 transistor
893 capacitor
894 selector
895 selector
896 selector
897 transistor
898 inverter circuit
900 analog-to-digital converter circuit
911 transistor
912 capacitor
1200[$i,j$] memory cell
1201 memory cell
1203 memory cell
1204 memory cell
1205 memory cell
1206 memory cell
1207 memory cell
1208 memory cell
1400a transistor
1400b transistor
1400c transistor
1400d transistor
1400e transistor
1401 insulating film
1402 insulating film
1403 insulating film
1404 insulating film
1405 insulating film
1406 insulating film
1407 insulating film
1408 insulating film
1411 conductive film
1412 conductive film
1413 conductive film
1414 conductive film
1421 conductive film
1422 conductive film
1423 conductive film
1424 conductive film
1430 metal oxide
1431 metal oxide
1431a metal oxide
1431b metal oxide
1431c metal oxide
1432 metal oxide
1432a metal oxide
1432b metal oxide
1432c metal oxide
1433 metal oxide
1441 region
1442 region
1450 substrate
1461 region
1462 region
1463 region
1680 transistor
1681 insulating film
1682 semiconductor
1683 conductive film
1684 conductive film
1685 insulating film
1686 insulating film
1687 insulating film
1688 conductive film 1689 conductive film
1700 substrate
1701 element isolation layer
1702 insulator
1703 insulator
1704 insulator
1705 insulator
1706 insulator
1710 conductor
1711 conductor
1712 conductor
1713 conductor
1714 conductor
1715 conductor
1716 conductor
1717 conductor
1718 conductor
1719 conductor
1730 wiring
1731 wiring
1732 wiring
1733 wiring
1734 wiring
1735 wiring
1736 wiring
1737 wiring
1751 electrode
1752 electrode
1753 insulator
1790 gate electrode
1792 well
1793 channel formation region
1794 low-concentration impurity region
1795 high-concentration impurity region
1796 conductive region
1797 gate insulating film
1798 sidewall insulating layer
1799 sidewall insulating layer
1900 electronic component
1901 lead
1902 printed circuit board
1903 circuit portion
1904 circuit substrate
2200 semiconductor device
2201 first memory circuit
2202 second memory circuit
2203 third memory circuit
2204 read circuit
2209 transistor
2210 transistor
2212 transistor
2213 transistor
2215 transistor
2217 transistor
2218 transistor
2219 capacitor
2220 capacitor
2240 wiring
2241 wiring
2242 wiring
2243 wiring
2244 wiring
2300 semiconductor device
2301 CPU core
2302 power controller
2303 power switch
2304 cache
2305 bus interface
2306 debug interface
2307 control unit
2308 PC
2309 pipeline register
2310 pipeline register
2311 ALU
2312 register file
2321 power management unit
2322 peripheral circuit
2323 data bus
2600 memory device
2601 peripheral circuit
2610 memory cell array
2621 row decoder
2622 word line driver circuit
2630 bit line driver circuit
2631 column decoder
2632 precharge circuit
2633 sense amplifier
2634 write circuit
2640 output circuit
2660 control logic circuit

The invention claimed is:

1. A semiconductor device comprising:
a transmission/reception circuit;
a control circuit;
an analog-to-digital converter circuit;
a memory device; and
a fingerprint sensor,
wherein the transmission/reception circuit comprises an antenna;
wherein the control circuit comprises a first transistor;
wherein the memory device comprises a second transistor;
wherein the analog-to-digital converter circuit comprises a third transistor;
wherein at least one of the first to third transistors comprises a retention node electrically connected to one of a source and a drain and an oxide semiconductor in a channel formation region;
wherein the memory device stores first digital data that is fingerprint data for comparison and second digital data that is confidential data;
wherein the transmission/reception circuit is electrically connected to the control circuit;
wherein the control circuit is electrically connected to the fingerprint sensor, the analog-to-digital converter circuit, and the memory device;
wherein the fingerprint sensor is electrically connected to the analog-to-digital converter circuit;
wherein the transmission/reception circuit is configured to generate a first electrical signal to be input to the control circuit, from an input alternating signal generated by the antenna;
wherein the first electrical signal comprises an instruction for driving the control circuit;
wherein the control circuit is configured to transmit a second electrical signal containing an instruction for reading operation to the memory device and transmit a third electrical signal containing a driving instruction to the fingerprint sensor after decoding the first electrical signal;
wherein the memory device is configured to read the first digital data by receiving the second electrical signal and transmit the first digital data to the control circuit;

wherein the fingerprint sensor is configured to obtain analog data of a fingerprint by receiving the third electrical signal and input the analog data to the analog-to-digital converter circuit;

wherein the analog-to-digital converter circuit is configured to convert the analog data of the fingerprint into third digital data and transmit the third digital data to the memory device and the control circuit;

wherein the memory device is configured to store the third digital data;

wherein the control circuit is configured to compare the first digital data and the third digital data;

wherein the control circuit is configured to transmit a fourth electrical signal containing a reading operation instruction to the memory device in the case where the first digital data and the third digital data match each other;

wherein the memory device is configured to read the second digital data by receiving the fourth electrical signal and transmit the second digital data to the control circuit;

wherein the control circuit is configured to transmit the second digital data to the transmission/reception circuit; and wherein the transmission/reception circuit is configured to modulate the second digital data and transmit the second digital data which is modulated from the antenna.

2. The semiconductor device according to claim 1, further comprising an input/output terminal, wherein the input/output terminal is electrically connected to the control circuit;

wherein the input/output terminal is configured to input a fifth electrical signal from the outside of the semiconductor device to the control circuit;

wherein the fifth electrical signal comprises an instruction for driving the control circuit;

wherein the control circuit is configured to transmit the second electrical signal containing an instruction for reading operation to the memory device and transmit the third electrical signal containing a driving instruction to the fingerprint sensor after decoding the fifth electrical signal; and wherein the control circuit is configured to transmit the second digital data to the outside through the input/output terminal by receiving the second digital data.

3. The semiconductor device according to claim 2, further comprising a display portion, an operation key, and a housing, wherein the display portion is electrically connected to the control circuit; and wherein the operation key is electrically connected to the control circuit.

4. The semiconductor device according to claim 3, wherein the display portion comprises a touch sensor.

5. The semiconductor device according to claim 3, wherein the housing comprises a structure which can be worn on a surface of a living thing or a surface of an inanimate object.

6. The semiconductor device according to claim 1, further comprising a capacitor, wherein the capacitor is configured to retain a voltage of the retention node.

7. The semiconductor device according to claim 1, wherein the memory device comprises a first memory region and a second memory region;

wherein writing operation and reading operation of data can be performed in the first memory region;

wherein only reading operation of data can be performed in the second memory region; and wherein the memory device is configured to store the third digital data in the first memory region and is configured to retain the first digital data and the second digital data in the second memory region.

8. A semiconductor device comprising:

an input/output terminal;

a control circuit;

an analog-to-digital converter circuit;

a memory device; and a fingerprint sensor, wherein the control circuit comprises a first transistor;

wherein the memory device comprises a second transistor;

wherein the analog-to-digital converter circuit comprises a third transistor;

wherein at least one of the first to third transistors comprises a retention node electrically connected to one of a source and a drain and an oxide semiconductor in a channel formation region;

wherein the memory device stores first digital data that is fingerprint data for comparison and second digital data that is confidential data;

wherein the input/output terminal is electrically connected to the control circuit;

wherein the control circuit is electrically connected to the fingerprint sensor, the analog-to-digital converter circuit, and the memory device;

wherein the fingerprint sensor is electrically connected to the analog-to-digital converter circuit;

wherein the input/output terminal is configured to supply a first electrical signal to be input to the control circuit to the inside of the semiconductor device;

wherein the first electrical signal comprises an instruction for driving the control circuit;

wherein the control circuit is configured to transmit a second electrical signal containing an instruction for reading operation to the memory device and transmit a third electrical signal containing a driving instruction to the fingerprint sensor after decoding the first electrical signal;

wherein the memory device is configured to read the first digital data by receiving the second electrical signal and transmit the first digital data to the control circuit;

wherein the fingerprint sensor is configured to obtain analog data of a fingerprint by receiving the third electrical signal and input the analog data to the analog-to-digital converter circuit;

wherein the analog-to-digital converter circuit is configured to convert the analog data of the fingerprint into third digital data and transmit the third digital data to the memory device and the control circuit;

wherein the memory device is configured to store the third digital data;

wherein the control circuit is configured to compare the first digital data and the third digital data;

wherein the control circuit is configured to transmit a fourth electrical signal containing a reading operation instruction to the memory device in the case where the first digital data and the third digital data match each other;

wherein the memory device is configured to read the second digital data by receiving the fourth electrical signal and transmitting the second digital data to the control circuit; and wherein the control circuit is configured to transmit the second digital data to the outside through the input/output terminal.

9. The semiconductor device according to 8, further comprising a capacitor, wherein the capacitor is configured to retain a voltage of the retention node.

10. The semiconductor device according to claim 8, wherein the memory device comprises a first memory region and a second memory region;

wherein writing operation and reading operation of data can be performed in the first memory region;

wherein only reading operation of data can be performed in the second memory region; and wherein the memory device is configured to store the third digital data in the first memory region and is configured to retain the first digital data and the second digital data in the second memory region.

11. A system comprising:

a semiconductor device;

a first external device; and a second external device, wherein the semiconductor device comprises a transmission/reception circuit, a control circuit, and a memory device;

wherein the transmission/reception circuit comprises a first antenna;

wherein the first external device comprises a second antenna;

wherein the second external device comprises a biological sensor;

wherein the control circuit comprises a first transistor;

wherein the memory device comprises a second transistor;

wherein at least one of the first transistor and the second transistor comprises a retention node electrically connected to one of a source and a drain and an oxide semiconductor in a channel formation region;

wherein the memory device stores first digital data that is biometric data for comparison and second digital data that is confidential data;

wherein the transmission/reception circuit is electrically connected to the control circuit;

wherein the control circuit is electrically connected to the memory device;

wherein the first external device is electrically connected to the second external device;

wherein the transmission/reception circuit is configured to generate a first electrical signal to be input to the control circuit, from an input alternating signal generated by the first antenna;

wherein the first electrical signal comprises an instruction for driving the control circuit;

wherein the control circuit is configured to transmit a second electrical signal containing an instruction for reading operation to the memory device and transmit a third electrical signal containing a driving instruction for the second external device to the transmission/reception circuit after decoding the first electrical signal;

wherein the memory device is configured to read the first digital data by receiving the second electrical signal, and transmit the first digital data to the control circuit;

wherein the transmission/reception circuit is configured to transmit the third electrical signal which is modulated from the first antenna to the second antenna by receiving the third electrical signal;

wherein the first external device is configured to transmit the third electrical signal to the second external device;

wherein the second external device is configured to start up the biological sensor by receiving the third electrical signal and obtain third digital data that is biometric data to be compared, and is configured to transmit the third digital data to the first external device;

wherein the first external device is configured to transmit the third digital data from the second antenna to the first antenna;

wherein the transmission/reception circuit is configured to demodulate the third digital data received by the first antenna and transmit the third digital data which is demodulated to the control circuit;

wherein the control circuit is configured to transmit the third digital data to the memory device and store the third digital data in the memory device;

wherein the control circuit is configured to compare the first digital data and the third digital data;

wherein the control circuit is configured to transmit a fourth electrical signal containing a reading operation instruction to the memory device in the case where the first digital data and the third digital data match each other;

wherein the memory device is configured to read the second digital data by receiving the fourth electrical signal, and transmit the second digital data to the control circuit;

wherein the control circuit is configured to transmit the second digital data to the transmission/reception circuit; and wherein the transmission/reception circuit is configured to modulate the second digital data and transmit the second digital data which is modulated from the first antenna to the second antenna.

12. The system according to claim 11, wherein the first external device and the second external device are stored in a same housing to form a device.

13. The system according to claim 11 wherein the first external device and the second external device are stored in a same first housing to form a device; and wherein the semiconductor device further comprises a display portion, an operation key, and a second housing.

14. The system according to claim 13, wherein the display portion of the semiconductor device comprises a touch sensor.

15. The system according to claim 13, wherein the second housing comprises a structure which can be worn on a surface of a living thing or a surface of an inanimate object.

16. The system according to claim 11, wherein the biometric data for comparison and the biometric data to be compared are data relating to at least one of a fingerprint, a palmar crease, a handprint, a vein of a finger, a palm, or a wrist, a voiceprint, an iris, a face shape, and a gene.

17. The system according to claim 11, wherein the semiconductor device further comprises a capacitor; and wherein the capacitor is configured to retain a voltage of the retention node.

18. The system according to claim 11, wherein the memory device comprises a first memory region and a second memory region;

wherein writing operation and reading operation of data are performed in the first memory region;

wherein only reading operation of data is performed in the second memory region; and wherein the memory device is configured to store the third digital data in the first memory region and is configured to retain the first digital data and the second digital data in the second memory region.

19. A system comprising:

a semiconductor device;

a first external device; and a second external device, wherein the semiconductor device comprises an input/output terminal, a control circuit, and a memory device;

wherein the first external device comprises a connection port;

wherein the second external device comprises a biological sensor;

wherein the control circuit comprises a first transistor;

wherein the memory device comprises a second transistor;

wherein at least one of the first transistor and the second transistor comprises a retention node electrically connected to one of a source and a drain and an oxide semiconductor in a channel formation region;

wherein the memory device stores first digital data that is biometric data for comparison and second digital data that is confidential data;

wherein the input/output terminal is electrically connected to the control circuit;

wherein the control circuit is electrically connected to the memory device;

wherein the first external device is electrically connected to the second external device;

wherein the first external device and the input/output terminal are electrically connected to each other by attaching the semiconductor device to the connection port;

wherein the input/output terminal is configured to supply a first electrical signal to be input to the control circuit from the first external device to the inside of the semiconductor device;

wherein the first electrical signal comprises an instruction for driving the control circuit;

wherein the control circuit is configured to transmit a second electrical signal containing an instruction for reading operation to the memory device and transmit a third electrical signal containing a driving instruction for the second external device to the first external device through the input/output terminal after decoding the first electrical signal;

wherein the memory device is configured to read the first digital data by receiving the second electrical signal and transmit the first digital data to the control circuit;

wherein the first external device is configured to transmit the third electrical signal to the second external device;

wherein the second external device is configured to start up the biological sensor by receiving the third electrical signal and obtain third digital data that is biometric data to be compared and is configured to transmit the third digital data to the first external device;

wherein the first external device is configured to transmit the third digital data to the control circuit through the input/output terminal;

wherein the control circuit is configured to transmit the third digital data to the memory device and store the third digital data in the memory device;

wherein the control circuit is configured to compare the first digital data and the third digital data;

wherein the control circuit is configured to transmit a fourth electrical signal containing a reading operation instruction to the memory device in the case where the first digital data and the third digital data match each other;

wherein the memory device is configured to read the second digital data by receiving the fourth electrical signal and transmit the second digital data to the control circuit; and wherein the control circuit is configured to transmit the second digital data to the first external device through the input/output terminal.

20. The system according to claim 19, wherein the first external device and the second external device are stored in a same housing to form a device.

21. The system according to claim 19, wherein the biometric data for comparison and the biometric data to be compared are data relating to at least one of a fingerprint, a palmar crease, a handprint, a vein of a finger, a palm, or a wrist, a voiceprint, an iris, a face shape, and a gene.

22. The system according to claim 19:

wherein the semiconductor device further comprises a capacitor; and wherein the capacitor is configured to retain a voltage of the retention node.

23. The system according to claim 19:

wherein the memory device comprises a first memory region and a second memory region;

wherein writing operation and reading operation of data are performed in the first memory region;

wherein only reading operation of data is performed in the second memory region; and wherein the memory device is configured to store the third digital data in the first memory region and is configured to retain the first digital data and the second digital data in the second memory region.

* * * * *